US012784345B2

(12) United States Patent
Muramatsu et al.

(10) Patent No.: US 12,784,345 B2
(45) Date of Patent: Nov. 3, 2026

(54) METHOD FOR GENERATING THREE-DIMENSIONAL DIAGRAM OF OBJECT, THREE-DIMENSIONAL DIAGRAM GENERATION APPARATUS AND THREE-DIMENSIONAL SHAPE INSPECTION APPARATUS

(71) Applicant: Yamaha Robotics Co., Ltd., Tokyo (JP)

(72) Inventors: Hirokatsu Muramatsu, Tokyo (JP); Takuya Adachi, Tokyo (JP)

(73) Assignee: Yamaha Robotics Co., Ltd., Tokyo (JP)

( * ) Notice: Subject to any disclaimer, the term of this patent is extended or adjusted under 35 U.S.C. 154(b) by 128 days.

(21) Appl. No.: 18/727,349

(22) PCT Filed: Jan. 18, 2022

(86) PCT No.: PCT/JP2022/001652

§ 371 (c)(1),
(2) Date: Jul. 9, 2024

(87) PCT Pub. No.: WO2023/139659

PCT Pub. Date: Jul. 27, 2023

(65) Prior Publication Data

US 2025/0166293 A1 May 22, 2025

(51) Int. Cl.
*G06T 17/00* (2006.01)
*G06T 5/50* (2006.01)
(Continued)

(52) U.S. Cl.
CPC ................ *G06T 17/00* (2013.01); *G06T 5/50* (2013.01); *G06T 7/0008* (2013.01); *G06T 7/13* (2017.01);
(Continued)

(58) Field of Classification Search
CPC ......... G06T 5/50; G06T 7/564; G06T 7/0008; G06T 7/13; G06T 17/00;
(Continued)

(56) References Cited

U.S. PATENT DOCUMENTS

2009/0128648 A1 5/2009 Ikeda et al.
2020/0184125 A1 * 6/2020 Machalica ............. G06F 30/12
(Continued)

FOREIGN PATENT DOCUMENTS

JP H1054709 2/1998
JP 2004340728 12/2004
(Continued)

OTHER PUBLICATIONS

Biljecki F, Ledoux H, Stoter J. Generating 3D city models without elevation data. Computers, Environment and Urban Systems. Jul. 1, 2017;64:1-8.*
Fruh C, Zakhor A. Constructing 3D city models by merging aerial and ground views. IEEE computer graphics and applications. Nov. 3, 2003;23(6):52-61.*
"International Search Report (Form PCT/ISA/210) of PCT/JP2022/001652", mailed on Apr. 5, 2022, with English translation thereof, pp. 1-4.
(Continued)

*Primary Examiner* — Phu K Nguyen
(74) *Attorney, Agent, or Firm* — JCIPRNET

(57) ABSTRACT

A three-dimensional diagram generation apparatus (100) includes a controller (50) that generates a three-dimensional diagram of a semiconductor device based on an image obtained by imaging the semiconductor device. The controller (50) acquires a vertical view image and multiple oblique view images of the semiconductor device, extracts a contour line in the vertical view image to generate a vertical view diagram of the semiconductor device, converts the vertical view diagram into multiple oblique view dia-
(Continued)

grams based on a shape parameter stored in a storage part, repeatedly execute adjustment of the shape parameter and conversion of the vertical view diagram into each oblique view diagram until each converted oblique view diagram overlaps with each oblique view image, and synthesizes the generated vertical view diagram and each oblique view diagram overlapping with each oblique view image to generate the three-dimensional diagram.

24 Claims, 41 Drawing Sheets

(51) Int. Cl.
*G06T 7/00* (2017.01)
*G06T 7/13* (2017.01)
*G06V 10/46* (2022.01)

(52) U.S. Cl.
CPC .... *G06V 10/46* (2022.01); *G06T 2207/20221* (2013.01); *G06T 2207/30148* (2013.01)

(58) Field of Classification Search
CPC ........... G06T 2207/30141; G06T 2207/30148; G06T 2207/20221
USPC .......................................................... 345/418
See application file for complete search history.

(56) References Cited

U.S. PATENT DOCUMENTS

| | | | | |
|---|---|---|---|---|
| 2022/0180494 | A1 | 6/2022 | Kinjo et al. | |
| 2022/0224833 | A1* | 7/2022 | Cier | G01C 21/383 |
| 2023/0213913 | A1* | 7/2023 | Zeng | G02B 3/0012 426/103 |
| 2024/0089615 | A1* | 3/2024 | Liu | G06T 7/521 |

FOREIGN PATENT DOCUMENTS

| | | |
|---|---|---|
| JP | 2009145072 | 7/2009 |
| JP | 2010261965 | 11/2010 |
| JP | 2018146442 | 9/2018 |
| KR | 20100017396 | 2/2010 |
| KR | 20110029057 | 3/2011 |
| WO | 2014196010 | 12/2014 |
| WO | 2020217970 | 10/2020 |

OTHER PUBLICATIONS

"Office Action of Korea Counterpart Application", with English translation thereof, issued on Sep. 11, 2025, pp. 1-27.
"The First Office Action of China Counterpart Application", with English translation thereof, issued on May 1, 2026, pp. 1-41.

* cited by examiner

Component shape parameter database

71

| Component name | Height from the reference surface Z | X-direction inclination XR | Y-direction inclination YR | Z-direction inclination ZR |
|---|---|---|---|---|
| Lead frame | 0 | -1.1 | -0.3 | 0 |
| Lead | 10 | -1.1 | -0.3 | 0 |
| Semiconductor chip | 200 | 1 | 0.1 | 0 |
| Pad | 210 | 1 | 0.1 | 0 |
| · · · | · · · | · · · | · · · | · · · |
| · · · | · · · | · · · | · · · | · · · |
| · · · | · · · | · · · | · · · | · · · |

FIG. 6

Bending parameter database

72

| No. | Position | Longitudinal direction coordinate position L | Lateral direction coordinate position R | Height direction coordinate position H | Proportional longitudinal direction coordinate position LP(%) | Proportional lateral direction coordinate position RP(%) | Proportional height direction coordinate position HP(%) |
|---|---|---|---|---|---|---|---|
| 1 | Starting point | 0 | 0 | 210 | 0 | 0 | 0 |
| 2 | First bending point | 0 | 0 | 290 | 0 | 0 | 0 |
| 3 | Second bending point | 50 | 0 | 340 | 0 | 0 | 0 |
| 4 | Third bending point | 60 | 0 | 300 | 0 | 0 | 0 |
| 5 | Fourth bending point | 0 | 0 | 0 | 60 | 0 | -1 |
| 6 | Ending point | 1900 | 0 | 10 | 0 | 0 | 0 |

FIG. 7

Wire-specific bending parameter

| No. | Position | Longitudinal direction coordinate position L | Lateral direction coordinate position R | Height direction coordinate position H |
|---|---|---|---|---|
| 1 | Starting point | 0 | 0 | 210 |
| 2 | First bending point | 0 | 0 | 290 |
| 3 | Second bending point | 50 | 0 | 340 |
| 4 | Third bending point | 60 | 0 | 300 |
| 5 | Fourth bending point | 1140 | 0 | 281 |
| 6 | Ending point | 1900 | 0 | 10 |

| No. | Position | Longitudinal direction coordinate position L | Lateral direction coordinate position R | Height direction coordinate position H |
|---|---|---|---|---|
| 1 | Starting point | 0 | 0 | 210 |
| 2 | First bending point | 0 | 0 | 290 |
| 3 | Second bending point | 50 | 0 | 340 |
| 4 | Third bending point | 60 | 0 | 300 |
| 5 | Fourth bending point | 1380 | 0 | 277 |
| 6 | Ending point | 2300 | 0 | 10 |

| No. | Position | Longitudinal direction coordinate position L | Lateral direction coordinate position R | Height direction coordinate position H |
|---|---|---|---|---|
| 1 | Starting point | 0 | 0 | 210 |
| 2 | First bending point | 0 | 0 | 290 |
| 3 | Second bending point | 50 | 0 | 340 |
| 4 | Third bending point | 60 | 0 | 300 |
| 5 | Fourth bending point | 1500 | 0 | 272 |
| 6 | Ending point | 2500 | 0 | 10 |

FIG. 8

Detail of part B

Wire grouping database

73

| Group number | Starting point component | Ending point component | Wire thickness |
|---|---|---|---|
| 1 | First semiconductor chip | Lead frame | 25 |
| 2 | Second semiconductor chip | First semiconductor chip | 10 |
| . . . | . . . | . . . | . . . |
| . . . | . . . | . . . | . . . |

FIG. 22

71

Component shape parameter database

| Component name | Height from the reference surface Z | X-direction inclination XR | Y-direction inclination YR | Z-direction inclination ZR |
|---|---|---|---|---|
| Lead frame | 0 | -1.1 | -0.3 | 0 |
| Lead | 10 | -1.1 | -0.3 | 0 |
| First semiconductor chip | 200 | 1 | 0.1 | 0 |
| First pad | 210 | 1 | 0.1 | 0 |
| Second pad | 210 | 1 | 0.1 | 0 |
| Second semiconductor chip | 500 | 0 | -0.3 | 0 |
| Third pad | 510 | 0 | -0.3 | 0 |
| . . . | . . . | . . . | . . . | . . . |

FIG. 23

74

Group-specific bending parameter database

First wire group

74a

| No. | Position | Longitudinal direction coordinate position L | Lateral direction coordinate position R | Height direction coordinate position H | Proportional longitudinal direction coordinate position LP(%) | Proportional lateral direction coordinate position RP(%) | Proportional height direction coordinate position HP(%) |
|---|---|---|---|---|---|---|---|
| 1 | Starting point | 0 | 0 | 210 | 0 | 0 | 0 |
| 2 | First bending point | 0 | 0 | 290 | 0 | 0 | 0 |
| 3 | Second bending point | 50 | 0 | 340 | 0 | 0 | 0 |
| 4 | Third bending point | 60 | 0 | 300 | 0 | 0 | 0 |
| 5 | Fourth bending point | 0 | 0 | 0 | 60 | 0 | -1 |
| 6 | Ending point | 1900 | 0 | 10 | 0 | 0 | 0 |

Second wire group

74b

| No. | Position | Longitudinal direction coordinate position | Lateral direction coordinate position | Vertical coordinate position H | Proportional longitudinal direction coordinate position LP(%) | Proportional lateral direction coordinate position RP(%) | Proportional height direction coordinate position HP(%) |
|---|---|---|---|---|---|---|---|
| 1 | Starting point | 0 | 0 | 510 | 0 | 0 | 0 |
| 2 | First bending point | 0 | 0 | 550 | 0 | 0 | 0 |
| 3 | Second bending point | 25 | 0 | 580 | 0 | 0 | 0 |
| 4 | Third bending point | 0 | 0 | 0 | 50 | 0 | 0 |
| 5 | Fourth bending point | 0 | 0 | 0 | 60 | 0 | -1 |
| 6 | Ending point | 1200 | 0 | 210 | 0 | 0 | 0 |

FIG. 24

Wire-specific bending parameter

First wire group

| No. | Position | Longitudinal direction coordinate position L | Lateral direction coordinate position R | Height direction coordinate position H |
|---|---|---|---|---|
| 1 | Starting point | 0 | 0 | 210 |
| 2 | First bending point | 0 | 0 | 290 |
| 3 | Second bending point | 50 | 0 | 340 |
| 4 | Third bending point | 60 | 0 | 300 |
| 5 | Fourth bending point | 1140 | 0 | 281 |
| 6 | Ending point | 1900 | 0 | 10 |

Second wire group

| No. | Position | Longitudinal direction coordinate position L | Lateral direction coordinate position R | Height direction coordinate position H |
|---|---|---|---|---|
| 1 | Starting point | 0 | 0 | 510 |
| 2 | First bending point | 0 | 0 | 550 |
| 3 | Second bending point | 25 | 0 | 580 |
| 4 | Third bending point | 600 | 0 | 580 |
| 5 | Fourth bending point | 720 | 0 | 568 |
| 6 | Ending point | 1200 | 0 | 210 |

FIG. 25

METHOD FOR GENERATING THREE-DIMENSIONAL DIAGRAM OF OBJECT, THREE-DIMENSIONAL DIAGRAM GENERATION APPARATUS AND THREE-DIMENSIONAL SHAPE INSPECTION APPARATUS

CROSS-REFERENCE TO RELATED APPLICATION

This application is a 371 application of the International PCT application serial no. PCT/JP2022/001652, filed on Jan. 18, 2022. The entirety of the above-mentioned patent application is hereby incorporated by reference herein and made a part of this specification.

TECHNICAL FIELD

The disclosure relates to a method for generating a three-dimensional diagram of an object and configurations of a three-dimensional diagram generation apparatus and a three-dimensional shape inspection apparatus.

RELATED ART

A method is disclosed, which is for imaging a bonding wire fixed on an XY stage with CCD cameras via microscopes from the left and right directions and calculating the three-dimensional coordinates of the bonding wire based on left and right image data (see, for example, Patent Document 1). It is disclosed that, in the method described in Patent Document 1, the positions of a pad and a lead are registered in advance, a small region including the center line of the wire is set between the pad and the lead, the position of the center line of the wire is detected by repeatedly detecting the contour of the wire from within the small region, and a three-dimensional diagram of the wire is generated based on this.

In addition, Patent Document 2 describes that a wire is imaged with cameras from the left and right directions, and a three-dimensional diagram of the wire is generated from the two-dimensional image captured by each camera by pattern matching that uses connection information of the wire to a substrate and thickness information of the wire.

CITATION LIST

Patent Documents

Patent Document 1: Japanese Patent Application Laid-Open No. 10-54709
Patent Document 2: International Publication No. 2020/217970

SUMMARY OF INVENTION

Technical Problem

In recent years, there has been a demand for measuring the shapes of all wires that connect the electrodes of a semiconductor chip and the electrodes of a substrate. However, in the wire shape measurement methods described in Patent Documents 1 and 2, it is required to analyze the images of a large number of wires one by one to generate the three-dimensional diagram of the wire, making it difficult to measure the shapes of a large number of wires in a short time.

In addition, there has been a demand for detecting the shape of the wire with high accuracy. However, the information on the bonding position of the wire includes various errors such as distortion of the substrate, bonding error of the semiconductor die, and error in the bonding position due to wire bonding. Therefore, when generating a three-dimensional diagram based on the position and connection point information of the pad and the lead registered in advance as described in Patent Documents 1 and 2, errors increase and it is difficult to generate the three-dimensional diagram of the wire with high accuracy.

Thus, the disclosure aims to generate the three-dimensional diagram of a large number of objects including wires with high accuracy and to perform shape inspection on the objects with high accuracy in a short time.

Solution to Problem

The method of the disclosure is a method for generating a three-dimensional diagram of a three-dimensional object based on a vertical view image of the object imaged from vertically above and multiple oblique view images of the object imaged from multiple obliquely upper directions. The method includes: a vertical view diagram generation step which extracts a contour line in the vertical view image to generate a vertical view diagram of the object; a diagram conversion step which respectively converts the vertical view diagram into multiple oblique view diagrams based on a shape parameter including height information of the object, and repeatedly executes adjustment of the shape parameter and conversion of the vertical view diagram into each of the oblique view diagrams until each of the converted oblique view diagrams overlaps with each of the oblique view images; and a diagram synthesis step which synthesizes the generated vertical view diagram and each of the converted oblique view diagrams to generate the three-dimensional diagram of the object.

By repeatedly executing adjustment of the shape parameter and conversion of the vertical view diagram into each oblique view diagram until each converted oblique view diagram overlaps with each oblique view image, each oblique view diagram that accurately fits each oblique view image can be generated, making it possible to efficiently generate the three-dimensional diagram of the object with high accuracy.

In the method of the disclosure, the object may be a device composed of multiple components and multiple wires connecting between the components. The vertical view diagram generation step may extract each contour line of each component and each of the wires in the vertical view image to generate the vertical view diagram of the device. The shape parameter may be height of each component from a reference surface, inclination of a surface of each component, and a bending parameter of each of the wires.

Thus, it is possible to efficiently generate the three-dimensional diagram of the device composed of multiple components and multiple wires connecting between the components with high accuracy.

In the method of the disclosure, the vertical view diagram generation step may generate a contour line in the vertical view image drawn by a user as the vertical view diagram, and the diagram conversion step may convert the vertical view diagram into each of the oblique view diagrams based on the adjusted shape parameter input by the user.

Since the contour line of the vertical view image drawn by the user is generated as the vertical view diagram, it is possible to reliably generate the vertical view diagram even with the vertical view image that is difficult to process. In addition, since the shape parameter is adjusted through the input of the user, it is possible to generate the oblique view diagram that meets the intention of the user. Thus, it is possible to efficiently generate a three-dimensional diagram of the object that meets the intention of the user with high accuracy.

Further, in the method of the disclosure, the object may be a device composed of multiple components and multiple wires connecting between the components. The vertical view diagram generation step may generate each contour line of each component and each of the wires in the vertical view image drawn by the user as the vertical view diagram of the device, and the shape parameter may be height of each component from a reference surface, inclination of a surface of each component, and a bending parameter of each of the wires.

Thus, it is possible to efficiently generate a three-dimensional diagram of the device composed of multiple components and multiple wires connecting between the components with input of fewer parameters from the user with high accuracy.

In the method of the disclosure, each wire may have multiple bending points between a starting point and an ending point, the bending parameter may be a three-dimensional coordinate position of each of the bending points of each of the wires, and the three-dimensional coordinate position of each of the bending points may be a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

When connecting one component to another component with multiple wires, the rise and curved shape of each wire from the starting point are the same as each other, so it is possible to efficiently convert the vertical view diagram of the wire into the oblique view diagram using one bending parameter for multiple wires. Thus, it is possible to efficiently generate a three-dimensional diagram of the wire in a short time.

In the method of the disclosure, the three-dimensional coordinate position of each of the bending points may include a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

When connecting one component to another component with multiple wires, the position of the bending point on the ending point side of each wire is set at a position proportional to the total length of the wire. Therefore, by defining the ratio to the total length of the wire as the bending parameter, it is possible to define the position of the bending point on the ending point side of multiple wires. Then, it is possible to define the shapes of multiple wires with fewer shape parameters, easily adjust the shape parameters, and efficiently generate the oblique view diagram of each wire that accurately fits each oblique view image of each wire in a short time.

In the method of the disclosure, the vertical view diagram generation step may group the multiple wires into multiple groups composed of the wires having the starting points located on the same component, the ending points located on the same component, and the same thickness, and extract each contour line of each component and each of the wires in the vertical view image to generate the vertical view diagram of the device. The bending parameter may be composed of multiple group-specific bending parameters defined for each of the groups, and the diagram conversion step may respectively convert each vertical view diagram of each of the wires included in each group into multiple oblique view diagrams based on each of the group-specific bending parameters, and repeatedly execute adjustment of each of the group-specific bending parameters of each of the groups and conversion of each vertical view diagram of the wires included in each of the groups into the oblique view diagrams until each of the converted oblique view diagrams of each of the wires included in each of the groups overlaps with each of the oblique view images of each of the wires included in each of the groups.

In the method of the disclosure, the vertical view diagram generation step may group the multiple wires into multiple groups composed of the wires having the starting points located on the same component, the ending points located on the same component, and the same thickness, and extract each contour line of each component and each of the wires in the vertical view image to generate the vertical view diagram of the device. The bending parameter may be composed of multiple group-specific bending parameters defined for each of the groups, and the diagram conversion step may respectively convert each vertical view diagram of each of the wires included in each group into multiple oblique view diagrams based on each of the group-specific bending parameters, and then perform conversion of the vertical view diagram of each of the wires included in each of the groups into each oblique view diagram based on each adjusted group-specific bending parameter input by the user.

Wires having the starting points located on the same component, the ending points located on the same component, and the same thickness have similar wire shapes. Therefore, by grouping the wires, each oblique view diagram of each wire that fits each oblique view image of each wire can be generated with fewer bending parameters.

In the method of the disclosure, the multiple wires grouped in one group may respectively have multiple bending points between the starting point and the ending point. The group-specific bending parameter may be a three-dimensional coordinate position of each of the bending points that the wires grouped in one group have in common, and the three-dimensional coordinate position of each of the bending points may be a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

For wires having the starting points located on the same component, the ending points located on the same component, and the same thickness, the rise and curved shape from the starting point of each wire are the same as each other. Therefore, for wires included in one group, each oblique view diagram of each wire that fits each oblique view image of each wire can be generated using one group-specific bending parameter.

In the method of the disclosure, the three-dimensional coordinate position of each of the bending points may include a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

For wires having the starting points located on the same component, the ending points located on the same component, and the same thickness, the position of the bending point on the ending point side of each wire is set at a position proportional to the total length of the wire. Therefore, by defining the ratio to the total length of the wire as the bending parameter, it is possible to define the position of the bending point on the ending point side of multiple wires. Thus, it is possible to define the shapes of multiple wires included in one group with fewer shape parameters, easily adjust the shape parameters, and efficiently generate the oblique view diagram of each wire that accurately fits each oblique view image of each wire in a short time.

The three-dimensional diagram generation apparatus of the disclosure is an apparatus for generating a three-dimensional diagram of a three-dimensional object. The three-dimensional diagram generation apparatus includes: a controller that generates the three-dimensional diagram of the object based on an image obtained by imaging the object. The controller acquires a vertical view image of the object imaged from vertically above and multiple oblique view images of the object imaged from multiple obliquely upper directions, extracts a contour line in the vertical view image of the object to generate a vertical view diagram of the object, respectively converts the vertical view diagram into multiple oblique view diagrams based on a shape parameter including height information of the object stored in a storage part, and repeatedly executes adjustment of the shape parameter and conversion of the vertical view diagram into each of the oblique view diagrams until each of the converted oblique view diagrams overlaps with each of the oblique view images, and synthesizes the generated vertical view diagram and each of the oblique view diagrams overlapping with each of the oblique view images to generate the three-dimensional diagram.

By repeatedly executing adjustment of the shape parameter and conversion of the vertical view diagram into each oblique view diagram until each oblique view diagram overlaps with each oblique view image, each oblique view diagram that accurately fits each oblique view image can be generated, making it possible to efficiently generate the three-dimensional diagram of the object with high accuracy.

In the three-dimensional diagram generation apparatus of the disclosure, the object may be a device composed of multiple components and multiple wires connecting between the components. The controller may extract each contour line of each component and each of the wires in the vertical view image to generate the vertical view diagram of the device, and the shape parameter may be height of each component from a reference surface, inclination of a surface of each component, and a bending parameter of each of the wires.

Thus, it is possible to efficiently generate the three-dimensional diagram of the device composed of multiple components and multiple wires connecting between the components with high accuracy.

The three-dimensional diagram generation apparatus of the disclosure may include a display part that displays images and diagrams and an input part for a user to input data. The controller may repeatedly display the vertical view image of the object on the display part, and generate a contour line in the vertical view image drawn by the user by operating the input part as the vertical view diagram, and perform conversion of the vertical view diagram into each of the oblique view diagrams based on the adjusted shape parameter input from the input part by the user, and display each of the converted oblique view diagrams and each of the oblique view images on the display part by superimposing each of the converted oblique view diagrams and each of the oblique view images.

Since the contour line of the vertical view image drawn by user on the display part is generated as the vertical view diagram, it is possible to reliably generate the vertical view diagram even with the vertical view image that is difficult to process. In addition, since the shape parameter is adjusted through the input of the user and each converted oblique view diagram and each oblique view image are superimposed to be displayed on the display part, it is possible for the user to adjust the shape parameter while comparing the converted oblique view diagram with the oblique view image until they overlap, and generate the oblique view diagram that meets the intention of the user. Thus, it is possible to efficiently generate the three-dimensional diagram of the object that meets the intention of the user with accuracy.

In the three-dimensional diagram generation apparatus of the disclosure, the object may be a device composed of multiple components and multiple wires connecting between the components. The controller may generate each contour line of each component and each of the wires in the vertical view image drawn by the user by operating the input part as the vertical view diagram of the device, and the shape parameter may be height of each component from a reference surface, inclination of a surface of each component, and a bending parameter of each of the wires.

Thus, it is possible to efficiently generate the three-dimensional diagram of the device composed of multiple components and multiple wires connecting between the components with input of fewer shape parameters from user with high accuracy.

In the three-dimensional diagram generation apparatus of the disclosure, each of the wires may have multiple bending points between a starting point and an ending point. The bending parameter may be a three-dimensional coordinate position of each of the bending points of each of the wires, and the three-dimensional coordinate position of each of the bending points may be a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

When connecting one component to another component with multiple wires, the rise and curved shape of each wire from the starting point are the same as each other, so it is possible to convert the vertical view diagram of the wire into the oblique view diagram using one bending parameter for multiple wires. Thus, it is possible to efficiently generate a three-dimensional diagram of the wire with input of fewer parameters from the user.

In the three-dimensional diagram generation apparatus of the disclosure, the three-dimensional coordinate position of each of the bending points may include a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

For wires having the starting points located on the same component, the ending points located on the same component, and the same thickness, the position of the bending point on the ending point side of each wire is set at a position proportional to the total length of the wire. Therefore, by defining the ratio to the total length of the wire as the bending parameter, it is possible to define the position of the bending point on the ending point side of multiple wires having different total lengths. Thus, it is possible to define the shapes of multiple wires included in one group with input of fewer shape parameters from the user.

In the three-dimensional diagram generation apparatus of the disclosure, the controller may group the multiple wires into multiple groups composed of the wires having the starting points located on the same component, the ending points located on the same component, and the same thickness, and extract the contour line in the vertical view image to generate the vertical view diagram of the object. The bending parameter stored in the storage part may be composed of multiple group-specific bending parameters defined for each of the groups, and the controller may respectively convert each vertical view diagram of each of the wires included in each group into multiple oblique view diagrams based on each of the group-specific bending parameters stored in the storage part, and repeatedly execute adjustment of each of the group-specific bending parameters of each of the groups and conversion of each vertical view diagram of the wires included in each of the groups into the oblique view diagrams until each of the converted oblique view diagrams of each of the wires included in each of the groups overlaps with each of the oblique view images of each of the wires included in each of the groups.

In the three-dimensional diagram generation apparatus of the disclosure, the controller may group the multiple wires into multiple groups composed of the wires having the starting points located on the same component, the ending points located on the same component, and the same thickness, and generate each contour line of each component and each of the wires in the vertical view image drawn by the user by operating the input part as the vertical view diagram of the device. The bending parameter stored in the storage part may be composed of multiple group-specific bending parameters defined for each of the groups, and the controller may repeatedly respectively convert each vertical view diagram of each of the wires included in each of the groups into multiple oblique view diagrams based on each of the group-specific bending parameters, and then perform conversion of each vertical view diagram of each of the wires included in each of the groups into each of the oblique view diagrams based on each of the adjusted group-specific bending parameters input from the input part by the user, and display each of the converted oblique view diagrams and each of the oblique view images on the display part by superimposing each of the converted oblique view diagrams and each of the oblique view images.

Wires having the starting points located on the same component, the ending points located on the same component, and the same thickness have similar wire shapes. Therefore, by grouping the wires, each oblique view diagram of each wire that fits each oblique view image of each wire can be generated with input of fewer bending parameters from the user.

In the three-dimensional diagram generation apparatus of the disclosure, the multiple wires grouped in one group may respectively have multiple bending points between the starting point and the ending point. The group-specific bending parameter may be a three-dimensional coordinate position of each of the bending points that the wires grouped in one group have in common, and the three-dimensional coordinate position of each of the bending points may be a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

For wires having the starting points located on the same component, the ending points located on the same component, and the same thickness, the rise and curved shape from the starting point of each wire are the same as each other. Therefore, for wires included in one group, each oblique view diagram of each wire that fits each oblique view image of each wire can be generated by the user adjusting one group-specific bending parameter.

In the three-dimensional diagram generation apparatus of the disclosure, the three-dimensional coordinate position of each of the bending points may include a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

Thus, each oblique view diagram of each wire that fits each oblique view image of each wire can be generated with input of fewer parameters from the user.

The three-dimensional shape inspection apparatus of the disclosure is an apparatus for performing shape inspection on a three-dimensional object. The three-dimensional shape inspection apparatus includes: a master three-dimensional diagram generation part that generates a master three-dimensional diagram of a standard product of the object; and an inspection part that compares a three-dimensional diagram of the object with the master three-dimensional diagram to perform inspection on the object. The master three-dimensional diagram generation part acquires a standard vertical view image of the standard product imaged from vertically above and multiple standard oblique view images of the standard product imaged from multiple obliquely upper directions, extracts a contour line in the standard vertical view image of the standard product to generate a standard vertical view diagram of the standard product, respectively converts the standard vertical view diagram into multiple standard oblique view diagrams based on a shape parameter including height information of the standard product stored in a storage part, and repeatedly executes adjustment of the shape parameter and conversion of the standard vertical view diagram into each of the standard oblique view diagrams until each of the converted standard oblique view diagrams overlaps with each of the standard oblique view images, and synthesizes the generated standard vertical view diagram and each of the standard oblique view diagrams overlapping with each of the standard oblique view images to generate the master three-dimensional diagram. The inspection part acquires a vertical view image of the object imaged from vertically above and multiple oblique view images of the object imaged from multiple obliquely upper directions, extracts a contour line from the vertical view image while referring to the master three-dimensional diagram to generate a vertical view diagram of the object, respectively extracts a contour line from each of the oblique view images while referring to the master three-dimensional diagram to generate multiple oblique view diagrams of the object, synthesizes the generated vertical view diagram and each of the oblique view diagrams to generate the three-dimensional diagram of the object, and compares the generated three-dimensional diagram of the object with the master three-dimensional diagram to perform inspection on a three-dimensional shape of the object.

Thus, by repeatedly executing adjustment of the shape parameter and conversion of the standard vertical view diagram into each standard oblique view diagram until each standard oblique view diagram overlaps with each standard oblique view image, it is possible to generate each standard oblique view diagram that accurately fits each standard oblique view image, making it possible to generate a master three-dimensional diagram of the object with high accuracy. Then, since the three-dimensional diagram of the object is generated with reference to the highly accurate master three-dimensional diagram and compared with the master three-dimensional diagram to perform shape inspection on the object, it is possible to inspect the shapes of many objects including wires with high accuracy in a short time.

In the three-dimensional shape inspection apparatus of the disclosure, the object and the standard product may be devices composed of multiple components and multiple wires connecting between the components. The master three-dimensional diagram generation part may extract each contour line of each component and each of the wires in the standard vertical view image to generate the standard vertical view diagram of the device, and the shape parameter may be height of each component from a reference surface, inclination of a surface of each component, and a bending parameter of each of the wires.

Thus, it is possible to generate a three-dimensional diagram of the device composed of multiple components and multiple wires connecting between the components with high accuracy, and it is possible to inspect the shapes of many objects including wires with high accuracy in a short time.

The three-dimensional shape inspection apparatus of the disclosure may include a display part that displays images and diagrams; and an input part for a user to input data. The master three-dimensional diagram generation part may repeatedly display the standard vertical view image of the standard product on the display part, and generate a contour line in the standard vertical view image drawn by the user by operating the input part as the standard vertical view diagram, and perform conversion of the standard vertical view diagram into each of the standard oblique view diagrams based on the adjusted shape parameter input from the input part by the user, and display each of the converted standard oblique view diagrams and each of the standard oblique view images on the display part by superimposing each of the converted standard oblique view diagrams and each of the standard oblique view images.

In the three-dimensional shape inspection apparatus of the disclosure, the object and the standard product may be devices composed of multiple components and multiple wires connecting between the components. The master three-dimensional diagram generation part may generate each contour line of each component and each of the wires in the standard vertical view image drawn by the user by operating the input part as the standard vertical view diagram of the device, and the shape parameter may be height of each component from a reference surface, inclination of a surface of each component, and a bending parameter of each of the wires.

In the three-dimensional shape inspection apparatus of the disclosure, each of the wires may have multiple bending points between a starting point and an ending point. The bending parameter may be a three-dimensional coordinate position of each of the bending points of each of the wires, and the three-dimensional coordinate position of each of the bending points may be a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

In the three-dimensional shape inspection apparatus of the disclosure, the three-dimensional coordinate position of each of the bending points may include a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

In the three-dimensional shape inspection apparatus of the disclosure, the master three-dimensional diagram generation part may group the multiple wires into multiple groups composed of the wires having the starting points located on the same component, the ending points located on the same component, and the same thickness, and extract the contour line in the standard vertical view image of the standard product to generate the standard vertical view diagram of the standard product. The bending parameter stored in the storage part may be composed of multiple group-specific bending parameters defined for each of the groups. The master three-dimensional diagram generation part may respectively convert each standard vertical view diagram of each of the wires included in each group into multiple standard oblique view diagrams based on each of the group-specific bending parameters, and repeatedly execute adjustment of each of the group-specific bending parameters of each of the groups and conversion of each standard vertical view diagram of the wires included in each of the groups into the standard oblique view diagrams until each of the converted standard oblique view diagrams of each of the wires included in each of the groups overlaps with each of the standard oblique view images of each of the wires included in each of the groups.

In the three-dimensional shape inspection apparatus of the disclosure, the master three-dimensional diagram generation part may group the multiple wires into multiple groups composed of the wires having the starting points located on the same component, the ending points located on the same component, and the same thickness, and generate each contour line of each component and each of the wires in the standard vertical view image drawn by the user by operating the input part as the vertical view diagram of the standard product. The bending parameter stored in the storage part may be composed of multiple group-specific bending parameters defined for each of the groups. The master three-dimensional diagram generation part may repeatedly respectively convert each standard vertical view diagram of each of the wires included in each of the groups into multiple standard oblique view diagrams based on each of the group-specific bending parameters, and then perform conversion of each standard vertical view diagram of each of the wires included in each of the groups into each of the standard oblique view diagrams based on each of the adjusted group-specific bending parameters input from the input part by the user, and display each of the converted standard oblique view diagrams and each of the standard oblique view images on the display part by superimposing each of the converted standard oblique view diagrams and each of the standard oblique view images.

In the three-dimensional shape inspection apparatus of the disclosure, the multiple wires grouped in one group may respectively have multiple bending points between the starting point and the ending point. The group-specific bending parameter may be a three-dimensional coordinate position of each of the bending points that the wires grouped in one group have in common, and the three-dimensional coordinate position of each of the bending points may be a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

In the three-dimensional shape inspection apparatus of the disclosure, the three-dimensional coordinate position of each of the bending points may include a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

Effects of Invention

The disclosure is capable of generating the three-dimensional diagram of a large number of objects including wires with high accuracy and performing shape inspection on the objects with high accuracy in a short time.

BRIEF DESCRIPTION OF DRAWINGS

FIG. 6 is a diagram showing the data structure of the component shape parameter database shown in FIG. 5.

FIG. 7 is a diagram showing the data structure of the bending parameter database shown in FIG. 5.

FIG. 8 is a diagram showing the data structure of the wire-specific bending parameter calculated based on the bending parameter data shown in FIG. 7.

FIG. 22 is a diagram showing the data structure of the wire grouping database shown in FIG. 21.

FIG. 23 is a diagram showing the data structure of the component shape parameter database shown in FIG. 21.

FIG. 24 is a diagram showing the data structure of the group-specific bending parameter database shown in FIG. 21.

FIG. 25 is a diagram showing the data structure of the wire-specific bending parameter of each wire calculated based on the group-specific bending parameter data shown in FIG. 21.

DESCRIPTION OF EMBODIMENTS

Figure 1:
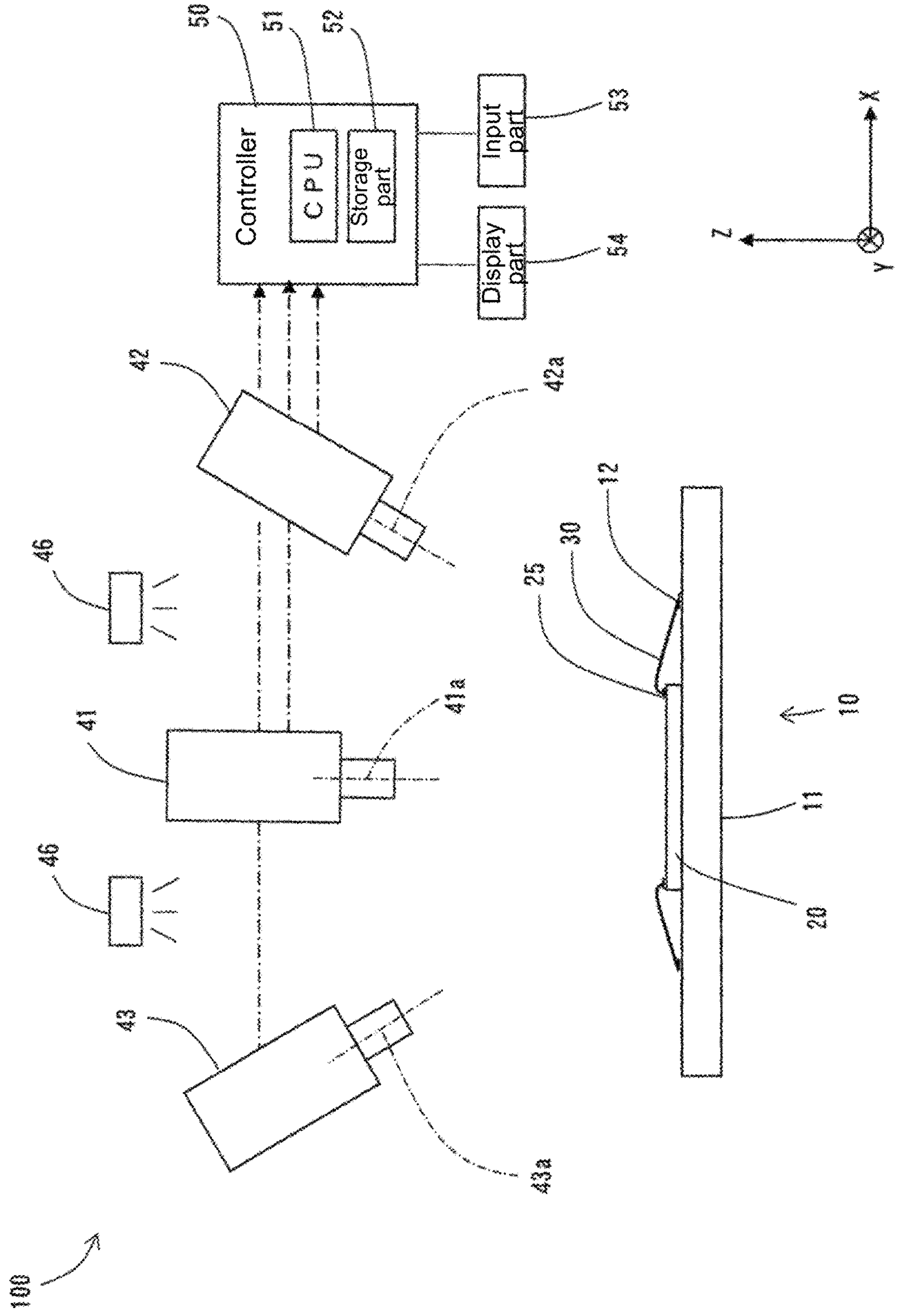
FIG. 1 is an elevation view showing the system configuration of the three-dimensional diagram generation apparatus of an embodiment.

A three-dimensional diagram generation apparatus 100 of an embodiment will be described below with reference to the drawings. The three-dimensional diagram generation apparatus 100 is an apparatus that generates a three-dimensional diagram of an object based on a captured image obtained by imaging a three-dimensional object. In the following description, the three-dimensional diagram generation apparatus 100 is described as generating a three-dimensional diagram of a semiconductor device 10, which is a three-dimensional object, but the three-dimensional diagram generation apparatus 100 is also capable of generating a three-dimensional diagram of a three-dimensional object other than the semiconductor device 10. Here, the semiconductor device 10 is described as being composed of a lead frame 11, a semiconductor chip 20 attached to the lead frame 11, and a wire 30 that connects a pad 25 of the semiconductor chip 20 and a lead 12 of the lead frame 11 as shown in FIG. 1 and FIG. 2, but the semiconductor device 10 may have other configurations.

Figure 2:
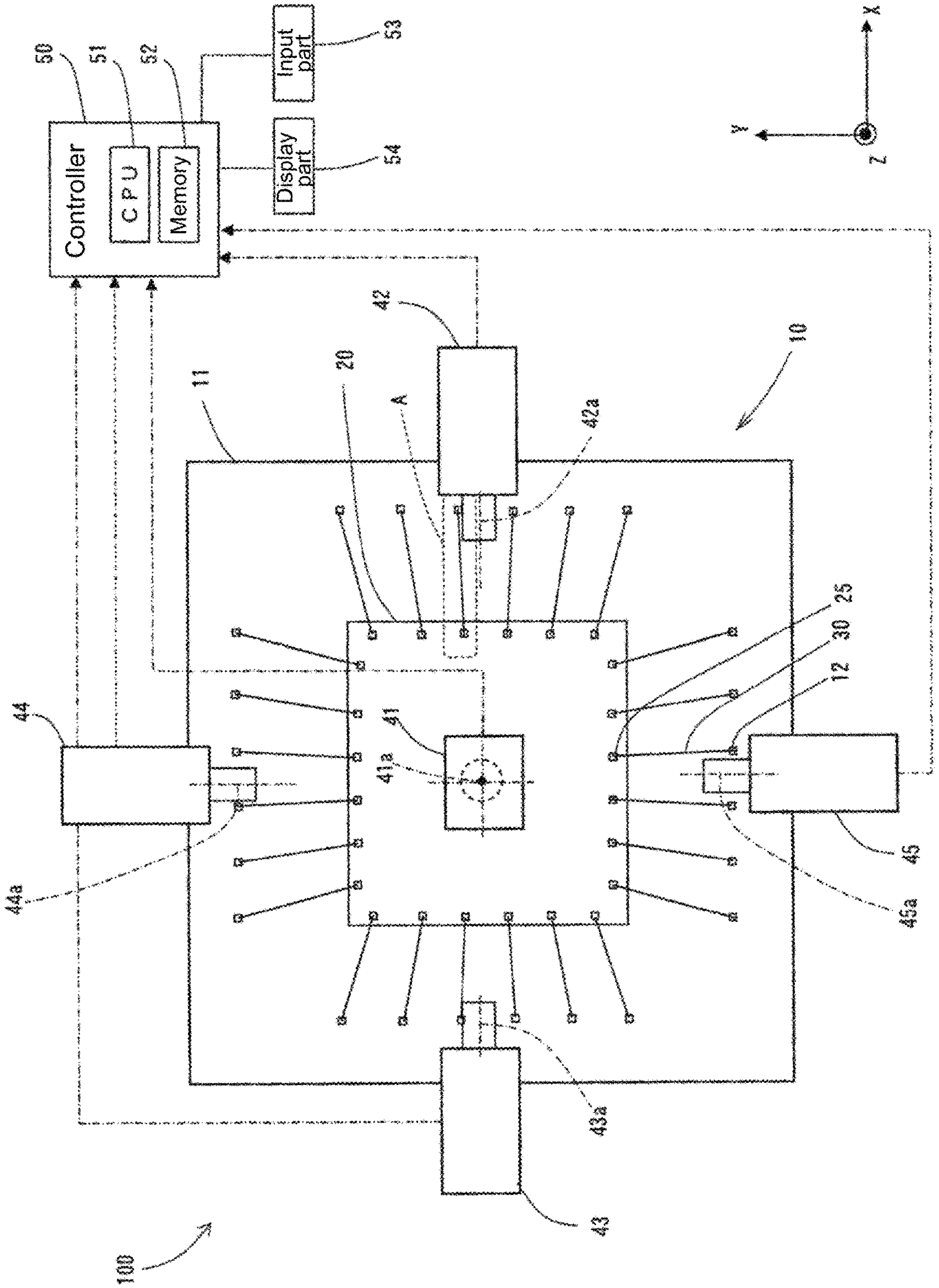
FIG. 2 is a plan view showing the system configuration of the three-dimensional diagram generation apparatus of an embodiment.

As shown in FIG. 1 and FIG. 2, the three-dimensional diagram generation apparatus 100 includes one vertical view camera 41, four oblique view cameras 42 to 45, a controller 50, an input part 53, and a display part 54. The three-dimensional diagram generation apparatus 100 also includes an illumination device 46 that illuminates the semiconductor device 10. In the following description, the X direction and the Y direction are directions orthogonal to each other in the horizontal plane, and the Z direction is described as a vertical direction. The three-dimensional diagram generation apparatus 100 of the embodiment is described as including four oblique view cameras 42 to 45, but not limited thereto. Two or more oblique view cameras suffice, and there may be four or more oblique view cameras.

Figure 10:
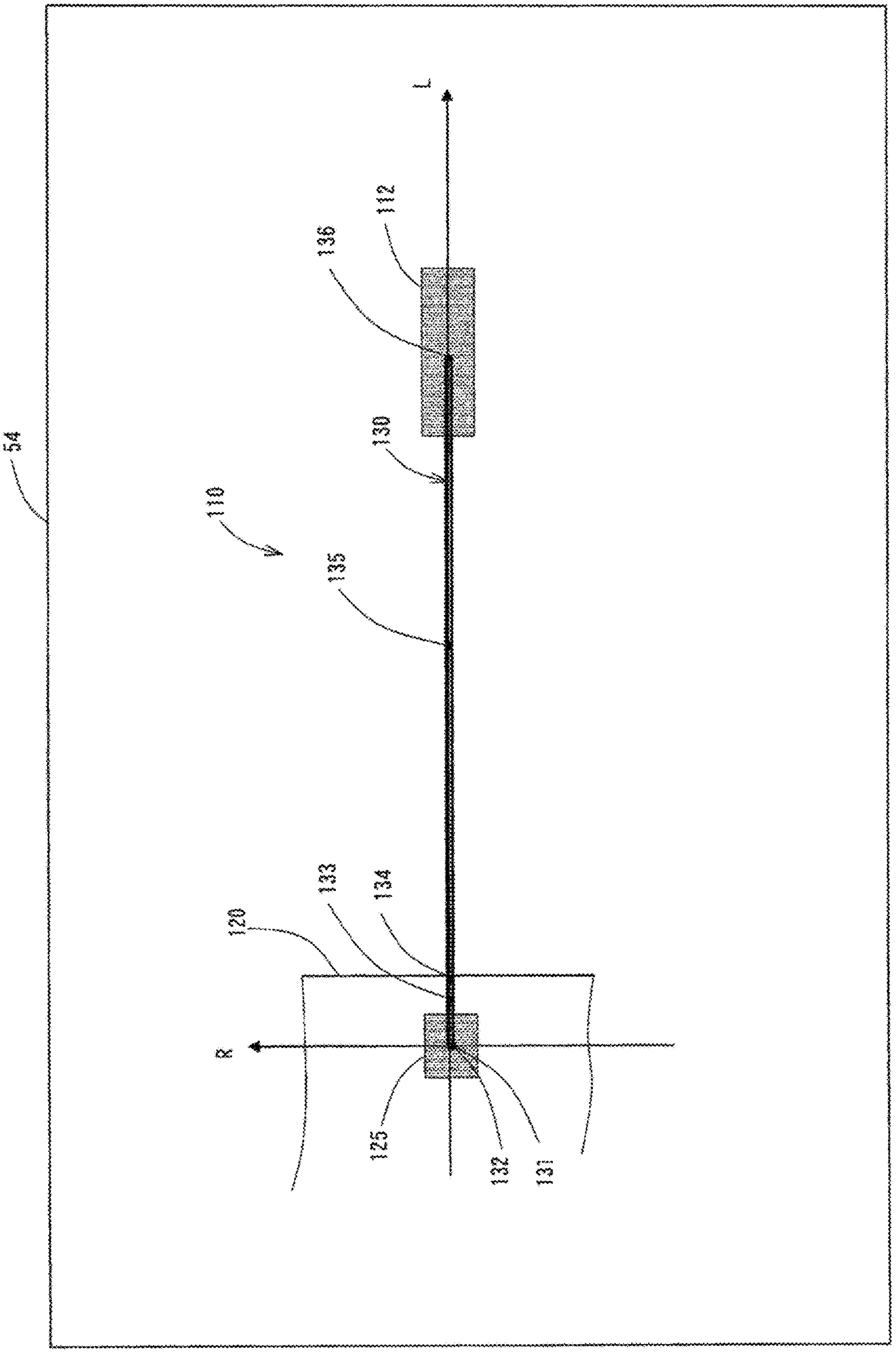
FIG. 10 is a view showing a state where the display part of the three-dimensional diagram generation apparatus of an embodiment displays the vertical view image of the semiconductor device captured by the vertical view camera.
Figure 11:
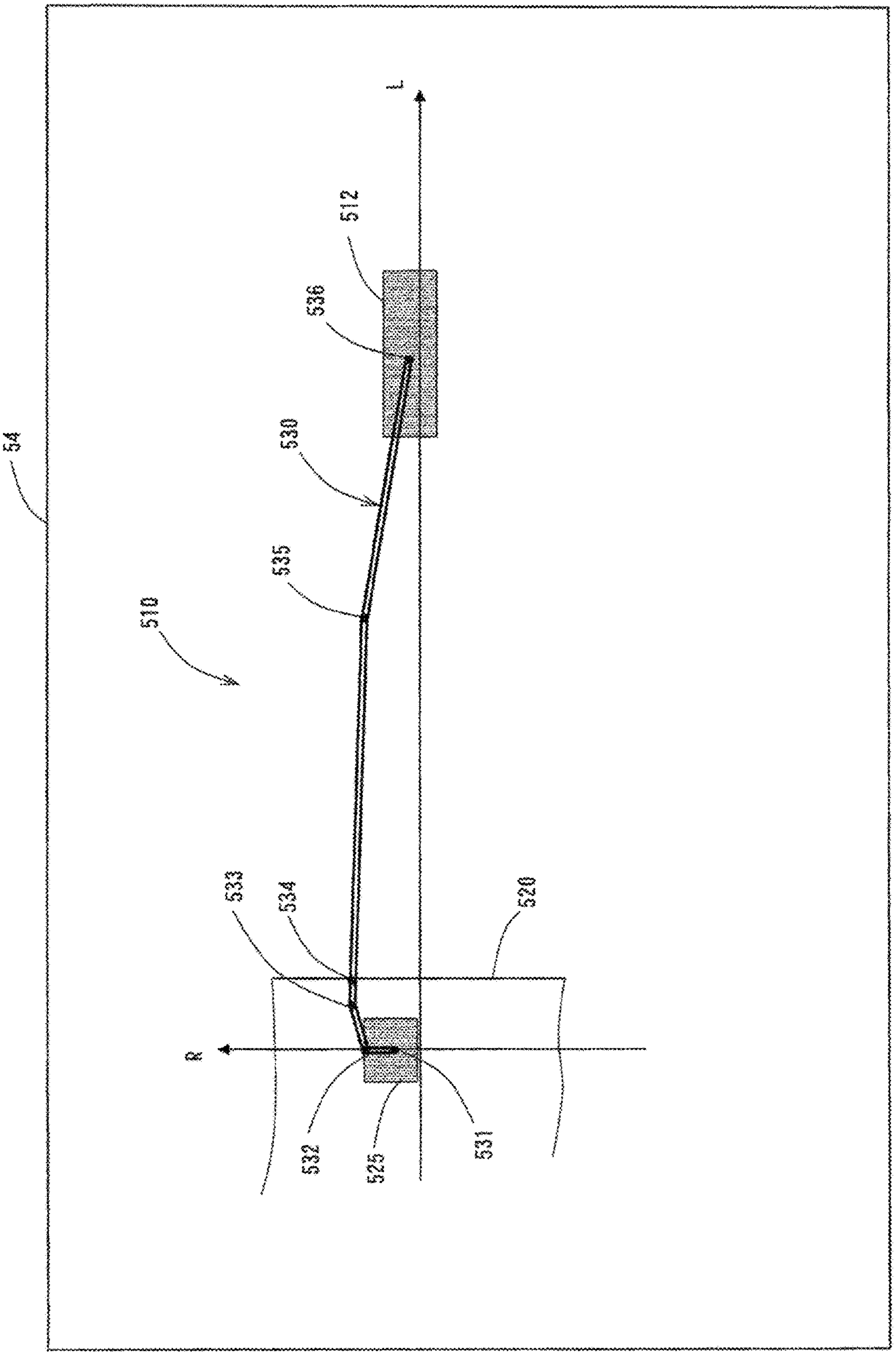
FIG. 11 is a view showing a state where the display part of the three-dimensional diagram generation apparatus of an embodiment displays the oblique view image of the semiconductor device captured by the oblique view camera.

As shown in FIG. 1 and FIG. 2, the vertical view camera 41 is arranged directly above the semiconductor device 10 so that an optical axis 41*a* extends in the Z direction vertically to a surface of the semiconductor device 10, and acquires a vertical view image 110 as shown in FIG. 10 by imaging the semiconductor device 10 from vertically above. The oblique view cameras 42 and 43 are arranged so that the optical axes 42*a* and 43*a* extend in the X direction, and are arranged so as to image the semiconductor device 10 from an obliquely upper direction in the X direction. The oblique view cameras 44 and 45 are arranged so that the optical axes 44*a* and 45*a* extend in the Y direction, and are arranged so as to image the semiconductor device 10 from an obliquely upper direction in the Y direction. The oblique view cameras 42 to 45 acquire multiple oblique view images 510 as shown in FIG. 11 by imaging the semiconductor device 10 from multiple obliquely upper directions. The image data acquired by the vertical view camera 41 and the oblique view cameras 42 to 45 is input to the controller 50. The illumination device 46 may be, for example, a visible light illumination device that emits visible light including multiple wavelengths such as an LED or a lamp.

The controller 50 is a computer that includes therein a CPU 51 which is a processor that performs information processing, and a storage part 52 which stores data, programs, etc. The controller 50 generates a three-dimensional diagram of the semiconductor device 10 based on the vertical view image 110 acquired by the vertical view camera 41 and the oblique view images 510 acquired by the oblique view cameras 42 to 45. The detailed configuration of the controller 50 will be described later with reference to FIG. 5. The input part 53 for the user to input data to the controller 50 is connected to the controller 50. Further, the display part 54 for displaying images and diagrams is connected to the controller 50. The input part 53 may be composed of a keyboard, a mouse, or the like, for example. The display part 54 may be composed of a display, for example.

Next, the detailed structure of the wire 30 of the semiconductor device 10 will be described with reference to FIG. 3 and FIG. 4. For the purpose of description, the pad 25 of the semiconductor chip 20 and the lead 12 of the lead frame 11 protrude from the surfaces of the semiconductor chip 20 and the lead frame 11, but not limited thereto. The pad 25 and the lead 12 may be on the same surface as the surfaces of the semiconductor chip 20 and the lead frame 11, or may be recessed from the surfaces.

Figure 3:
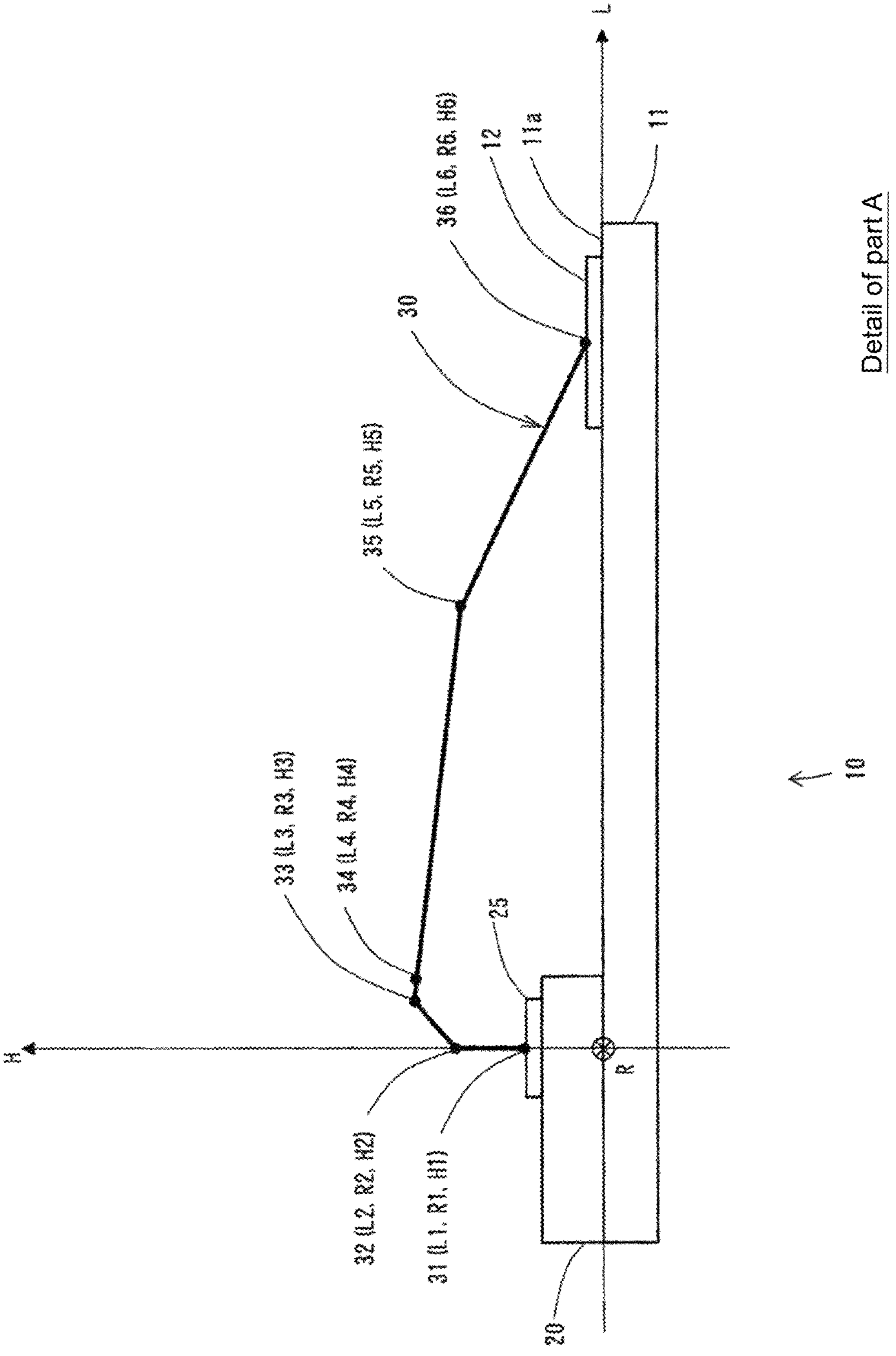
FIG. 3 is an elevation view showing the semiconductor device, which is a three-dimensional object, and is a detailed elevation view of part A shown in FIG. 2.

In the example shown in FIG. 3, the wire 30 connects the pad 25 of the semiconductor chip 20 and the lead 12 of the lead frame 11. After the wire 30 is bonded onto the pad 25, a plurality of bent portions are formed, and then the wire 30 is looped toward the lead 12 and bonded to the lead 12. Thus, the wire 30 has a starting point 31 on the pad 25, a first bending point 32 to a third bending point 34 located near the pad 25, a fourth bending point 35 on the ending point side, and an ending point 36 on the lead 12. In the following description, the wire 30 is described as having a bent line shape connecting the starting point 31, the first bending point 32 to the fourth bending point 35, and the ending point 36. The positions of the starting point 31, the first bending point 32 to the fourth bending point 35, and the ending point 36 are represented by a combination of longitudinal direction coordinate position Ln, lateral direction coordinate position Rn, and height direction coordinate position Hn in the LRH coordinate system, which is composed of a longitudinal direction axis L extending from the starting point 31 to the ending point 36 of the wire 30 in the plane of an upper surface 11*a* of the lead frame 11, which is the reference surface, a lateral direction axis R extending in a direction orthogonal to the longitudinal direction axis L from the starting point 31 of the wire 30 in the plane of the upper surface 11*a* of the lead frame 11, and a height direction axis H extending in the vertical direction with respect to the upper surface 11*a* of the lead frame 11 through the starting point 31. Here, n is a natural number, and the combination of longitudinal direction coordinate position Ln, lateral direction coordinate position Rn, and height direction coordinate position Hn in the LRH coordinate system constitutes a three-dimensional coordinate position.

Figure 4:
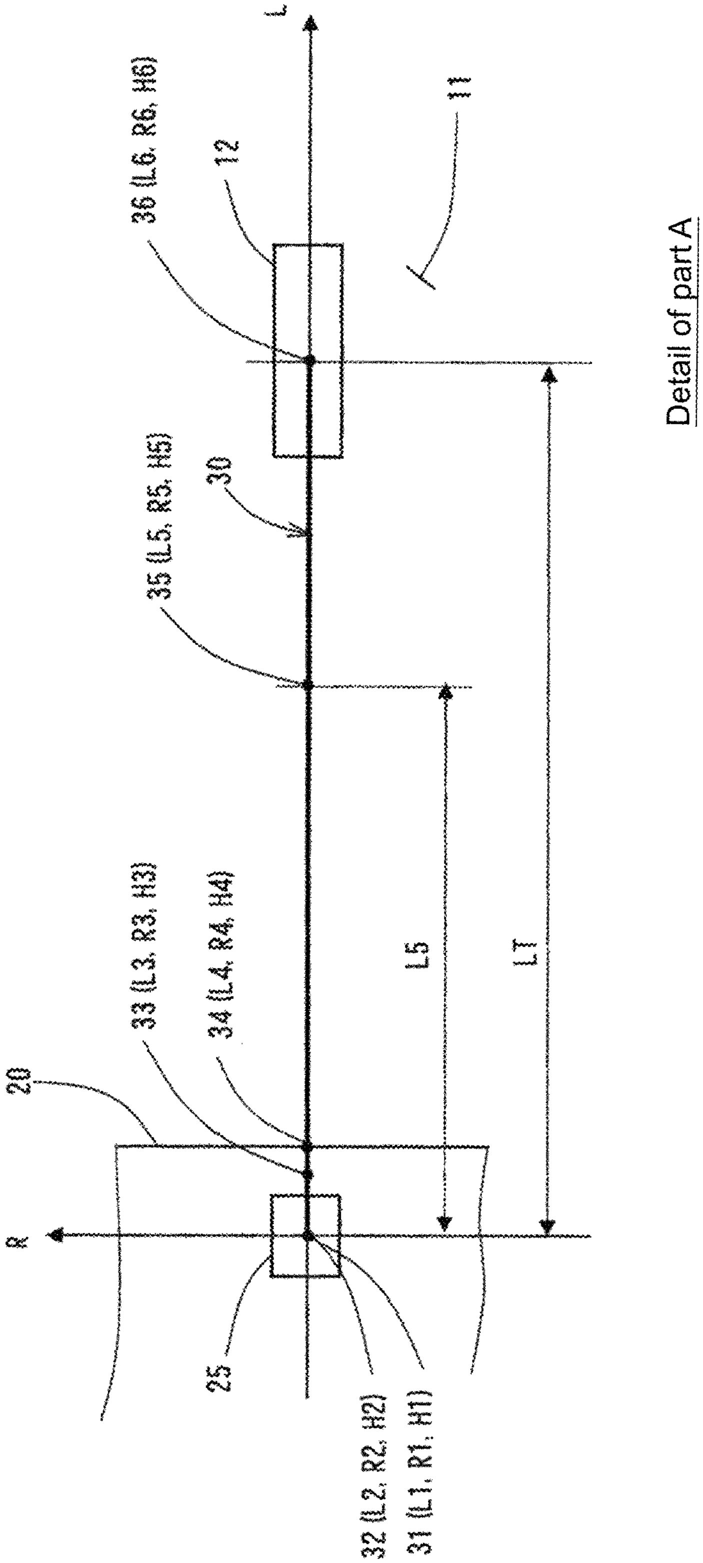
FIG. 4 is a plan view showing the semiconductor device, which is a three-dimensional object, and is a detailed plan view of part A shown in FIG. 2.

When the position of the starting point 31 is shown by the LRH coordinate system, as shown in FIG. 3 and FIG. 4, the coordinate position of the starting point 31 is represented by (L1, R1, H1). Similarly, the coordinate positions of the first bending point 32 to the fourth bending point 35 are represented by (L2, R2, H2), (L3, R3, H3), (L4, R4, H4), and (L5, R5, H5), respectively. The coordinate position of the ending point 36 is represented by (L6, R6, H6). As shown in FIG. 4, the total length of the wire 30 along the longitudinal direction axis L from the starting point 31 to the ending point 36 is a wire total length LT. In addition, the length along the longitudinal direction axis L from the starting point 31 to the fourth bending point 35 is a length L5.

Figure 5:
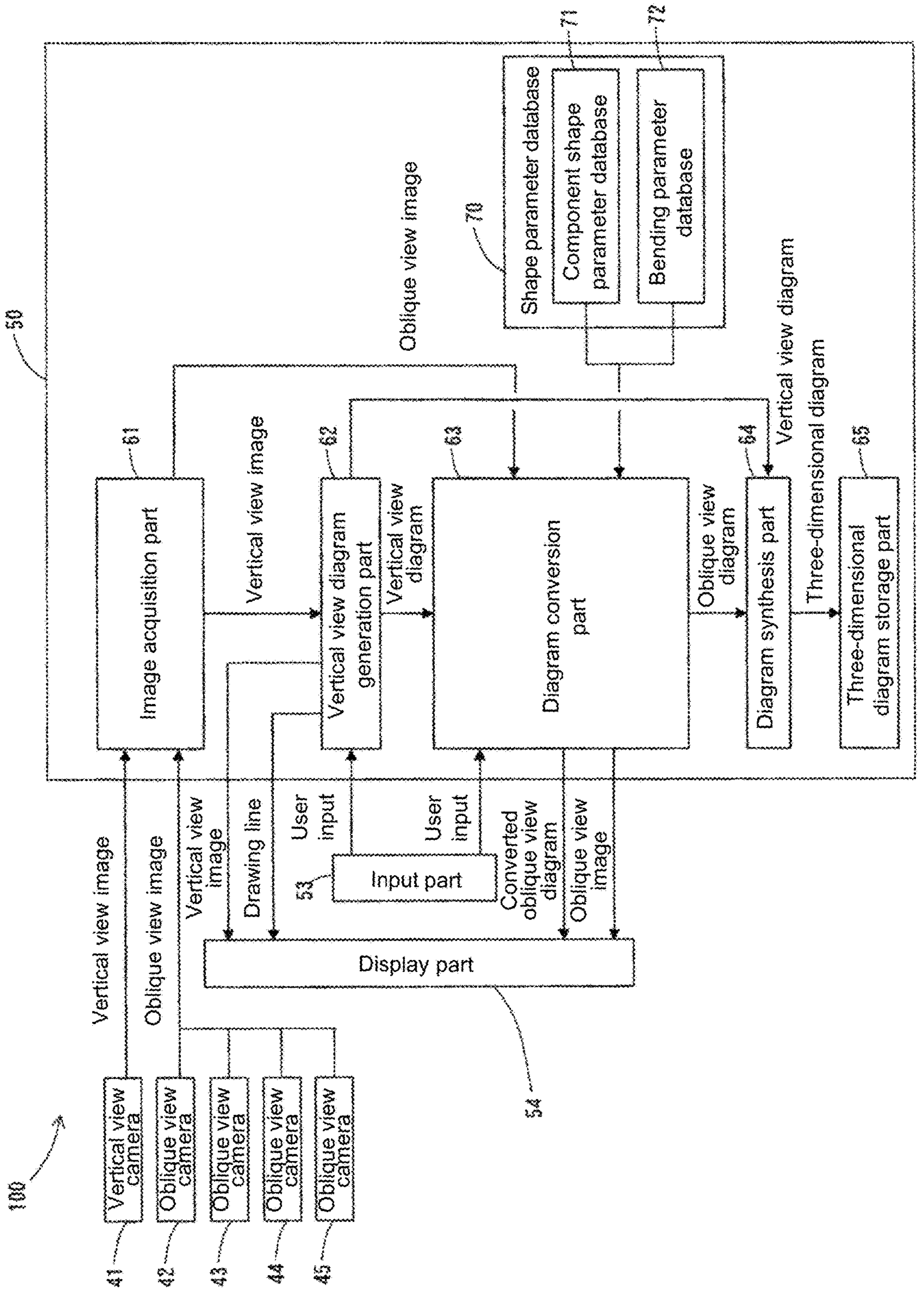
FIG. 5 is a functional block diagram showing the configuration of the three-dimensional diagram generation apparatus of an embodiment.

Next, the controller 50 of the three-dimensional diagram generation apparatus 100 of the embodiment will be described in detail with reference to FIG. 5. As shown in FIG. 5, the controller 50 of the three-dimensional diagram generation apparatus 100 includes an image acquisition part 61, a vertical view diagram generation part 62, a diagram conversion part 63, a diagram synthesis part 64, a three-dimensional diagram storage part 65, and a shape parameter database 70.

The image acquisition part 61 is connected to the vertical view camera 41 and the oblique view cameras 42 to 45, and is input with the vertical view image 110 acquired by the vertical view camera 41 and multiple oblique view images 510 acquired by the oblique view cameras 42 to 45. The image acquisition part 61 outputs the vertical view image 110 to the vertical view diagram generation part 62 and outputs the oblique view images 510 to the diagram conversion part 63.

Figure 12:
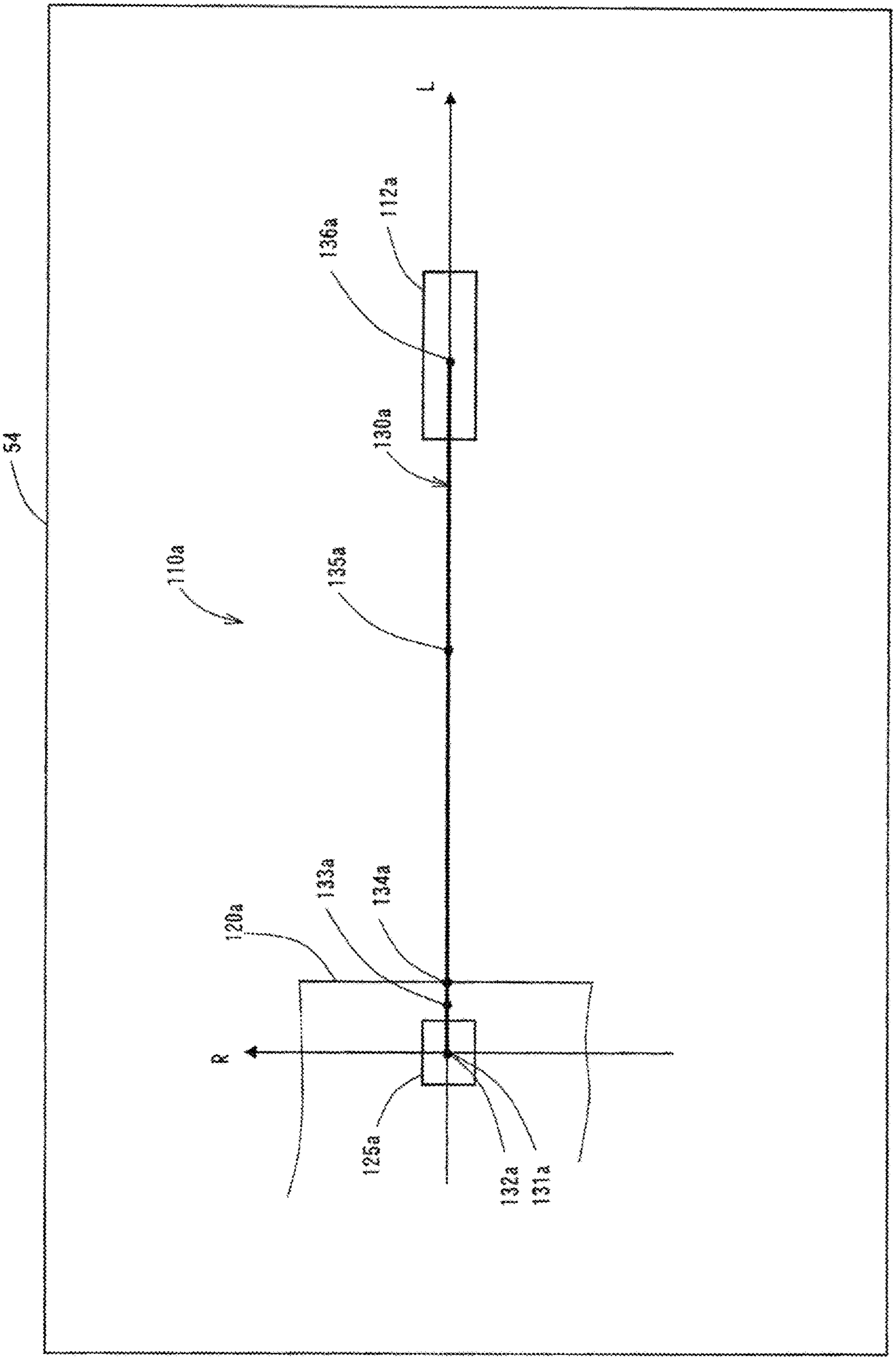
FIG. 12 is a view of the display part of the three-dimensional diagram generation apparatus of an embodiment displaying the vertical view diagram that draws the contour line of the vertical view image of the semiconductor device captured by the vertical view camera.

The input part 53 and the display part 54 are connected to the vertical view diagram generation part 62. The vertical view diagram generation part 62 displays the vertical view image 110 input from the image acquisition part 61 on the display part 54. Further, the vertical view diagram generation part 62 displays a drawing line of a contour line in the vertical view image 110 drawn by the user by operating the input part 53 on the display part 54. Then, the contour line in the vertical view image 110 input by the user is generated as a vertical view diagram 110*a* shown in FIG. 12 and output to the diagram conversion part 63 and the diagram synthesis part 64.

Figure 16:
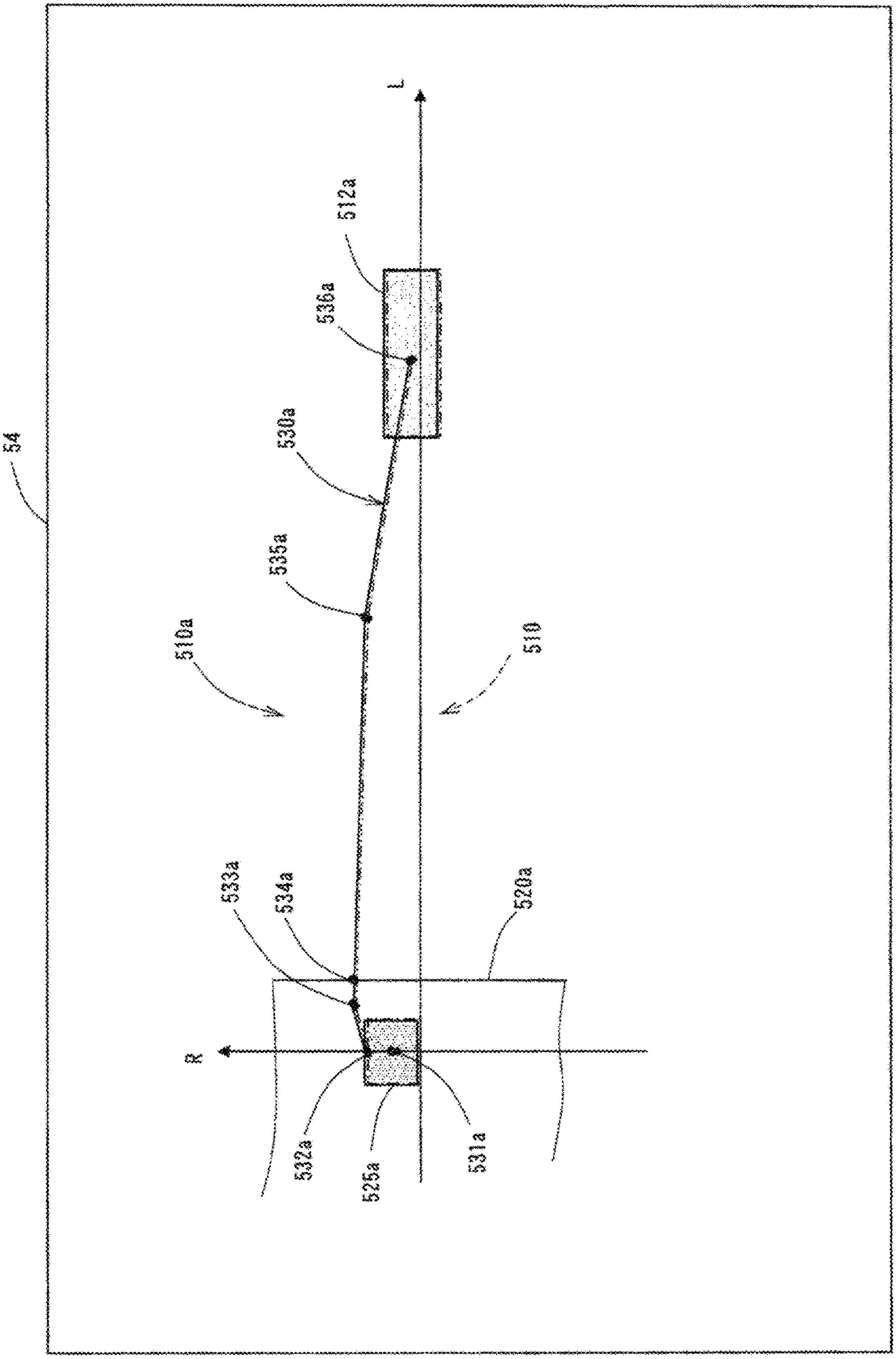
FIG. 16 is a view of the display part of the three-dimensional diagram generation apparatus of an embodiment displaying the oblique view diagram obtained by converting the vertical view diagram shown in FIG. 12 using the adjusted shape parameter so as to overlap with the oblique view image shown in FIG. 11.

The diagram conversion part 63 converts the vertical view diagram 110*a* input from the vertical view diagram generation part 62 into an oblique view diagram 510*a* based on the shape parameters stored in the shape parameter database 70, and superimposes the converted oblique view diagram 510*a* and the oblique view image 510 input from the image acquisition part 61 to be displayed on the display part 54. In addition, the diagram conversion part 63 repeatedly converts the vertical view diagram 110*a* input from the vertical view diagram generation part 62 into the oblique view diagram 510*a* based on the adjusted shape parameters input from the input part 53 by the user, and superimposes the converted oblique view diagram 510*a* and the oblique view image 510 input from the image acquisition part 61 to be displayed on the display part 54 until the user approves. The diagram conversion part 63 outputs the oblique view diagram 510*a* approved by the user as shown in FIG. 16 to the diagram synthesis part 64.

The diagram synthesis part 64 generates a three-dimensional diagram of the semiconductor device 10 by synthesizing the vertical view diagram 110*a* input from the vertical view diagram generation part 62 and the oblique view diagram 510*a* input from the diagram conversion part 63. The three-dimensional diagram is composed of a set of a large number of points arranged along the diagram connecting the starting point 31, the first bending point 32 to the fourth bending point 35, and the ending point 36 of the wire 30, and a set of a large number of points arranged along the contour lines of the pad 25 and the lead 12, and the three-dimensional diagram includes the positional information of each of these points. The positional information is, for example, the coordinate position defined by an XYZ coordinate system shown in FIG. 1 and FIG. 2. The diagram synthesis part 64 stores the generated three-dimensional diagram in the three-dimensional diagram storage part 65.

The shape parameter database 70 is a database that stores various parameters including the height information of the semiconductor device 10, and includes a component shape parameter database 71 and a bending parameter database 72.

As shown in FIG. 6, the component shape parameter database 71 is a database that stores the heights of the lead frame 11, the lead 12, the semiconductor chip 20, and the pad 25, which are components other than the wire 30 constituting the semiconductor device 10, and the inclination of the surface. The reference surface shown in FIG. 6 is the upper surface 11*a* of the lead frame 11 shown in FIG. 3. Thus, the height Z from the reference surface of the lead frame 11 is 0. In addition, the surface of the lead 12, the surface of the semiconductor chip 20, and the surface of the pad 25 are respectively 10 μm, 200 μm, and 210 μm higher than the upper surface 11*a* of the lead frame 11. Further, the inclination of the surface of each component is represented by a combination of X direction inclination XT, Y direction inclination YR, and Z direction inclination ZR.

The bending parameter database 72 shown in FIG. 7 is a database that stores the combinations of longitudinal direction coordinate position Ln, lateral direction coordinate position Rn, and height direction coordinate position Hn in the LRH coordinate system of the starting point 31, the first bending point 32 to the fourth bending point 35, and the ending point 36 of the wire 30 shown in FIG. 3 and FIG. 4, and a combination of proportional longitudinal direction coordinate position LPn, proportional lateral direction coordinate position RPn, and proportional height direction coordinate position Hpn, which will be described later, in association with each other. Here, the combination of longitudinal direction coordinate position Ln, lateral direction coordinate position Rn, and height direction coordinate position Hn constitutes a three-dimensional coordinate position, and the combination of proportional longitudinal direction coordinate position LPn, proportional lateral direction coordinate position RPn, and proportional height direction coordinate position Hpn constitutes a three-dimensional proportional coordinate position.

The proportional longitudinal direction coordinate position LPn indicates at what percentage from the starting point of the wire total length LT of the wire 30 the bending point is located. Further, the proportional lateral direction coordinate position RPn indicates at what percentage of the wire total length LT of the wire 30 the lateral direction coordinate position of the bending point is located. Then, the proportional height direction coordinate position Hpn indicates at what percentage of the total length of the wire 30 the displacement in the height direction from the bending point on the side of the starting point 31 is with respect to the bending point. In the example shown in FIG. 7, the longitudinal direction coordinate position L of the fourth bending point 35 is located at 60% of the wire total length LT of the wire 30 from the starting point 31, the lateral direction coordinate position is 0, and the height is lower than the height position of the third bending point 34 on the side of the starting point 31 by 1% of the total length of the wire 30.

As shown in FIG. 8, when the total length of the wire 30 is 1900 μm, the longitudinal direction coordinate position L5 of the fourth bending point 35 is 1900×60%=1140 μm, and the height direction coordinate position of the fourth bending point 35 is 281 μm, which is 1900×1%=19 μm lower than the height coordinate position 300 μm of the third bending point 34 on the side of the starting point 31. When the length of the wire 30 is 2300 μm, the longitudinal direction coordinate position and the height direction coordinate position of the fourth bending point 35 are 1380 μm and 277 μm, respectively. In addition, when the length of the wire 30 is 2500 μm, the longitudinal direction coordinate position and the height direction coordinate position of the fourth bending point 35 are 1500 μm and 272 μm, respectively. Note that, when none of the longitudinal direction coordinate position Ln, lateral direction coordinate position Rn, and height direction coordinate position Hn in the bending parameter database 72 shown in FIG. 7 is 0, the numerical values of the longitudinal direction coordinate position Ln, lateral direction coordinate position Rn, and height direction coordinate position Hn stored in the bending parameter database 72 become the respective coordinate positions directly.

As shown in FIG. 1 to FIG. 4, when the pads 25 of the semiconductor chip 20 and the leads 12 of the lead frame 11 are connected by multiple wires 30, the multiple wires 30 include multiple types of wires 30 with different wire total lengths LT. Here, the rises and bending shapes from the starting point 31 of the multiple wires 30 are all the same. Thus, the relative positions of the first to third bending points 32 to 34 near the starting point 31 with respect to the starting point 31 are the same. Therefore, in the bending parameter database 72 shown in FIG. 7, the longitudinal direction coordinate positions Ln, the lateral direction coordinate positions Rn, and the height direction coordinate positions Hn of the LRH coordinate system (see FIG. 3 and FIG. 4) of the first to third bending points 32 to 34 are respectively defined by only one combination with respect to the first to third bending points 32 to 34 of multiple wires 30.

On the other hand, the position of the fourth bending point 35 on the ending point side of the multiple wires 30 is set at a position proportional to the wire total length LT of the wire 30. Therefore, by defining the ratio to the wire total length LT of the wire 30 as the bending parameter of the fourth bending point 35, as described with reference to FIG. 7 and FIG. 8, it is possible to define the position of the fourth bending point 35 on the ending point side of the multiple wires 30 with one parameter.

Thus, the bending parameter database 72 shown in FIG. 7 defines the coordinate positions of the starting points 31, the first to fourth bending points 32 to 35, and the ending points 36 of multiple wires 30 with few parameters.

The image acquisition part 61, the vertical view diagram generation part 62, the diagram conversion part 63, and the diagram synthesis part 64 in the functional blocks of the controller 50 described above are able to be realized by executing the programs stored in the storage part 52 shown in FIG. 1 by the CPU 51, which is a processor. The three-dimensional diagram storage part 65 and the shape parameter database 70 are able to be realized by storing data of a predetermined data structure in the storage part 52.

Next, the operation of the three-dimensional diagram generation apparatus 100 of the embodiment will be described with reference to FIG. 9 to FIG. 16.

Figure 9:
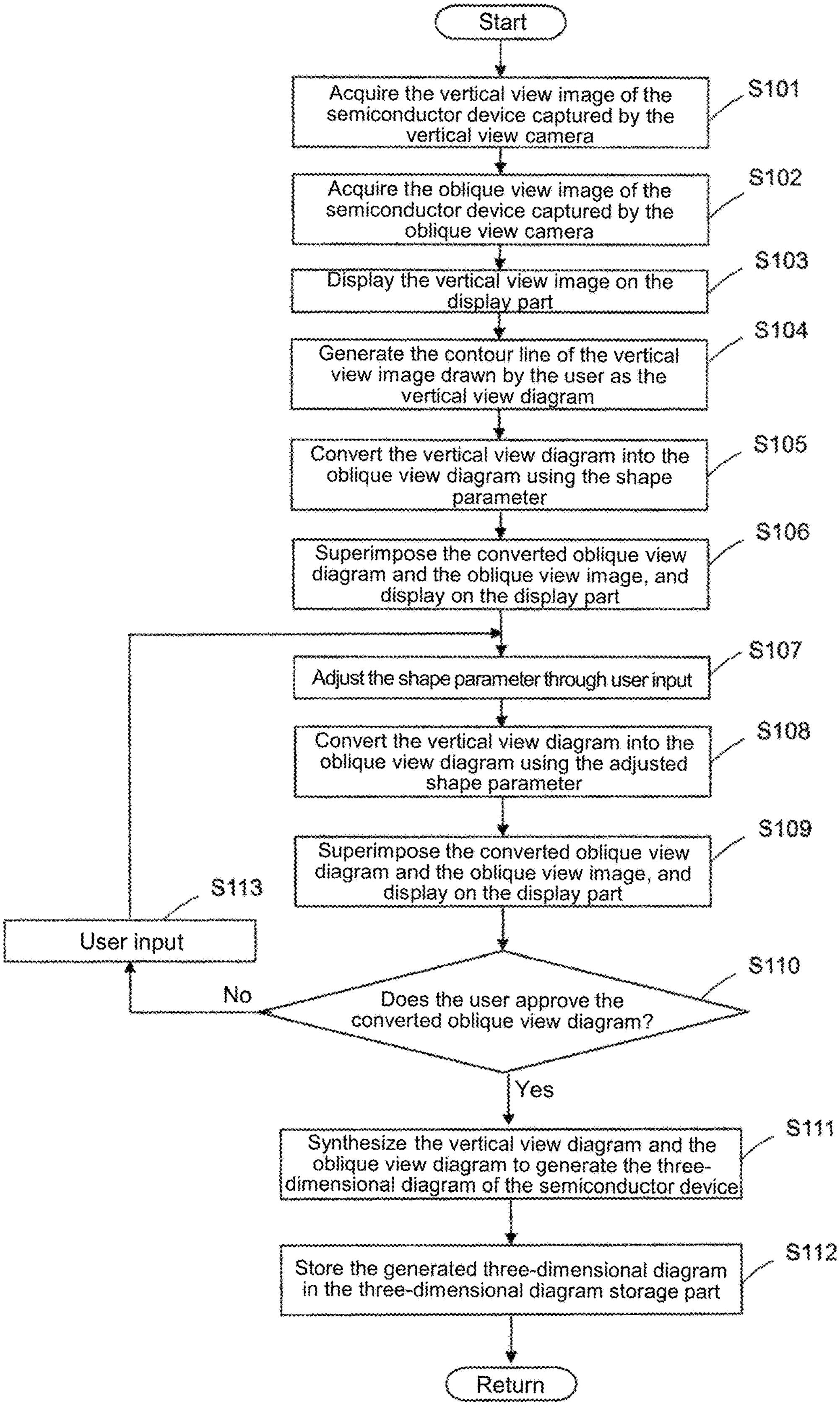
FIG. 9 is a flowchart showing the operation of the three-dimensional diagram generation apparatus of an embodiment.

As shown in step S101 of FIG. 9, the image acquisition part 61 acquires the vertical view image 110 of the semiconductor device 10 captured by the vertical view camera 41 and stores the vertical view image 110 in the storage part 52, and outputs the same to the vertical view diagram generation part 62. FIG. 10 shows the vertical view image 110 obtained by imaging the part A of the semiconductor device 10 shown in FIG. 2 with the vertical view camera 41 shown in FIG. 1 and FIG. 2. As shown in FIG. 10, the vertical view image 110 includes a vertical view pad image 125, a vertical view wire image 130, a vertical view lead image 112, and a vertical view semiconductor chip image 120. As shown in FIG. 10, the vertical view wire image 130 includes a vertical view starting point image 131, vertical first to fourth bending point images 132 to 135, and a vertical view ending point image 136, and is an image of a linear shape connecting between the vertical view starting point image 131 and the vertical view ending point image 136. In addition, the vertical view starting point image 131 overlaps with the origin of the LRH coordinate system.

In step S102 of FIG. 9, the image acquisition part 61 acquires multiple oblique view images captured by the four oblique view cameras 42 to 45 and stores the multiple oblique view images in the storage part 52, and outputs the acquired oblique view images to the diagram conversion part 63.

FIG. 11 shows the oblique view image 510 obtained by imaging the part A, shown in FIG. 1, of the semiconductor device 10 with the oblique view camera 45 shown in FIG. 2. As shown in FIG. 11, the oblique view image 510 includes an oblique view pad image 525, an oblique view wire image 530, an oblique view lead image 512, and an oblique view semiconductor chip image 520. As shown in FIG. 3, the pad 25 and the lead 12 are higher than the upper surface 11*a* of the lead frame 11 which is the reference surface. Therefore, the oblique view pad image 525 and the oblique view lead image 512 are shifted to the + side in the R direction from the origin of the LRH coordinates according to the heights of the pad 25 and the lead 12.

In addition, the oblique view wire image 530 includes an oblique view starting point image 531, oblique view first to fourth bending point images 532 to 535, and an oblique view ending point image 536. Since the starting point 31 and the ending point 36 of the wire 30 are located on the surfaces of the pad 25 and the lead 12, respectively, similar to the oblique view pad image 525 and the oblique view lead image 512, there is a shift to the + side in the R direction from the origin of the LRH coordinates according to the heights of the pad 25 and the lead 12. Furthermore, the first to fourth bending points 32 to 35 of the wire 30 are also located at higher positions than the upper surface 11*a* of the lead frame 11, which is the reference surface. Therefore, the oblique view first to fourth bending point images 532 to 535 are shifted to the + side in the R direction according to the heights of the first to fourth bending points 32 to 35 from the upper surface 11*a* of the lead frame 11. Thus, the oblique view wire image 530 becomes an image that protrudes and curves to the + side in the R direction as a whole.

In step S103 of FIG. 9, the vertical view diagram generation part 62 displays the vertical view image 110 shown in FIG. 10, which is input from the image acquisition part 61, on the display part 54. When the user operates the input part 53 to draw a contour line along the contour of the vertical view image 110 displayed on the display part 54, the vertical view diagram generation part 62 superimposes the drawing line input by the user on the vertical view image 110, and displays the same on the display part 54. This allows the user to draw the contour line of the vertical view image 110 displayed on the display part 54. Then, when the user finishes drawing the contour line, the vertical view diagram generation part 62 generates the contour line of the vertical view image 110 drawn by the user in step S104 of FIG. 9 as the vertical view diagram 110*a* shown in FIG. 12 (vertical view diagram generation step). As shown in FIG. 10, the vertical view diagram 110*a* includes a vertical view pad diagram 125*a,* a vertical view lead diagram 112*a,* a vertical view wire diagram 130*a,* and a vertical view semiconductor chip diagram 120*a.* Here, the vertical view wire diagram 130*a* includes a vertical view starting point diagram 131*a,* vertical view first to fourth bending point diagrams 132*a* to 135*a,* and a vertical view ending point diagram 136*a.* Then, the vertical view diagram generation part 62 outputs the generated vertical view diagram 110*a* to the diagram conversion part 63.

Figure 13:
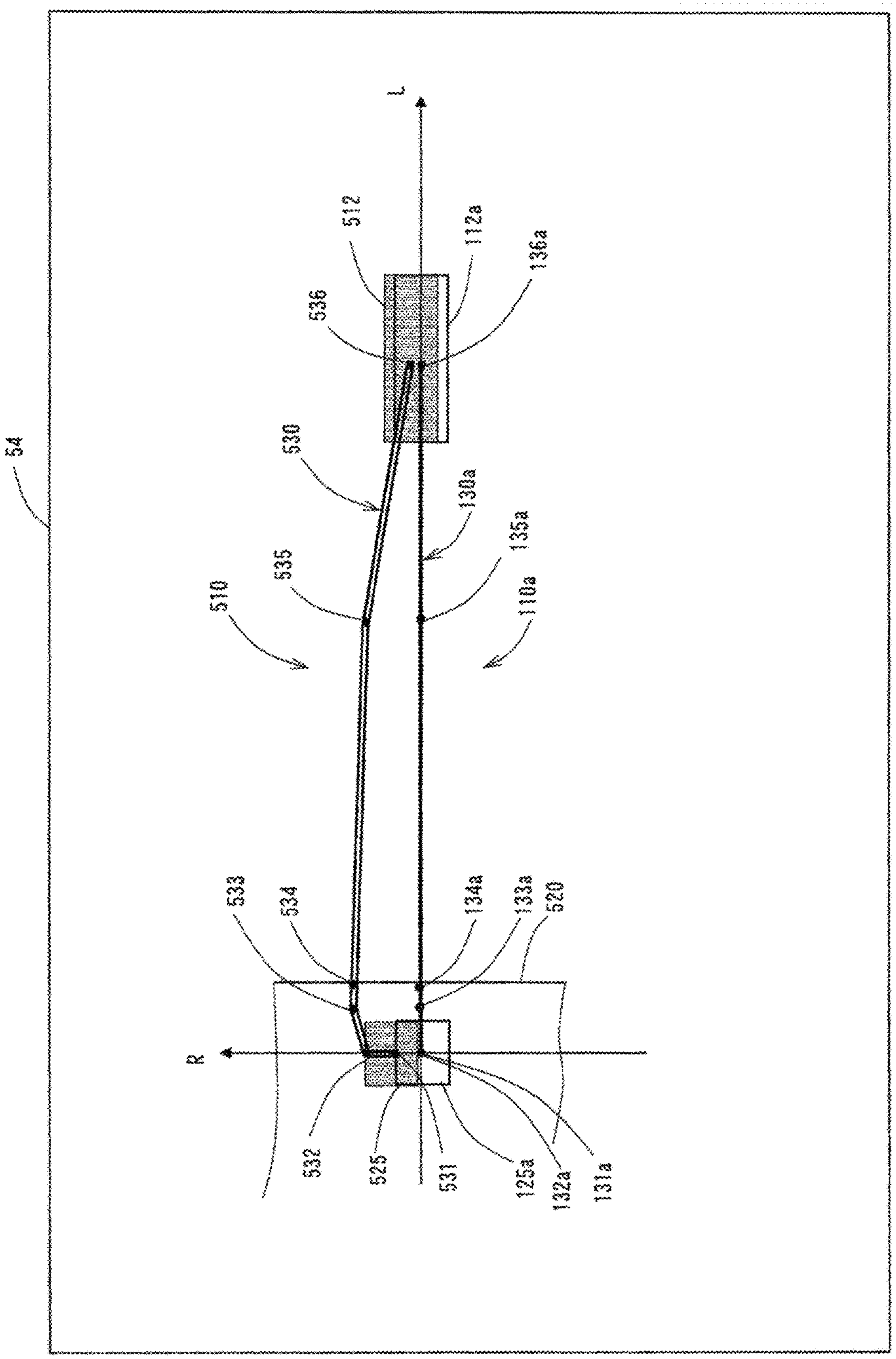
FIG. 13 is a view of the display part of the three-dimensional diagram generation apparatus of an embodiment superimposing and displaying the oblique view image shown in FIG. 11 and the vertical view diagram shown in FIG. 12.
Figure 15:
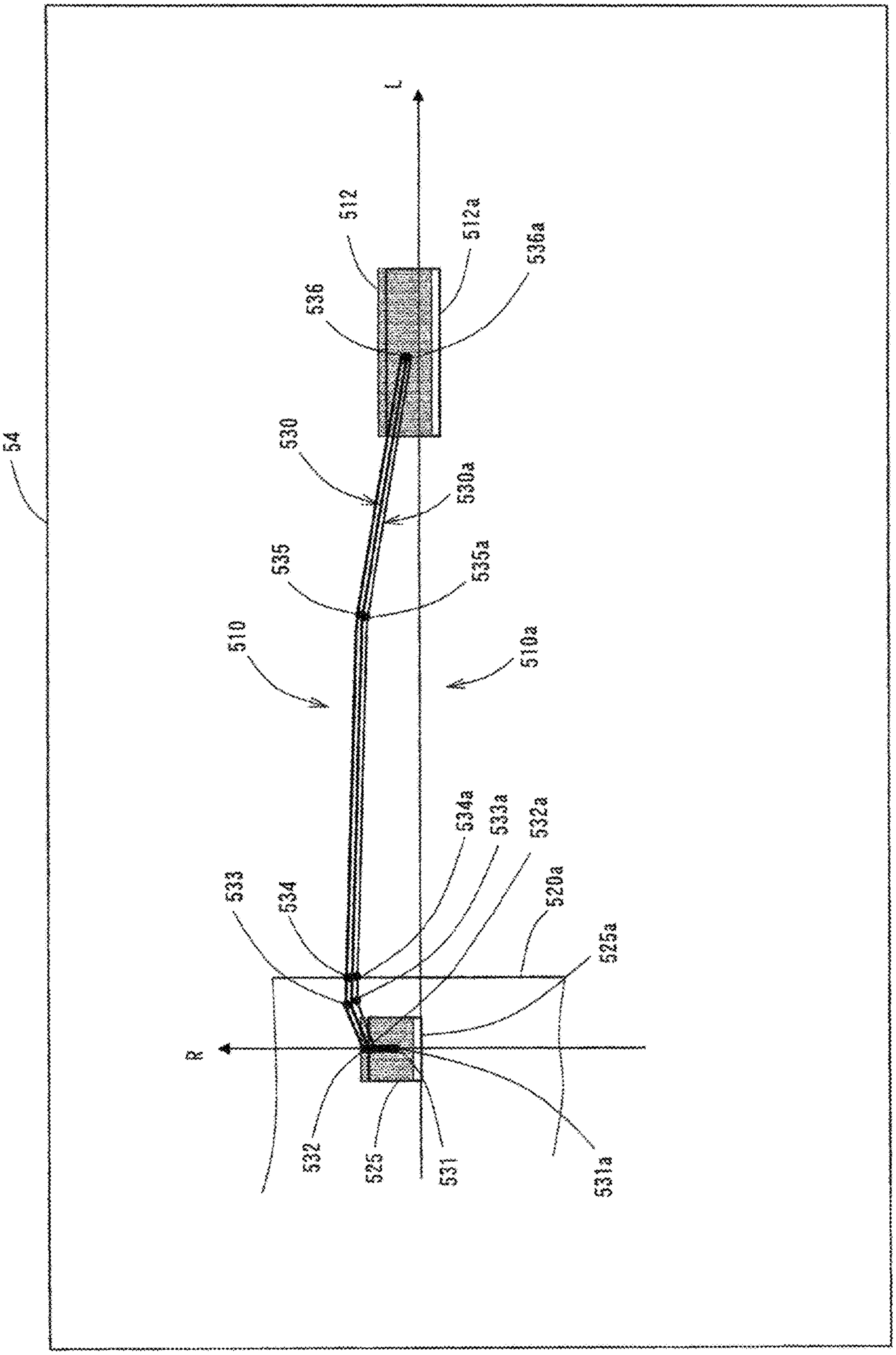
FIG. 15 is a view of the display part of the three-dimensional diagram generation apparatus of an embodiment superimposing and displaying the oblique view diagram shown in FIG. 14 and the oblique view image shown in FIG. 11.

In the following description, a case where the diagram conversion part 63 processes the oblique view image 510 captured by the oblique view camera 45 will be described. In step S105 of FIG. 9, the diagram conversion part 63 uses the shape parameter stored in the shape parameter database 70 to convert the vertical view diagram 110*a* shown in FIG. 12 into the oblique view diagram 510*a,* which approximates the oblique view image 510 as shown in FIG. 15 (diagram conversion step). As shown in FIG. 13, the vertical view diagram 110*a* before conversion is shifted from the oblique view image 510.

The diagram conversion part 63 calculates the positions of the oblique view lead image 512, the oblique view semiconductor chip image 520, and the oblique view pad image 525 displayed on the display part 54 when the semiconductor device 10 is imaged by each of the oblique view cameras 42 to 45, based on the height Z of each of the lead frame 11, the lead 12, the semiconductor chip 20, and the pad 25 from the upper surface 11*a* of the lead frame 11, which is the reference surface, stored in the component shape parameter database 71 shown in FIG. 6, the inclination of the surface of each part, the arrangement position of each of the oblique view cameras 42 to 45, and the inclination angle of each of the optical axes 42*a* to 45*a* with respect to the semiconductor device 10. Then, the diagram conversion part 63 moves the vertical view lead diagram 112*a,* the vertical view semiconductor chip diagram 120*a,* and the vertical view pad diagram 125*a* to the positions and converts them into an oblique view lead diagram 512*a,* an oblique view semiconductor chip diagram 520*a,* and an oblique view pad diagram 525*a.*

Figure 14:
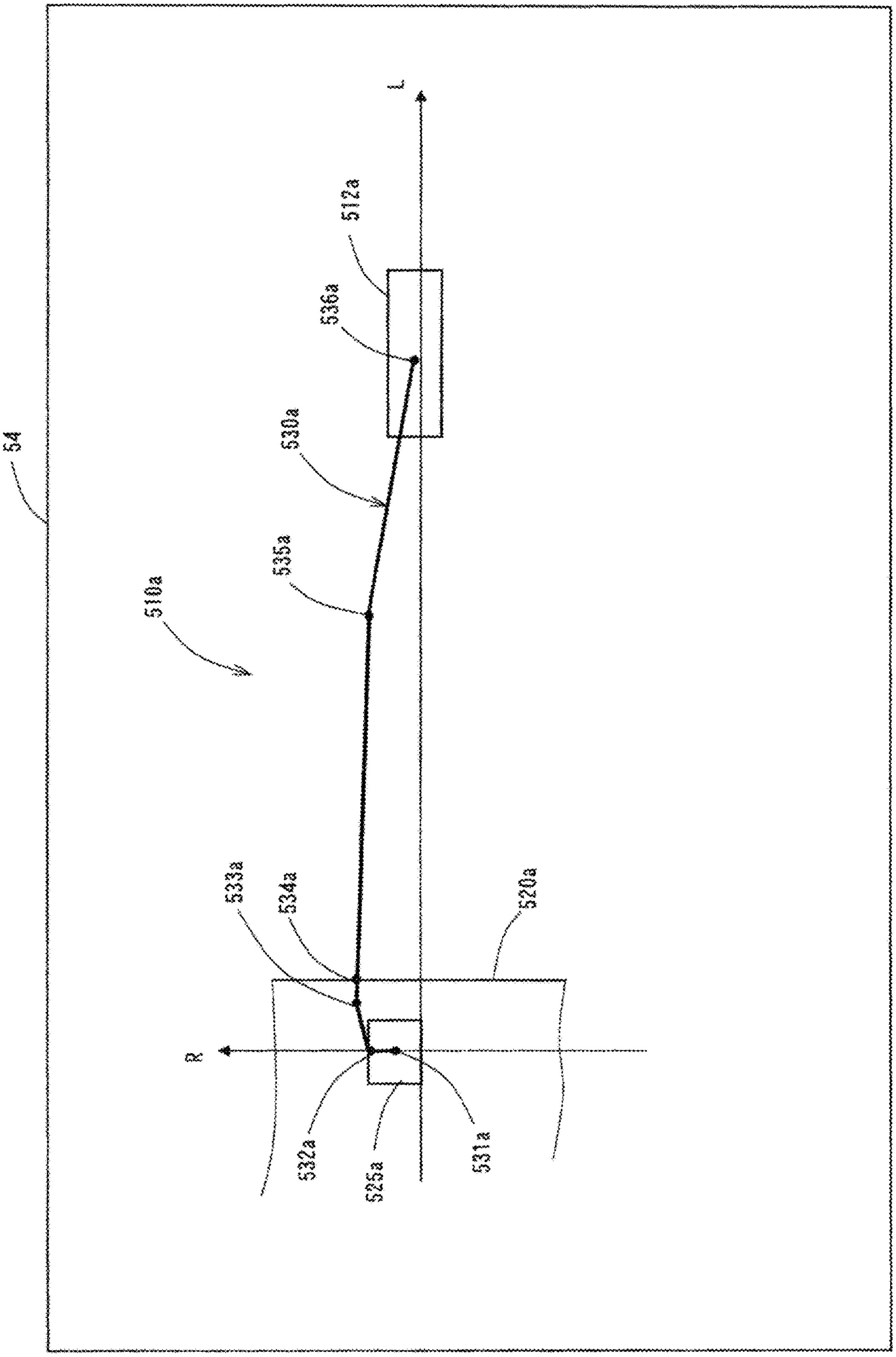
FIG. 14 is a view of the display part of the three-dimensional diagram generation apparatus of an embodiment displaying the oblique view diagram obtained by converting the vertical view diagram shown in FIG. 12 using the shape parameter before adjustment.

Next, the diagram conversion part 63 calculates the wire-specific bending parameters of multiple wires 30 as shown in FIG. 8 based on the bending parameter database 72 shown in FIG. 7 and stores the same in the storage part 52. Then, based on the wire-specific bending parameters shown in FIG. 8, the arrangement position of each of the oblique view cameras 42 to 45, and the inclination angle of each of the optical axes 42*a* to 45*a* with respect to each wire 30, the diagram conversion part 63 calculates the positions of the oblique view starting point image 531, the oblique view first to fourth bending point images 532 to 535, and the oblique view ending point image 536 displayed on the display part 54 when the wire 30 is imaged by each of the oblique view cameras 42 to 45. Then, as shown in FIG. 14, the diagram conversion part 63 moves the vertical view starting point diagram 131*a,* the vertical view first to fourth bending point diagrams 132*a* to 135*a,* and the vertical view ending point diagram 136*a* to the positions, and converts them into an oblique view starting point diagram 531*a,* oblique view first to fourth bending point diagrams 532*a* to 535*a,* and an oblique view ending point diagram 536*a*, respectively, and generates an oblique view wire diagram 530*a* by connecting therebetween with lines.

When the diagram conversion part 63 converts the vertical view diagram 110*a* of the semiconductor device 10 into the oblique view diagram 510*a* that approximates the oblique view image 510 in step S105 of FIG. 9, the diagram conversion part 63 superimposes the oblique view image 510 of the semiconductor device 10 and the oblique view diagram 510*a,* as shown in FIG. 15, and displays the same on the display part 54 in step S106 of FIG. 9.

As shown in FIG. 15, the oblique view diagram 510*a* that approximates the oblique view image 510 displayed on the display part 54 is slightly shifted from the oblique view image 510. The user inputs the component shape parameter or bending parameter by comparing the oblique view image 510 displayed on the display part 54 with the oblique view diagram 510*a*. The diagram conversion part 63 adjusts the component shape parameter or bending parameter based on the input of the user in step S107 of FIG. 9. The adjustment of the component shape parameter or bending parameter may be stored in the storage part 52 by updating the data of the height Z from the reference surface and the inclination in the XYZ directions stored in each cell of the component shape parameter database 71 shown in FIG. 6, and may be stored in the storage part 52 by updating the data of the coordinate positions of the bending parameter database 72 shown in FIG. 7, for example, through the input of the user.

In step S108 of FIG. 9, the diagram conversion part 63 converts the vertical view diagram 110*a* into the oblique view diagram 510*a* by using the adjusted component shape parameter and bending parameter, as in step S105 of FIG. 9, and superimposes the oblique view image 510 of the semiconductor device 10 and the oblique view diagram 510*a* and displays the same on the display part 54 in step S109 of FIG. 9 (diagram conversion step). Then, in step S110 of FIG. 9, the diagram conversion part 63 determines whether there is approval input of the user from the input part 53. Then, if there is no approval from the user, the diagram conversion part 63 accepts the input of the user in step S113 of FIG. 9, returns to step S107 of FIG. 9 to adjust the shape parameter, converts the vertical view diagram 110*a* into the oblique view diagram 510*a* in step S109 of FIG. 9, superimposes the oblique view image 510 and the oblique view diagram 510*a* in step S109 of FIG. 9, and displays the same on the display part 54. The diagram conversion part 63 repeats steps S107 to S110 and S113 of FIG. 9 in this way until the user makes approval input in step S110 of FIG. 9.

By adjusting the shape parameter through the input of the user, the deviation between the oblique view diagram 510*a* and the oblique view image 510 superimposed and displayed on the display part 54 gradually decreases, and as shown in FIG. 16, the contour lines of the oblique view diagram 510*a* indicated by a one-dot chain line and the oblique view image 510 indicated by a solid line overlap. In FIG. 16, the contour lines of the oblique view diagram 510*a* and the oblique view image 510 are slightly shifted for clarity, but in reality, the contour lines of the oblique view diagram 510*a* indicated by a one-dot chain line and the oblique view image 510 indicated by a solid line overlap. Then, when the user makes approval input in step S110 of FIG. 9, the diagram conversion part 63 stores the approved oblique view diagram 510*a* in the storage part 52.

Further, when the contour lines of the oblique view diagram 510*a* and the oblique view image 510 indicated by a solid line overlap, the data of the height Z from the reference surface and the inclination in the XYZ directions stored in each cell of the component shape parameter database 71 shown in FIG. 6 becomes data indicating the height and inclination of each component of the semiconductor device 10. Therefore, it is also possible to detect the height and inclination of each component of the semiconductor device 10 using the data of the height Z from the reference surface and the inclination in the XYZ directions stored in each cell of the component shape parameter database 71.

Although the above describes that the diagram conversion part 63 converts the vertical view diagram 110*a* into the oblique view diagram 510*a* that matches the oblique view image displayed on the display part 54 when the semiconductor device 10 is imaged by the oblique view camera 45, the same applies to a case where the vertical view diagram 110*a* is converted into an oblique view diagram that matches the oblique view image displayed on the display part 54 when the semiconductor device 10 is imaged by other oblique view cameras 42 to 44.

The diagram conversion part 63 respectively converts the vertical view diagram 110*a* into each oblique view diagram that matches each oblique view image displayed on the display part 54 when the semiconductor device 10 is imaged by the four oblique view cameras 42 to 45, and stores the converted oblique view diagrams in the storage part 52. The diagram synthesis part 64 generates a three-dimensional diagram of the semiconductor device 10 by synthesizing the vertical view diagram 110*a* and each oblique view diagram in step S111 of FIG. 9 (diagram synthesis step). The diagram synthesis part 64 constructs the three-dimensional diagram as a set of many points arranged along the line connecting the starting point 31, the first to fourth bending points 32 to 35, and the ending point 36 of the wire 30, and a set of many points arranged along the contour lines of the pad 25 and the lead 12. Then, the coordinate positions of the many points constituting the three-dimensional diagram are calculated, and the three-dimensional diagram including the positional information of each part of the semiconductor device 10 is generated by associating the coordinate position with each point. Here, for example, the positional information is a coordinate position defined in the XYZ coordinate system shown in FIG. 1 and FIG. 2.

Then, the diagram synthesis part 64 stores the three-dimensional diagram including the positional information of each part of the semiconductor device 10, generated in step S112 of FIG. 9, in the three-dimensional diagram storage part 65 of the storage part 52.

Since the three-dimensional diagram generation apparatus 100 of the embodiment described above generates the contour line of the vertical view image 110 that the user draws on the display part 54 as the vertical view diagram 110*a,* the vertical view diagram 110*a* can be generated reliably even with the vertical view image 110 that is difficult to process. In addition, since the converted oblique view diagram 510*a* and the oblique view image 510 are superimposed and displayed on the display part 54 by adjusting the shape parameters through the input of the user, the user is able to adjust the shape parameters while comparing the converted oblique view diagram 510*a* and the oblique view image 510 until they overlap, which makes it possible to generate the oblique view diagram 510*a* that the user desires. Thus, it is possible to generate a three-dimensional diagram of an object desired by the user with accuracy.

Furthermore, since the three-dimensional diagram generation apparatus 100 defines the ratio to the wire total length LT of the wire 30 as the bending parameter in the bending parameter database 72, it is possible to define the positions of the bending points on the ending point side of multiple wires 30 that have different wire total lengths LT with one parameter. Therefore, it is possible to define the shapes of multiple wires 30 included in one group with input of fewer shape parameters from the user.

Although it has been described that the three-dimensional diagram generation apparatus 100 described above generates the contour line of the vertical view image 110 drawn by the user on the display part 54 as the vertical view diagram 110*a,* superimposes the converted oblique view diagram 510*a* and the oblique view image 510 by adjusting the shape parameters through the input of the user, and displays the same on the display part 54, and the user adjusts the shape parameters by comparing them until they overlap, the disclosure is not limited thereto. For example, similar to a master three-dimensional diagram generation part 360 of a three-dimensional shape inspection apparatus 300 which will be described later with reference to FIG. 32 to FIG. 37, the vertical view diagram generation part 62 may extract the contour line of the vertical view image 110 using techniques such as edge processing with no input from the user to generate the vertical view diagram 110*a*.

In addition, similar to the master three-dimensional diagram generation part 360 of the three-dimensional shape inspection apparatus 300 which will be described later with reference to FIG. 32 to FIG. 37, the diagram conversion part 63 may extract the contour line of the oblique view image 510 using techniques such as edge processing with no input from the user and compare the extracted contour line with each line included in the oblique view diagram 510*a* converted from the vertical view diagram 110*a* to adjust the shape parameters and generate the oblique view diagram 510*a* that overlaps with the oblique view image 510.

Next, a three-dimensional diagram generation apparatus 200 of another embodiment will be described with reference to FIG. 17 to FIG. 31. Parts same as those of the three-dimensional diagram generation apparatus 100 described with reference to FIG. 1 to FIG. 16 are denoted by the same reference numerals, and the description thereof is omitted.

Figure 17:
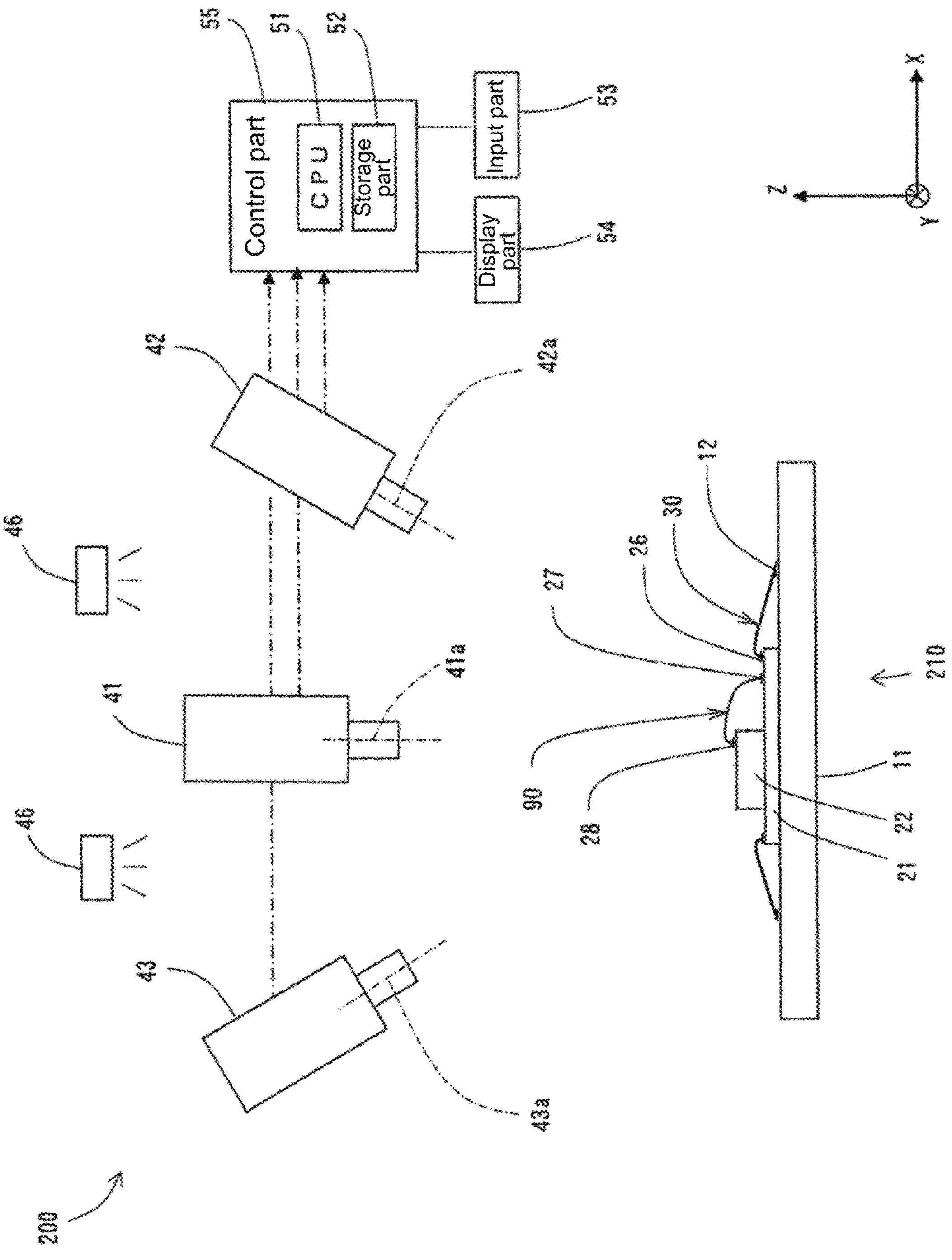
FIG. 17 is an elevation view showing the system configuration of the three-dimensional diagram generation apparatus of another embodiment.

The three-dimensional diagram generation apparatus 200 is an apparatus that generates a three-dimensional diagram of a semiconductor device 210 including two types of wires, a wire 30 and an upper wire 90, which have the starting points and the ending points located on different components, as shown in FIG. 17. The three-dimensional diagram generation apparatus 200 includes a controller 55 instead of the controller 50 of the three-dimensional diagram generation apparatus 100. The configuration of the controller 55 will be described later with reference to FIG. 21.

Figure 18:
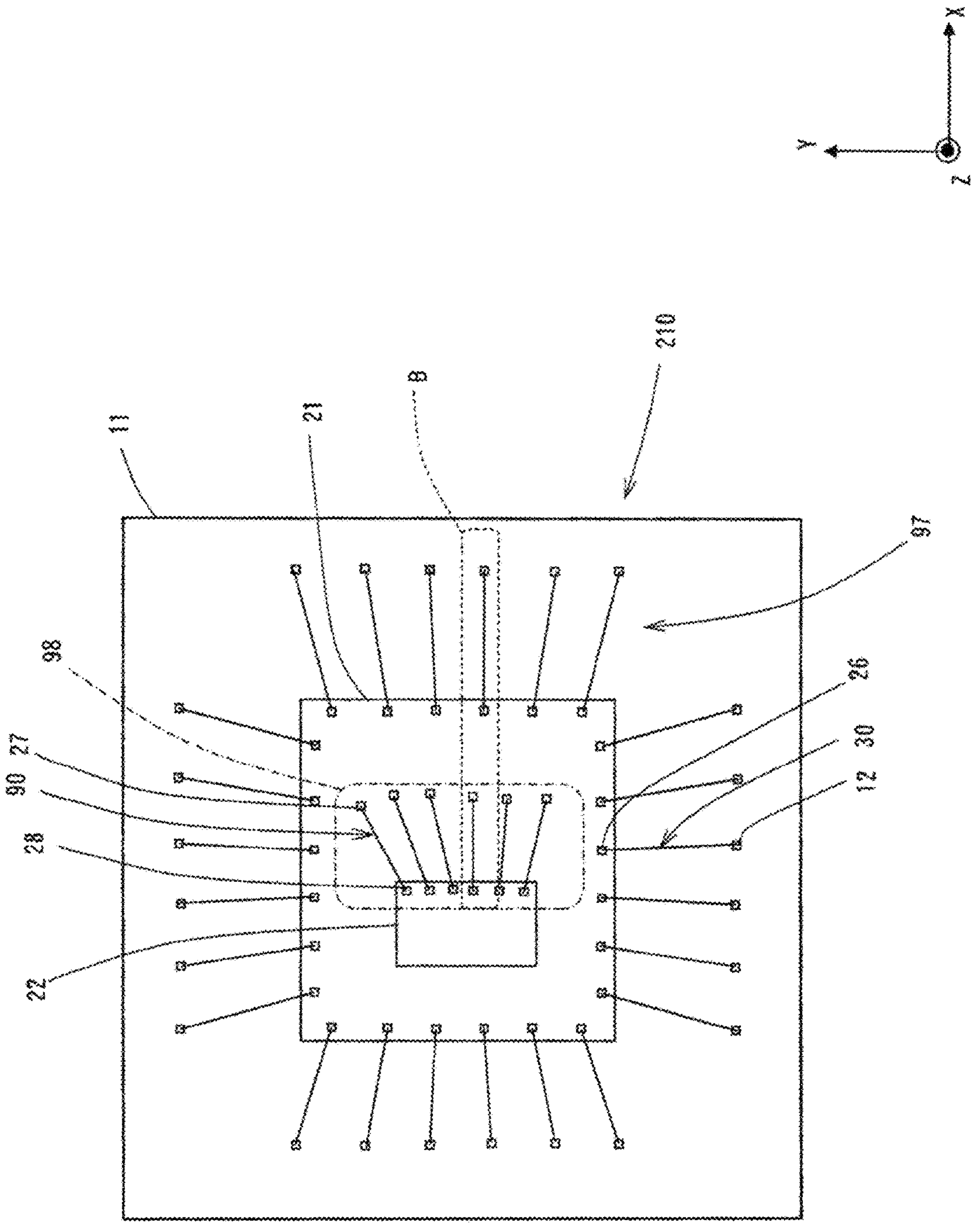
FIG. 18 is a plan view of the semiconductor device shown in FIG. 17.

First, the configuration of the semiconductor device 210 will be described with reference to FIG. 18 to FIG. 20. The semiconductor device 210 includes a lead frame 11, a lead 12, a first semiconductor chip 21, a first pad 26 arranged on the upper surface of the first semiconductor chip 21, a second pad 27, a second semiconductor chip 22, a third pad 28 arranged on the upper surface of the second semiconductor chip 22, the wire 30, and the upper wire 90. In the following description, the upper wire 90 is described as having a bent line shape connecting the starting point 91, the first to fourth bending points 92 to 95, and the ending point 96, similar to the wire 30.

The first semiconductor chip 21 has the same size and thickness as the semiconductor chip 20 described earlier with reference to FIG. 1 to FIG. 4, and has the second pad 27 arranged in the central portion of the upper surface. The first pad 26 arranged around the upper surface is arranged in the same manner as the pad 25 of the semiconductor chip 20. The second semiconductor chip 22 is smaller than the first semiconductor chip 21 and thicker than the first semiconductor chip 21, and is attached to the upper surface in the center of the first semiconductor chip 21. The upper surface of the second semiconductor chip 22 has the third pad 28 arranged thereon. The heights of the lead 12, the first to third pads 26 to 28, and the upper surfaces of the first and second semiconductor chips 21 and 22 increase in the order of the lead 12, the upper surface of the first semiconductor chip 21, the first and second pads 26 and 27, the upper surface of the second semiconductor chip 22, and the third pad 28.

The wire 30 connects the first pad 26 of the first semiconductor chip 21 and the lead 12 of the lead frame 11. The shape of the wire 30 is the same as the shape of the wire 30 described earlier with reference to FIG. 3 and FIG. 4. The upper wire 90 connects the third pad 28 of the second semiconductor chip 22 and the second pad 27 of the first semiconductor chip 21.

Figure 19:
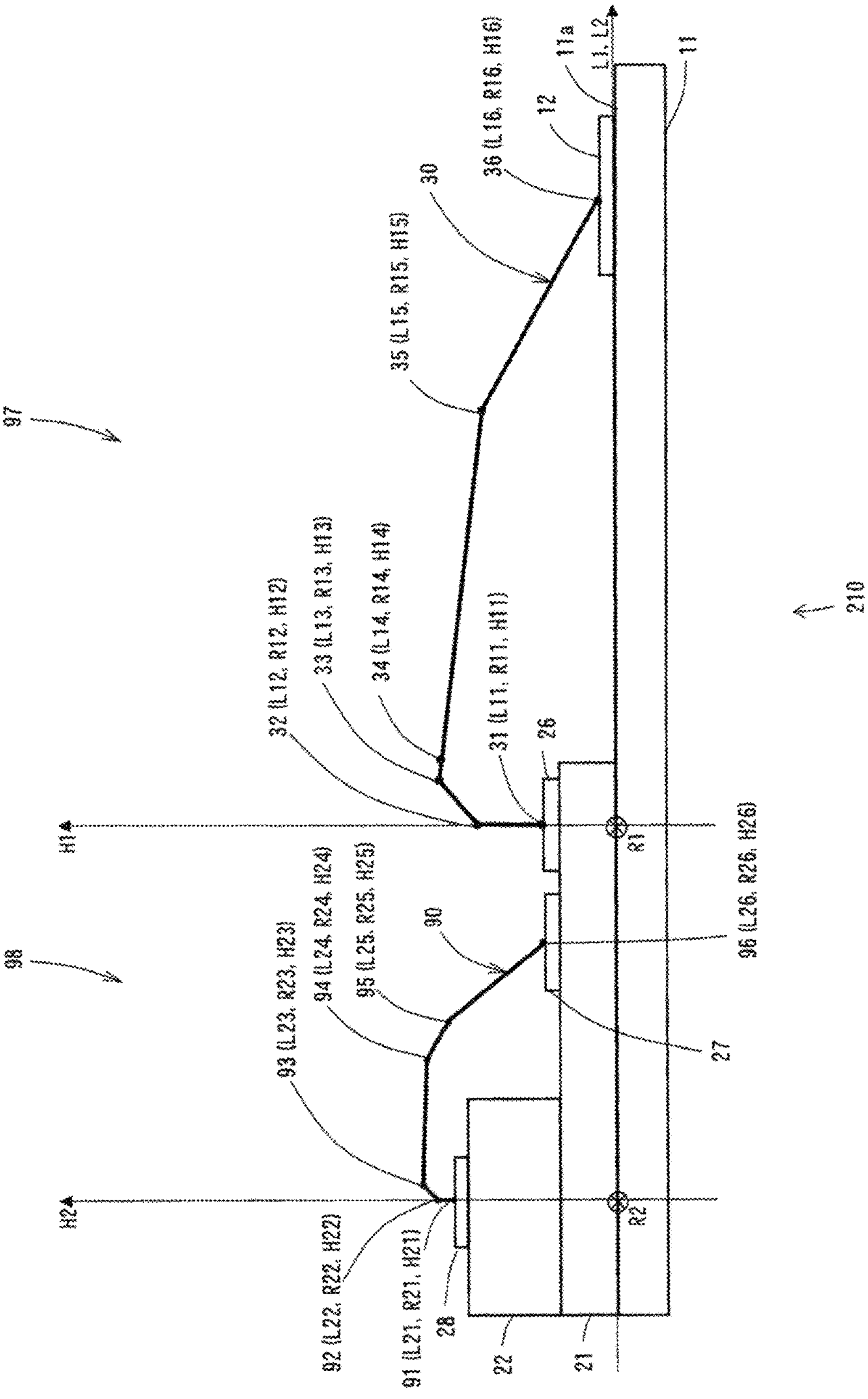
FIG. 19 is a detailed elevation view of part B of the semiconductor device shown in FIG. 18.

As shown in FIG. 19, the wire 30 includes the starting point 31, the first to fourth bending points 32 to 35, and the ending point 36, as described earlier. The upper wire 90 includes a starting point 91 located on the third pad 28 of the second semiconductor chip 22, first to fourth bending points 92 to 95, and an ending point 96 located on the second pad 27 of the first semiconductor chip 21.

The positions of the starting point 31, the first to fourth bending points 32 to 35, and the ending point 36 of the wire 30 are represented by a combination of longitudinal direction coordinate position L1*n,* lateral direction coordinate position R1*n,* and height direction coordinate position H1*n* in a first LRH coordinate system composed of a longitudinal direction axis L1, a lateral direction axis R1, and a height direction axis H1, similar to the longitudinal direction axis L, the lateral direction axis R, and the height direction axis H described earlier with reference to FIG. 3 and FIG. 4.

Figure 20:
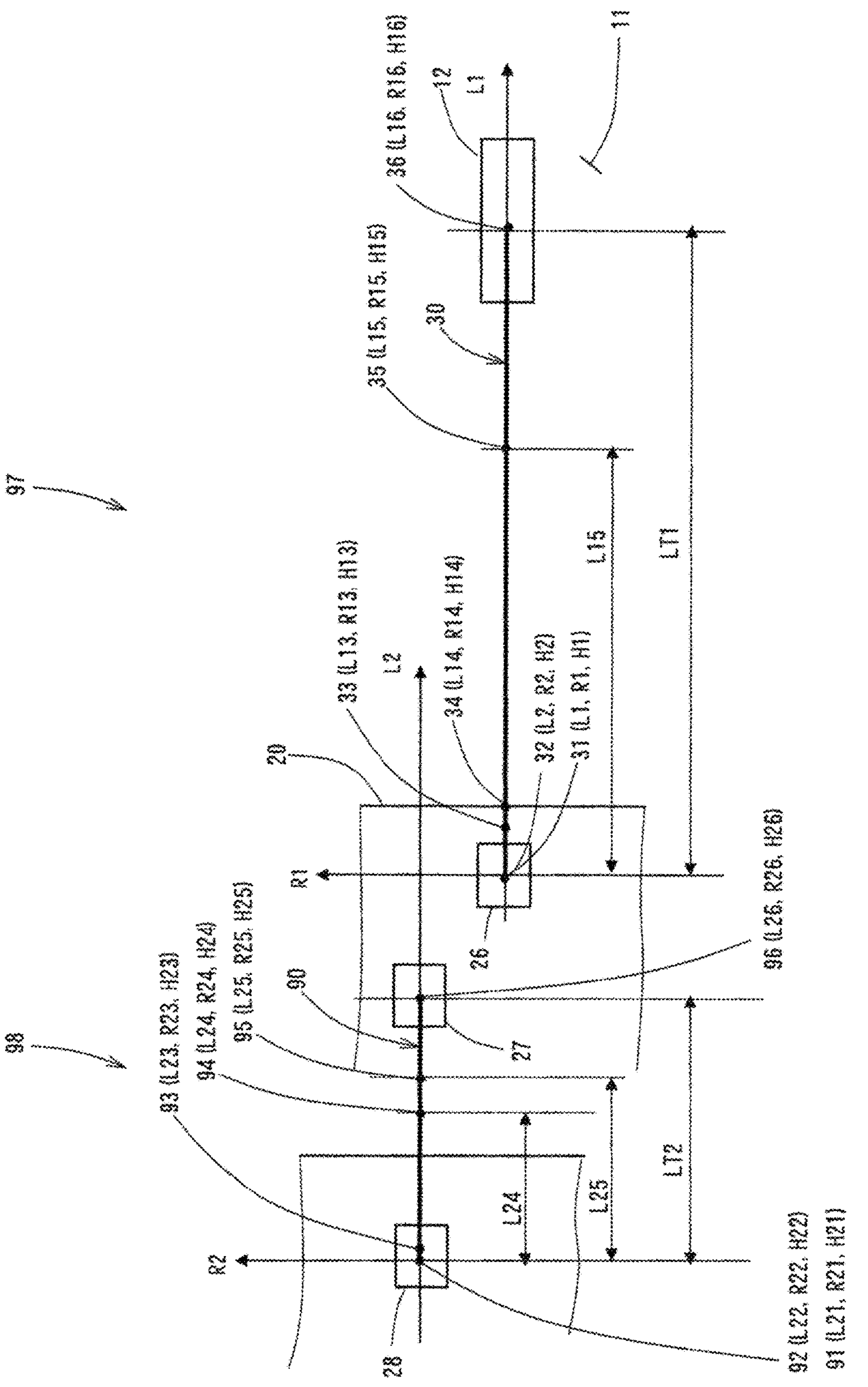
FIG. 20 is a detailed plan view of part B of the semiconductor device shown in FIG. 18.

As shown in FIG. 19 and FIG. 20, the coordinate position of the starting point 31 of the first LRH coordinate system is represented by (L11, R11, H11). Similarly, the coordinate positions of the first to fourth bending points 92 to 95 are represented by (L12, R12, H12), (L13, R13, H13), (L14, R14, H14), and (L15, R15, H15), respectively. Besides, the coordinate position of the ending point 36 is represented by (L16, R16, H16). As shown in FIG. 20, the total length of the wire 30 along the longitudinal direction axis L1 from the starting point 31 to the ending point 36 is a wire total length LT1. The length along the longitudinal direction axis L1 from the starting point 31 to the fourth bending point 35 is a length L15.

On the other hand, the positions of the starting point 91, the first to fourth bending points 92 to 95, and the ending point 96 of the upper wire 90 are represented by a combination of longitudinal direction coordinate position L2*n,* lateral direction coordinate position R2*n,* and height direction coordinate position H2*n* in a second LRH coordinate system, which is composed of a longitudinal direction axis L2 extending from the starting point 91 to the ending point 96 of the upper wire 90 in the plane of the upper surface 11*a* of the lead frame 11, which is the reference surface, a lateral direction axis R2 extending in a direction orthogonal to the longitudinal direction axis L2 from the starting point 91 of the upper wire 90 in the plane of the upper surface 11*a* of the lead frame 11, and a height direction axis H2 extending in the vertical direction with respect to the upper surface 11*a* of the lead frame 11 through the starting point 91. Here, n is a natural number.

When the positions of the starting point 91, the first to fourth bending points 92 to 95, and the ending point 96 are shown by the second LRH coordinate system, the coordinate position of the starting point 91 is represented by (L21, R211, H21), as shown in FIG. 19 and FIG. 20. Similarly, the coordinate positions of the first to fourth bending points 92 to 95 are represented by (L22, R22, H22), (L23, R23, H23), (L24, R24, H24), and (L25, R25, H25), respectively. The coordinate position of the ending point 96 is represented by (L26, R26, H26). As shown in FIG. 20, the total length along the longitudinal direction axis L2 from the starting point 91 to the ending point 96 of the upper wire 90 is a wire total length LT2. The lengths along the longitudinal direction axis L2 from the starting point 91 to the third bending point 94 and the fourth bending point 95 are lengths L24 and L25, respectively.

Figure 21:
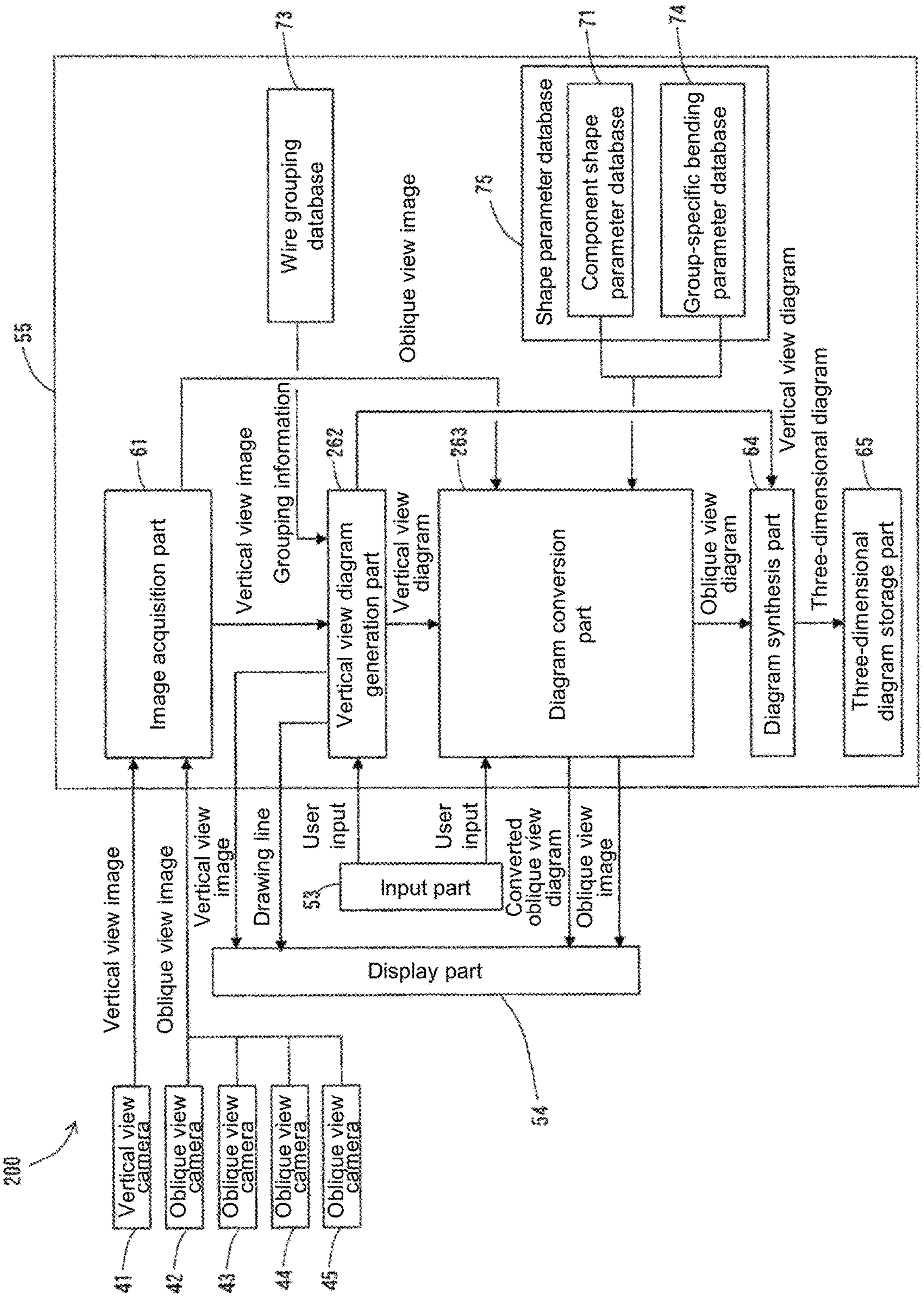
FIG. 21 is a functional block diagram of the three-dimensional diagram generation apparatus of another embodiment.

As shown in FIG. 21, the controller 55 of the three-dimensional diagram generation apparatus 200 includes a wire grouping database 73 in the controller 50 of the three-dimensional diagram generation apparatus 200 described with reference to FIG. 5, and takes the shape parameter database 70 of the controller 50 as a shape parameter database 75 that includes a component shape parameter database 71 and a group-specific bending parameter database 74. Further, a vertical view diagram generation part 262 generates the contour lines of the components, the wire 30, and the upper wire 90 in a vertical view image 1210 (see FIG. 28) drawn by the user through operation of the input part 53 into a vertical view diagram 1210*a* (see FIG. 30) of the semiconductor device 210, and groups multiple wires 30 and upper wires 90 into a plurality of groups composed of wires that have the starting points located on the same component, the ending points located on the same component, and the same thickness. A diagram conversion part 263 converts the vertical view diagram 1210*a* into an oblique view diagram 5210*a* (see FIG. 31) using the group-specific bending parameter database 74. The other functional blocks are the same as those of the controller 50 described with reference to FIG. 5.

As shown in FIG. 22, the wire grouping database 73 is a database that stores grouping information defining multiple wires, which have the starting points located on the same component, the ending points located on the same component, and the same wire thickness, as one wire group. For wires that have the starting points located on the same component, the ending points located on the same component, and the same wire thickness, the bending points near the starting points are at relatively the same position with respect to the starting points, and the positions of the bending points on the ending point side are proportional to the total length of the wire. Thus, the multiple wires included in one wire group can define the bending shape with one kind of bending parameter data.

As shown in FIG. 23, the component shape parameter database 71 has the same data structure as the component shape parameter database 71 described earlier with reference to FIG. 6, but stores data of the height and inclination of each surface of the first semiconductor chip 21, the first pad 26, the second pad 27, the second semiconductor chip 22, and the third pad 28, as shown in FIG. 23.

As shown in FIG. 24, the group-specific bending parameter database 74 is composed of a plurality of group-specific bending parameter databases 74*a* and 74*b*. In the example shown in FIG. 24, the group-specific bending parameter database 74*a* is applied to the first wire group, and the group-specific bending parameter database 74*b* is applied to the second wire group.

For the upper wires 90 that constitute the second wire group, the coordinate positions of the third bending point 94 and the fourth bending point 95 are defined proportional to the wire total length LT2 of the upper wire 90, so 0 is input to the fields for longitudinal direction coordinate position L, lateral direction coordinate position R, and height direction coordinate position H, and at least one of the proportional longitudinal direction coordinate position LP, proportional lateral direction coordinate position RP, and proportional height direction coordinate position HP has a numerical value stored.

Similar to FIG. 8, FIG. 25 shows an example of calculating the coordinate positions of the starting point 31, the first to fourth bending points 32 to 35, and the ending point 36 of the wires 30 of the first group using the group-specific bending parameter database 74*a* shown in FIG. 24, and an example of calculating the coordinate positions of the starting point 91, the first to fourth bending points 92 to 95, and the ending point 96 of the upper wires 90 of the second group using the group-specific bending parameter database 74*b* shown in FIG. 24. Each coordinate position of the fourth bending point 35 of the wires 30 of the first wire group and the third and fourth bending points 94 and 95 of the upper wires 90 of the second wire group indicated by hatching in FIG. 25 is calculated based on the proportional longitudinal direction coordinate position LP, the proportional lateral direction coordinate position RP, and the proportional height direction coordinate position HP.

Next, the operation of the three-dimensional diagram generation apparatus 200 will be described with reference to FIG. 26 and FIG. 27. The same operation as that of the three-dimensional diagram generation apparatus 100 which has been described earlier with reference to FIG. 9 will be described briefly.

Figure 26:
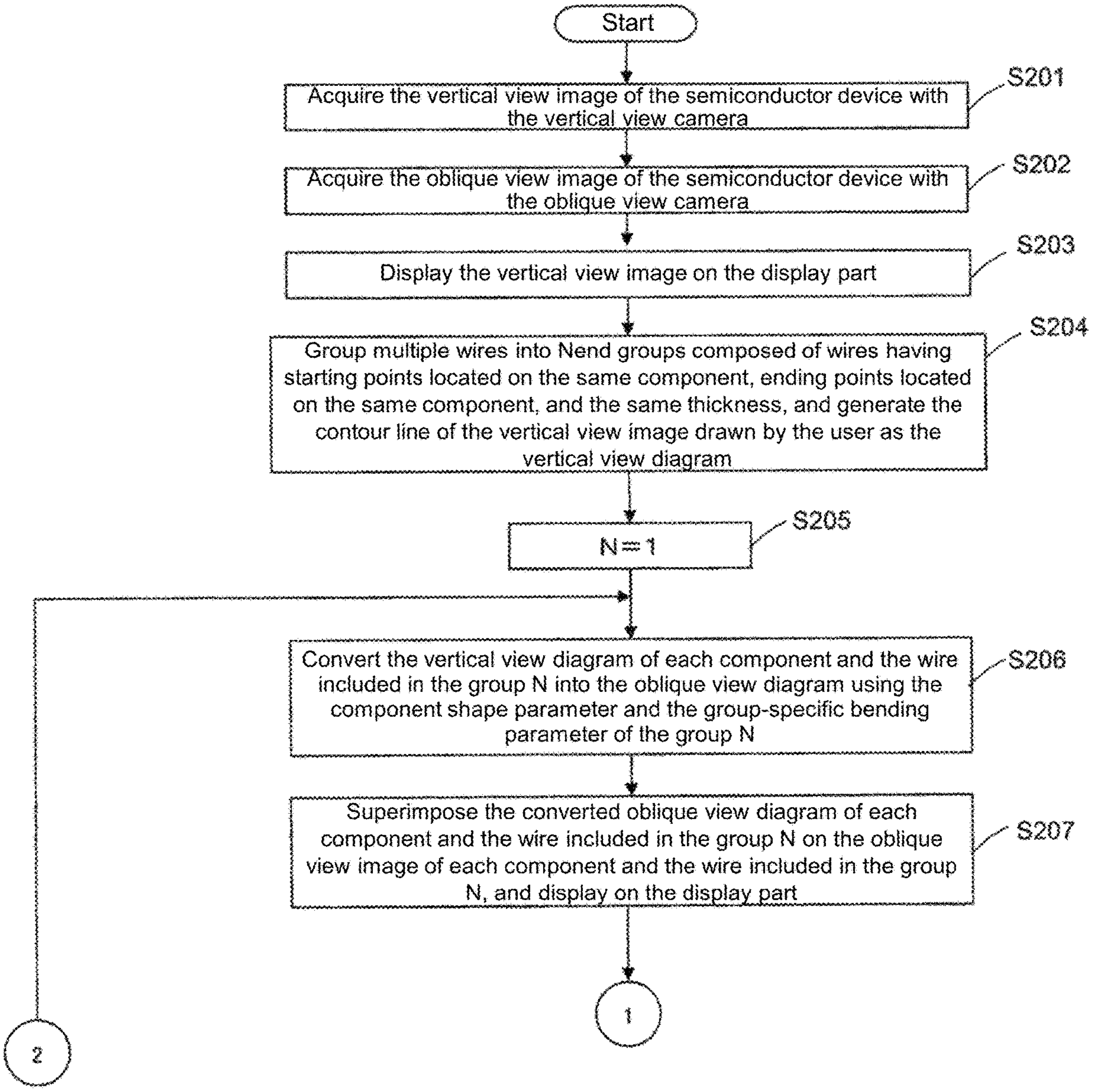
FIG. 26 is a flowchart showing the operation of the three-dimensional diagram generation apparatus of another embodiment.
Figure 28:
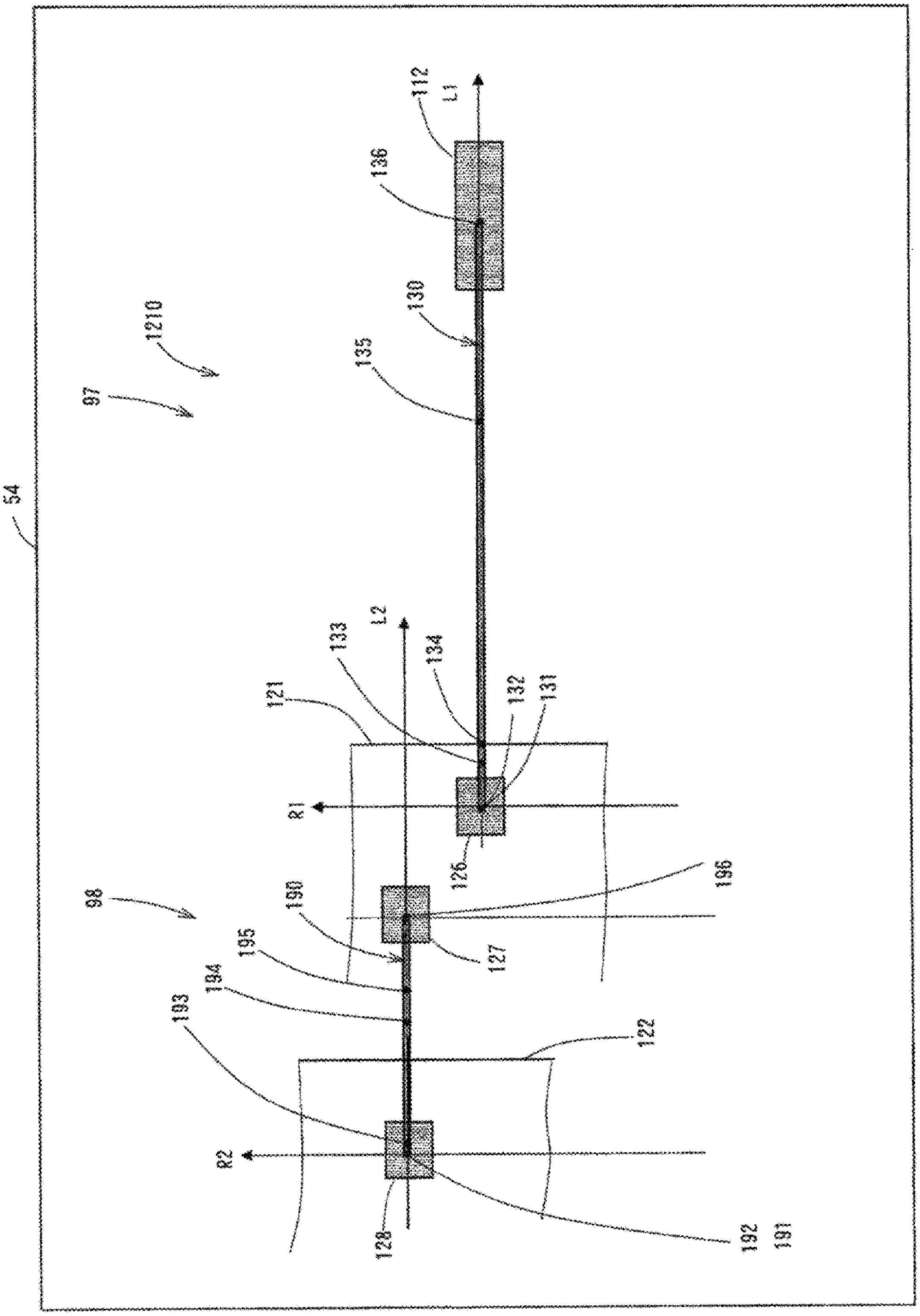
FIG. 28 is a view showing a state where the display part of the three-dimensional diagram generation apparatus of another embodiment displays the vertical view image of the semiconductor device shown in FIG. 17 to FIG. 20 captured by the vertical view camera.
Figure 29:
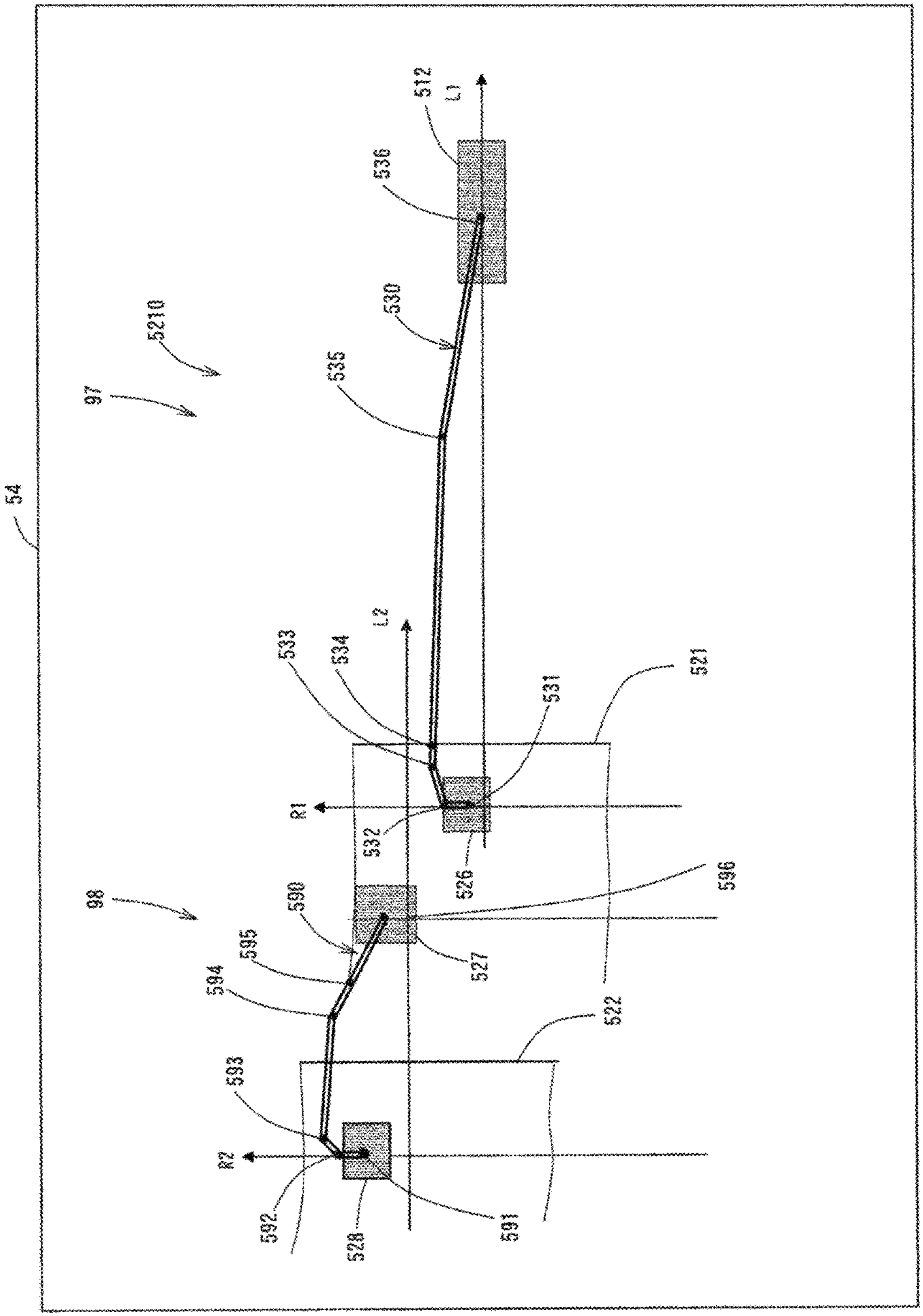
FIG. 29 is a view showing a state where the display part of the three-dimensional diagram generation apparatus of another embodiment displays the oblique view image of the semiconductor device shown in FIG. 17 to FIG. 20 captured by the oblique view camera.

In step S201 of FIG. 26, the image acquisition part 61 acquires and stores the vertical view image 1210 of the semiconductor device 210 as shown in FIG. 28, which is captured by the vertical view camera 41, in the storage part 52, and outputs the same to the vertical view diagram generation part 262. Furthermore, in step S202 of FIG. 26, the image acquisition part 61 acquires and stores an oblique view image 5210, shown in FIG. 29, captured by the oblique view camera 45 and multiple oblique view images (not shown) captured by the other three oblique view cameras 42 to 44 in the storage part 52, and outputs the acquired oblique view image 5210 and other oblique view images to the diagram conversion part 263. As shown in FIG. 28 to FIG. 29, the vertical view image 1210 of the semiconductor device 210 is an image obtained by combining a vertical view second pad image 127, a vertical view upper wire image 190, a vertical view third pad image 128, a vertical view first semiconductor chip image 121, and a vertical view second semiconductor chip image 122 with the vertical view image 110 shown in FIG. 10. Also, the oblique view image 5210 is an image obtained by combining an oblique view second pad image 527, an oblique view upper wire image 590, an oblique view third pad image 528, an oblique view first semiconductor chip image 521, and an oblique view second semiconductor chip image 522 with the oblique view image 510 shown in FIG. 11, respectively. Furthermore, the vertical view first pad image 126 and the oblique view first pad image 526 are the same images as the vertical view pad image 125 and the oblique view pad image 525 shown in FIG. 10. Here, the vertical view upper wire image 190 includes the starting point image 191, the vertical view first to fourth bending point images 192 to 195, and the vertical view ending point image 196. The oblique view upper wire image 590 includes the oblique view starting point image 591, the oblique view first to fourth bending point images 592 to 595, and the oblique view ending point image 596.

In step S203 of FIG. 26, the vertical view diagram generation part 262 displays the vertical view image 1210 input from the image acquisition part 61 on the display part 54 as shown in FIG. 28. When the user operates the input part 53 to draw a contour line along the contour of the vertical view image 1210 displayed on the display part 54, the vertical view diagram generation part 262 superimposes the drawing line input by the user on the vertical view image 1210 and displays the same on the display part 54. In step S204 of FIG. 26, the vertical view diagram generation part 262 recognizes the components where the starting points 31 and 91 of the wires 30 and the upper wires 90 are located and the components where the ending points 36 are located based on the drawing lines input by the user. Then, the multiple wires 30 and the multiple upper wires 90 are grouped into multiple groups with reference to the wire grouping database 73 shown in FIG. 22.

In this embodiment, the multiple wires 30 all have the starting points 31 on the first pad 26 of the first semiconductor chip 21 and the ending points 36 on the lead 12 of the lead frame 11, and the multiple wires 30 have the same thickness of 25 μm. Therefore, the vertical view diagram generation part 262 groups the multiple wires 30 all into the first group with reference to the wire grouping database 73 of FIG. 22. Furthermore, the multiple upper wires 90 arranged within the frame of the one-dot chain line in FIG. 18 have all the starting points 91 on the third pad 28 of the second semiconductor chip 22 and the ending points 96 on the second pad 27 of the first semiconductor chip 21, and have the same thickness of 10 μm. Therefore, the vertical view diagram generation part 262 groups the multiple upper wires 90 all into the second group by with reference to the wire grouping database 73 of FIG. 22. Since in this embodiment, the semiconductor device 210 is described as including two wire groups, the total number Nend of the groups is 2. Nevertheless, three or more wire groups having different bending shapes or thicknesses may be included, for example.

Figure 30:
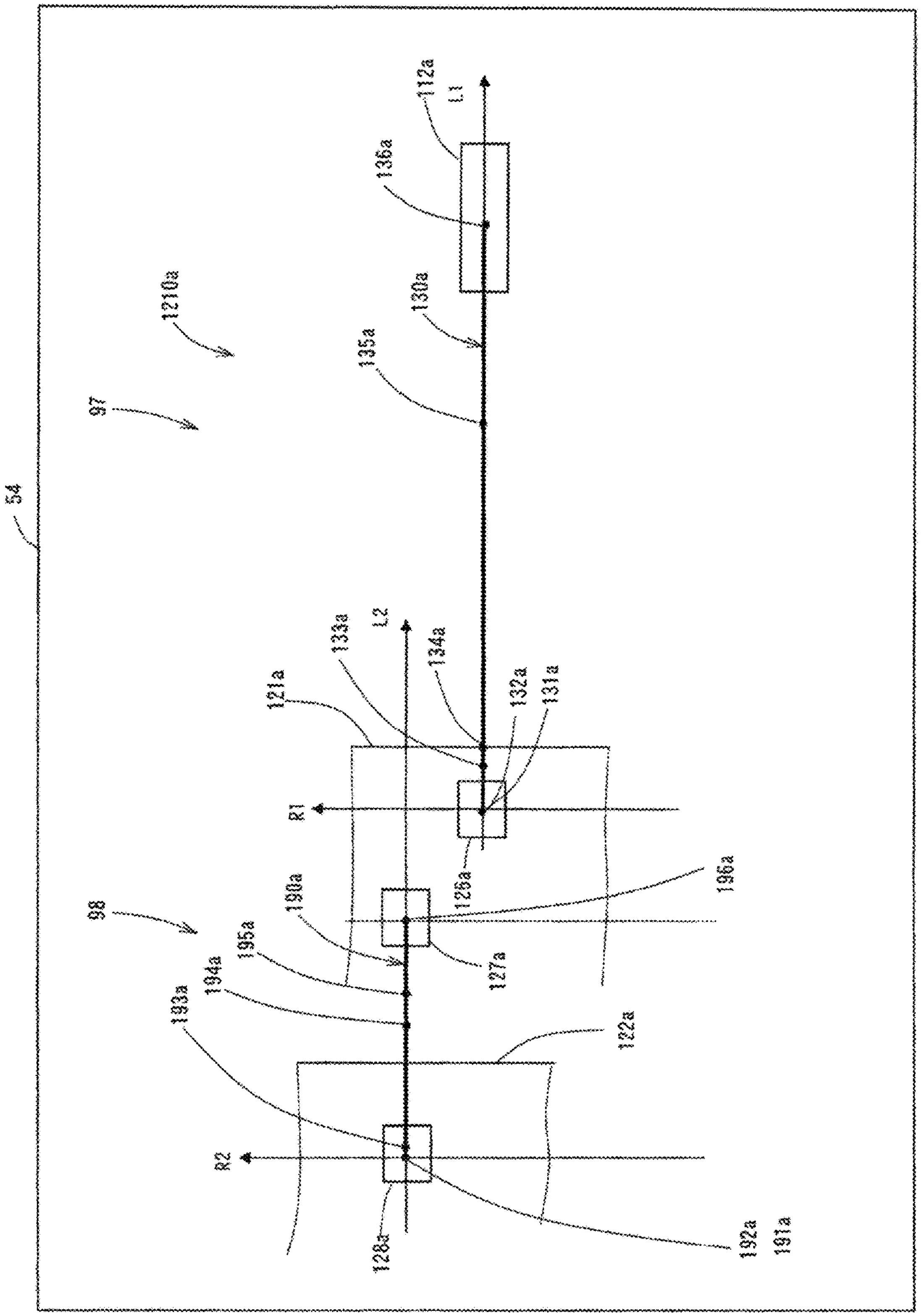
FIG. 30 is a view showing a state where the display part of the three-dimensional diagram generation apparatus of another embodiment displays the vertical view diagram of the semiconductor device shown in FIG. 17 to FIG. 20.
Figure 31:
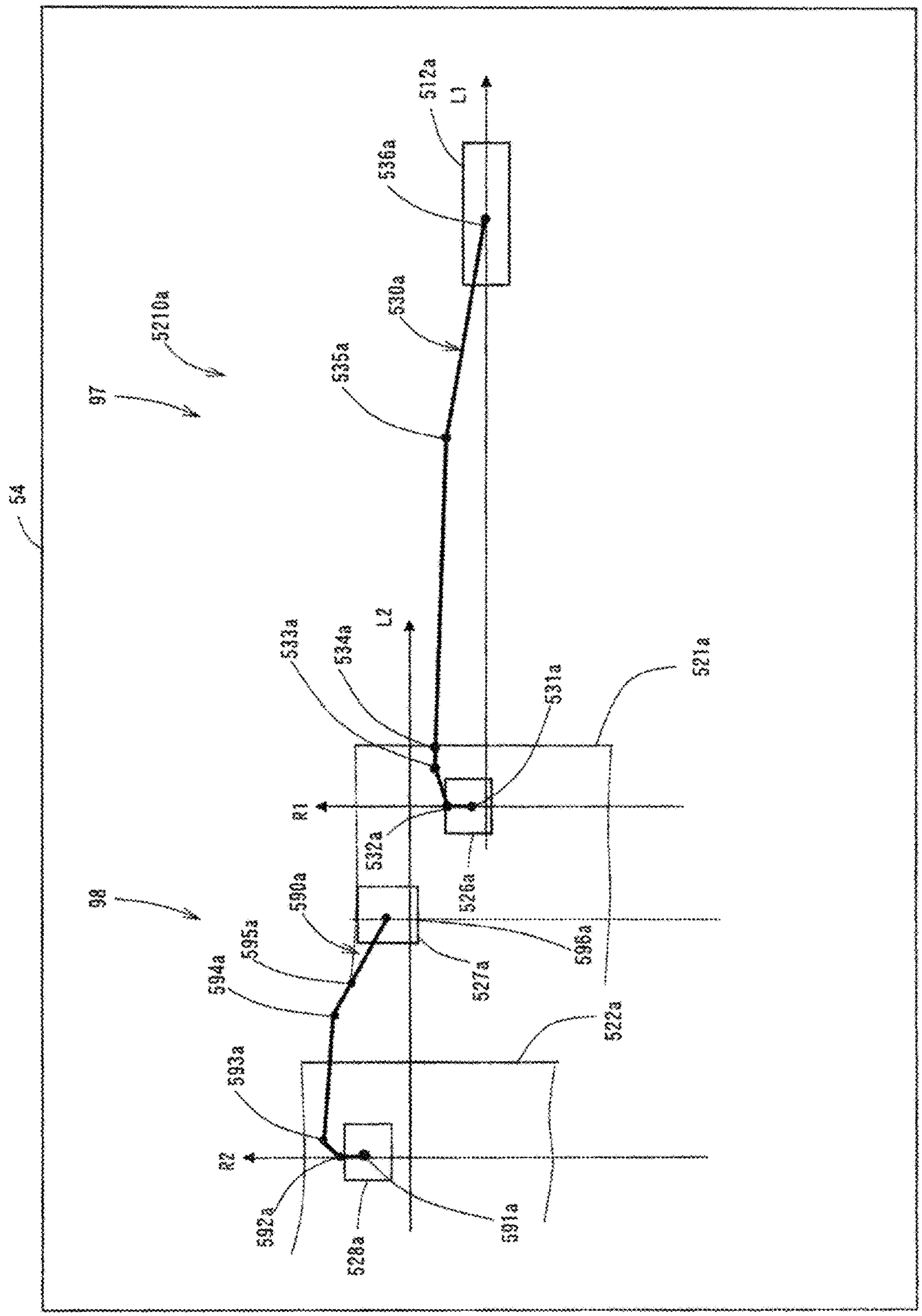
FIG. 31 is a view showing a state where the display part of the three-dimensional diagram generation apparatus of another embodiment displays the oblique view diagram of the semiconductor device shown in FIG. 17 to FIG. 20.

Then, when the drawing of the contour lines of the user and the grouping of the wires 30 and the upper wires 90 are completed, the vertical view diagram generation part 262 generates the contour lines of the vertical view image 1210 drawn by the user as the vertical view diagram 1210*a* shown in FIG. 30 in step S204 of FIG. 26 (vertical view diagram generation step).

In step S205 of FIG. 26, the diagram conversion part 263 sets a counter N to 1. Then, in step S206 of FIG. 26, similar to step S105 of FIG. 9, the diagram conversion part 263 converts the vertical view lead diagram 112*a*, the vertical view first pad diagram 126*a*, the vertical view first semiconductor chip diagram 121*a*, and the vertical view wire diagram 130*a* of each component of the lead 12, the first semiconductor chip 21, and the first pad 26 and the multiple wires 30 included in the first group respectively into the oblique view lead diagram 512*a*, the oblique view first pad diagram 526*a*, the oblique view first semiconductor chip diagram 521*a*, and the oblique view wire diagram 530*a* using the component shape parameter shown in FIG. 23 and the group-specific bending parameter database 74*a* of the first group. Here, the vertical view upper wire diagram 190*a* includes a vertical view starting point diagram 191*a*, vertical view first to fourth bending point diagrams 192*a* to 195*a*, and a vertical view ending point diagram 196*a*, and the oblique view upper wire diagram 590*a* includes an oblique view starting point diagram 591*a*, oblique view first to fourth bending point diagrams 592*a* to 595*a*, and an oblique view ending point diagram 596*a*.

Next, in step S207 of FIG. 26, similar to step S106 of FIG. 9, the diagram conversion part 263 superimposes the converted oblique view lead diagram 512*a*, oblique view first pad diagram 526*a*, the oblique view wire diagram 530*a*, and the oblique view first semiconductor chip diagram 521*a* onto the oblique view image 5210, and displays the same on the display part 54.

Figure 27:
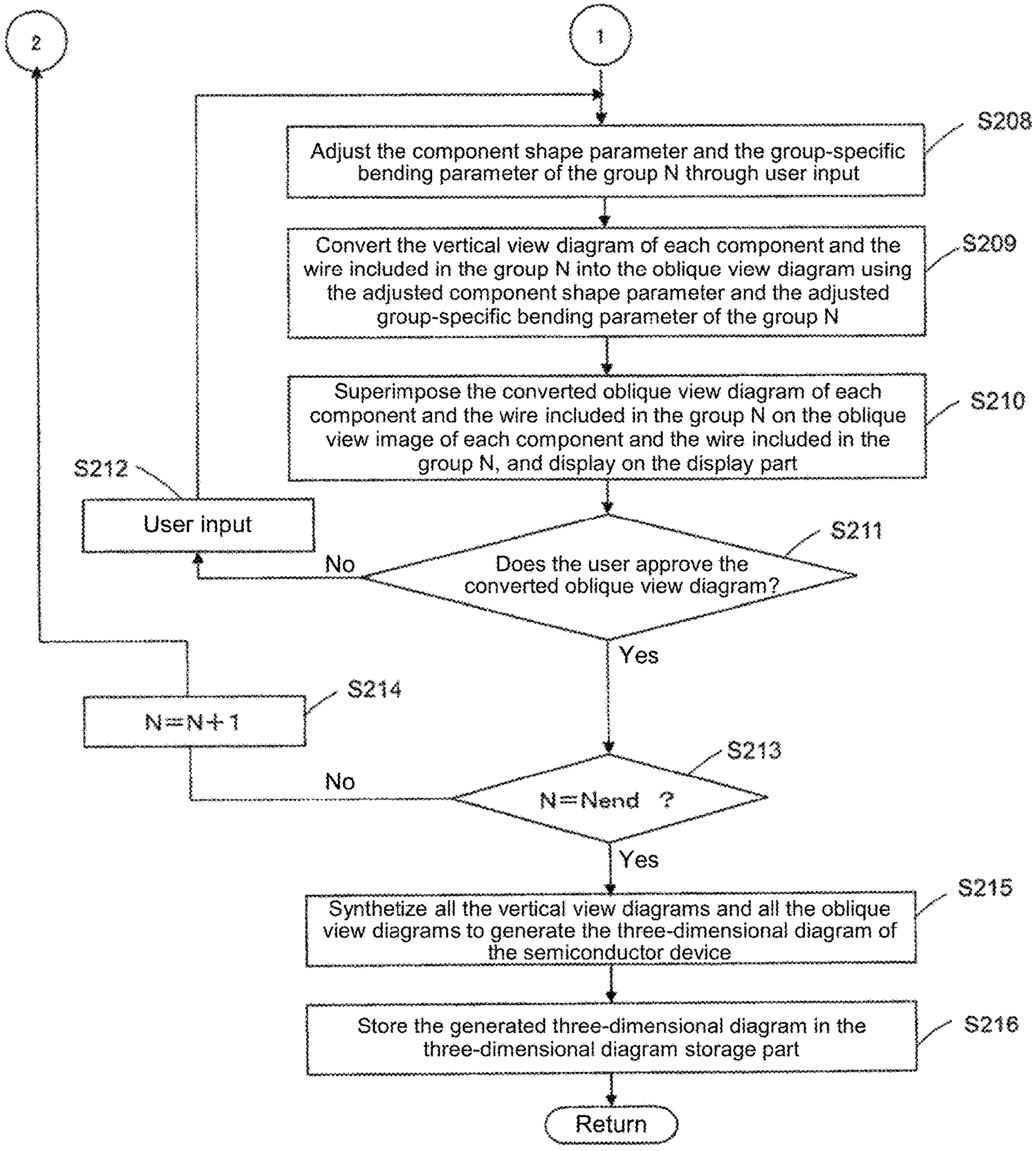
FIG. 27 is a flowchart showing the operation of the three-dimensional diagram generation apparatus of another embodiment, and is a continuation of the flowchart shown in FIG. 26.

In step S208 of FIG. 27, the diagram conversion part 263 adjusts the component shape parameter or the bending parameter of the wires 30 of the first group based on the input of the user. The adjustment of the component shape parameter or bending parameter may be stored in the storage part 52 by updating the data of the height Z from the reference surface and the inclination in the XYZ directions stored in each cell of the component shape parameter database 71 shown in FIG. 23, and may be stored in the storage part 52 by updating the data of the coordinate positions of the group-specific bending parameter database 74 shown in FIG. 24, for example, through the input of the user.

In step S209 of FIG. 27, similar to step S206 of FIG. 27, the diagram conversion part 263 converts the vertical view lead diagram 112*a*, the vertical view first pad diagram 126*a*, the vertical view first semiconductor chip diagram 121*a*, and the vertical view wire diagram 130*a* respectively into the oblique view lead diagram 512*a*, the oblique view first pad diagram 526*a*, the oblique view first semiconductor chip diagram 521*a*, and the oblique view wire diagram 530*a* using the adjusted component shape parameter and bending parameter of the wires 30 of the first group, and in step S210 of FIG. 27, the diagram conversion part 263 superimposes the converted oblique view lead diagram 512*a*, oblique view first pad diagram 526*a*, oblique view first semiconductor chip diagram 521*a*, and oblique view wire diagram 530*a* on the oblique view image 5210 and displays the same on the display part 54.

Then, in step S211 of FIG. 27, the diagram conversion part 263 determines whether there is approval input of the user from the input part 53. Then, if there is no approval from the user, the diagram conversion part 263 accepts the input of the user in step S212 of FIG. 27 and returns to step S208 of FIG. 27 to adjust the shape parameter of the wires 30 of the first group. Then, the diagram conversion part 263 repeats steps S208 to S211 and S212 of FIG. 27 until the user makes approval input in step S211 of FIG. 27. As a result, the converted oblique view lead diagram 512*a*, oblique view first pad diagram 526*a*, oblique view first semiconductor chip diagram 521*a*, and oblique view wire diagram 530*a* overlap with the oblique view lead image 512, the oblique view first pad image 526, the oblique view first semiconductor chip image 521, and the oblique view wire image 530.

Then, when the user makes approval input in step S211 of FIG. 27, the diagram conversion part 263 proceeds to step S213 of FIG. 27 to determine whether the counter N is the total number Nend of groups grouped. Then, if it is determined as NO in step S213 of FIG. 27, the counter N is incremented by 1 in step S214 of FIG. 27, and the process returns to step S206 of FIG. 26. Then, the diagram conversion part 263 converts the vertical view second pad diagram 127*a*, the vertical view third pad diagram 128*a*, the vertical view second semiconductor diagram 122*a*, and the vertical view upper wire diagram 190*a* respectively into the oblique view second pad diagram 527*a*, the oblique view third pad diagram 528*a*, the oblique view second semiconductor chip diagram 522*a,* and the oblique view upper wire diagram 590*a* using the component shape parameters shown in FIG. 23 and the group-specific bending parameter database 74*b* of the second group (diagram conversion step).

Figure 32:
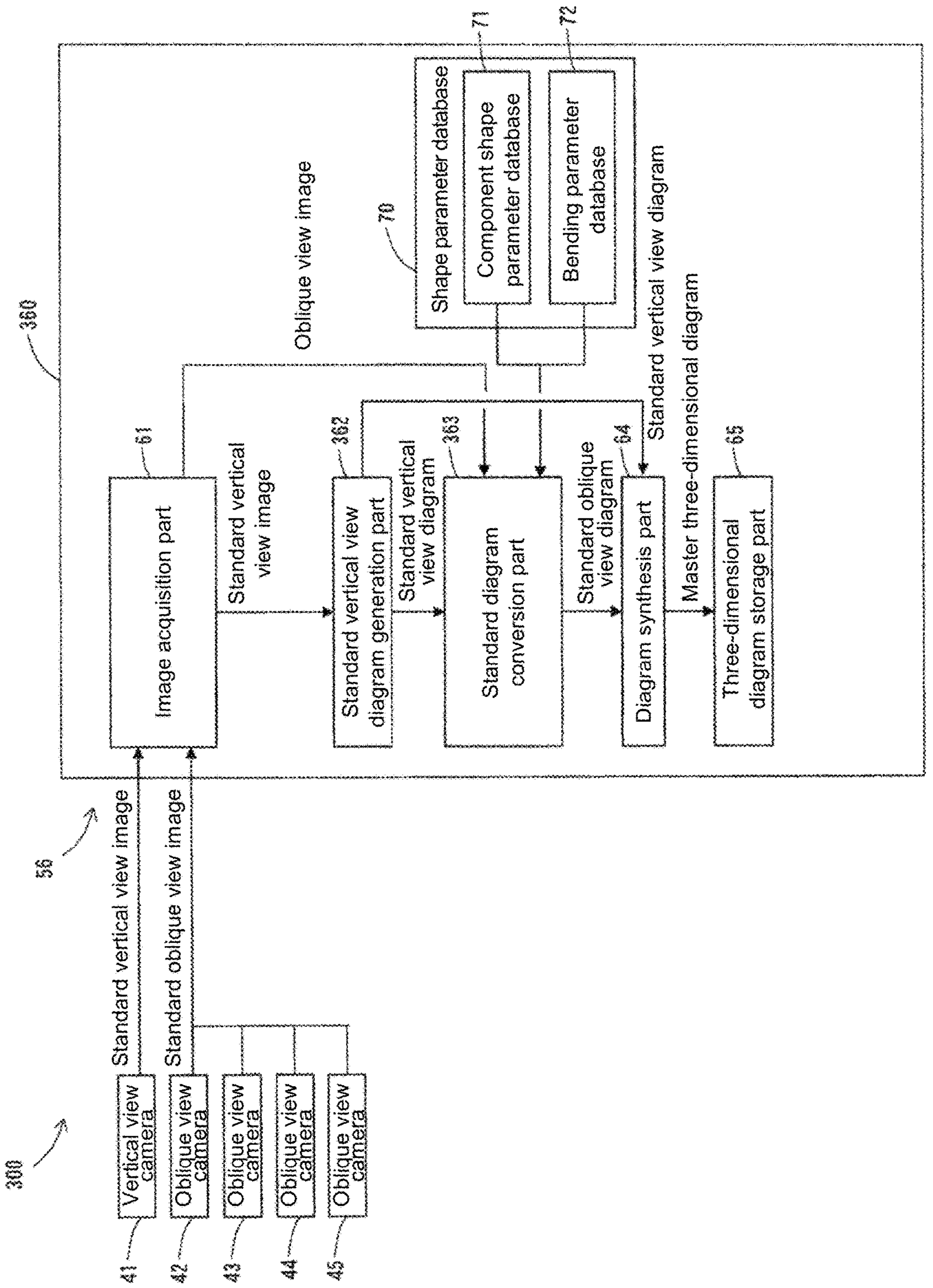
FIG. 32 is a functional block diagram showing the configuration of the master three-dimensional diagram generation part of the three-dimensional shape inspection apparatus of an embodiment.

Then, the diagram conversion part 263 superimposes and displays each oblique view image on each oblique view diagram of each component of the second pad 27, the second semiconductor chip 22, and the third pad 28 and the multiple upper wires 90 included in the second group in step S207 of FIG. 27, and repeats steps S208 to S210 of FIG. 32 for each component of the second pad 27, the second semiconductor chip 22, the third pad 28, and the multiple upper wires 90 included in the second group until approved by the user. As a result, the converted oblique view second pad diagram 527*a,* oblique view third pad diagram 528*a,* oblique view second semiconductor chip diagram 522*a,* and oblique view upper wire diagram 590*a* overlap with the oblique view second pad image 527, the oblique view third pad image 528, the oblique view second semiconductor chip image 522, and the oblique view upper wire image 590. Then, if there is approval input of the user in step S211 of FIG. 27, the process proceeds to step S213 of FIG. 27. Then, if it is determined as YES in step S213 of FIG. 27, the process proceeds to step S215 of FIG. 27.

The diagram synthesis part 64 generates a three-dimensional diagram including the positional information of each part of the semiconductor device 210 by synthesizing the vertical view diagram 1210*a* generated by the vertical view diagram generation part 262 and the oblique view diagram 5210*a* including the oblique view diagrams of all the wires, which include the oblique view diagrams of wires in the first group and the oblique view diagrams in the second group in step S215 of FIG. 32 (diagram synthesis step).

Then, the diagram synthesis part 64 stores the generated three-dimensional diagram in the three-dimensional diagram storage part 65 of the storage part 52 in step S216 of FIG. 32.

When the oblique view diagram 5210*a* and the contour line of the oblique view image 5210 overlap, the data of the height Z from the reference surface and the inclination in the XYZ directions stored in each cell of the component shape parameter database 71 shown in FIG. 23 becomes data indicating the height and inclination of each component of the semiconductor device 210. Therefore, it is also possible to detect the height and inclination of each component of the semiconductor device 210 using the data of the height Z from the reference surface and the inclination in the XYZ directions stored in each cell of the component shape parameter database 71.

As described above, for wires that have the starting points located on the same component, the ending points located on the same component, and the same wire thickness, the bending points near the starting points are at relatively the same position with respect to the starting points, and the positions of the bending points on the ending point side are defined in proportion to the total length of the wire. Thus, the multiple wires included in one wire group can define the bending shape with one kind of bending parameter data. Therefore, the three-dimensional diagram generation apparatus 200 is capable of generating the oblique view diagrams of each wire 30 and each upper wire 90 fitted to the oblique view images of each wire 30 and each upper wire 90 with input of fewer bending parameters from the user.

It has been described that, in the operation of the three-dimensional diagram generation apparatus 200 described with reference to FIG. 26 and FIG. 27, the conversion from the vertical view diagram to the oblique view diagram is performed for the wires 30 of the first group, and then the conversion from the vertical view diagram to the oblique view diagram is performed for the upper wires 90 of the second group. However, the present invention is not limited thereto. For example, the conversion from the vertical view diagram to the oblique view diagram for both the wires 30 of the first group and the upper wires 90 of the second group may be performed simultaneously, and the synthesis of the three-dimensional diagram may be performed based on the oblique view diagrams after the user approves all the oblique view diagrams.

Next, a three-dimensional shape inspection apparatus 300 of an embodiment will be described with reference to FIG. 32 to FIG. 37. The same reference numerals are used for the same parts as those of the three-dimensional diagram generation apparatus 100 described with reference to FIG. 1 to FIG. 16, and the description thereof is omitted.

As shown in FIG. 32, the three-dimensional shape inspection apparatus 300 takes the controller 50 of the three-dimensional diagram generation apparatus 100 shown in FIG. 1 as a controller 56 that is composed of the master three-dimensional diagram generation part 360 and an inspection part 380. The master three-dimensional diagram generation part 360 generates the three-dimensional diagram of a standard product of the semiconductor device 10 shown in FIG. 1 to FIG. 4. Here, the standard product refers to the semiconductor device 10 in which the dimensions of each part are formed according to a rough design drawing. Therefore, the standard vertical view image 110, the standard oblique view image 510, the standard vertical view diagram 110*a,* and the standard oblique view diagram 510*a* of the standard product of the semiconductor device 10 are substantially the same as the vertical view image 110, the oblique view image 510, the vertical view diagram 110*a,* and the oblique view diagram 510*a* shown in FIG. 10 to FIG. 16.

As shown in FIG. 32, the master three-dimensional diagram generation part 360 of the three-dimensional shape inspection apparatus 300 takes the vertical view diagram generation part 62 and the diagram conversion part 63 of the controller 50 of the three-dimensional diagram generation apparatus 100 described earlier with reference to FIG. 5 as a standard vertical view diagram generation part 362 and a standard diagram conversion part 363, respectively. The other functional blocks are the same as those of the controller 50.

Instead of accepting the input of the user and generating the contour line of the vertical view image 110 drawn by the user as the vertical view diagram 110*a,* as performed by the vertical view diagram generation part 62 of the controller 50, the standard vertical view diagram generation part 362 generates the standard vertical view diagram 110*a* by extracting the contour line of the standard vertical view image 110 by means of pattern recognition, edge recognition, and the like.

Further, the standard diagram conversion part 363 uses the shape parameters stored in the component shape parameter database 71 and the bending parameter database 72 of the shape parameter database 70, with no input from the user, to convert the standard vertical view diagram 110*a* into the oblique view diagram 510*a,* compares the converted oblique view diagram 510*a* with the contour line of the standard oblique view image 510, performs the conversion while correcting the shape parameters until the oblique view diagram 510*a* overlaps with the standard oblique view image 510, and generates the oblique view diagram 510*a* overlapping with the standard oblique view image 510 as the standard oblique view diagram 510*a* when the oblique view diagram 510*a* overlaps with the standard oblique view image 510.

The diagram synthesis part 64 synthesizes multiple standard oblique view diagrams, including the standard vertical view diagram 110*a* generated by the standard vertical view diagram generation part 362 and the standard oblique view diagram 510*a* converted by the standard diagram conversion part 363, to generate a master three-dimensional diagram including the positional information of each part of the semiconductor device 10 (diagram synthesis step).

Figure 33:
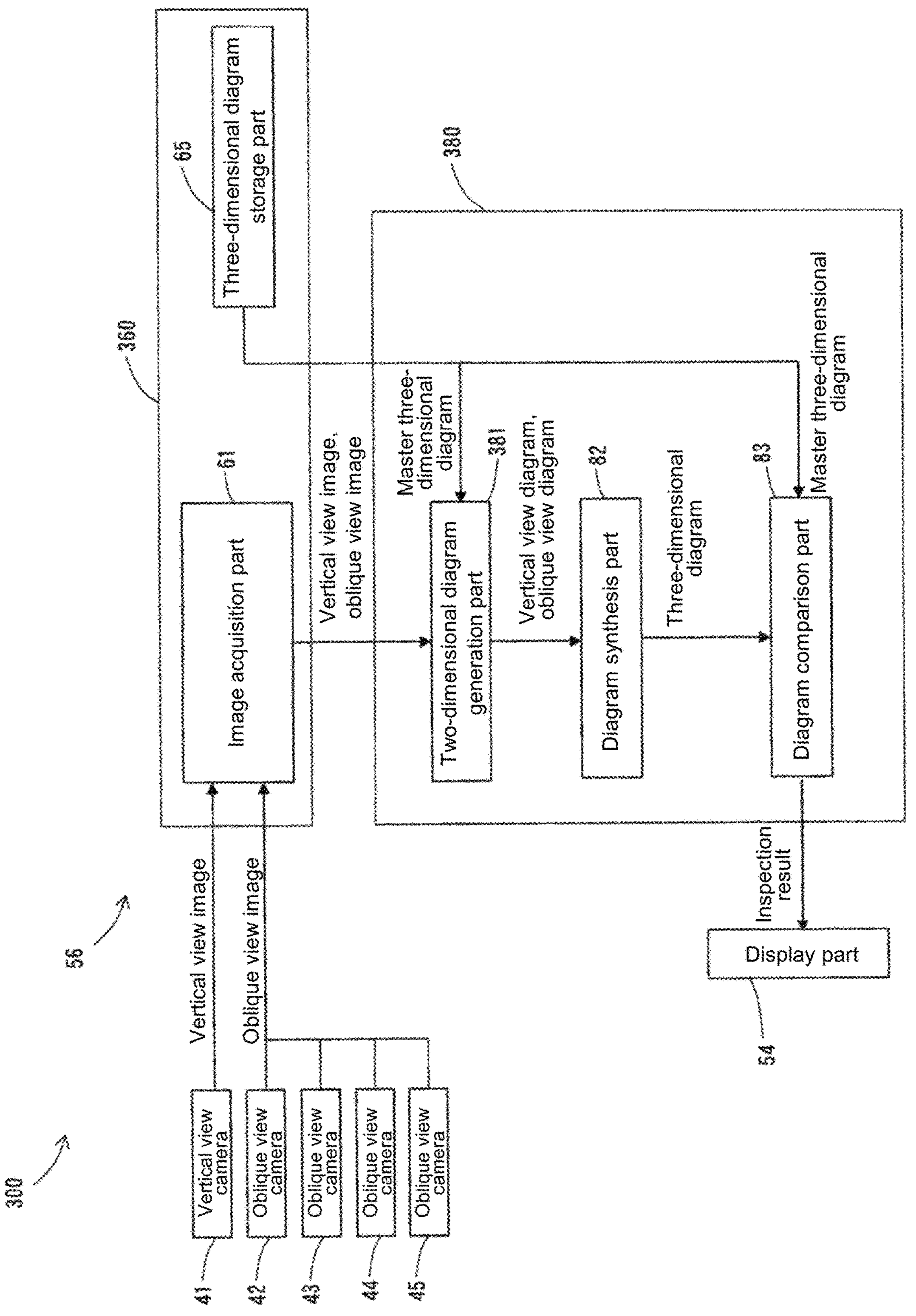
FIG. 33 is a functional block diagram showing the configuration of the inspection part of the three-dimensional shape inspection apparatus of an embodiment.

As shown in FIG. 33, the inspection part 380 includes a two-dimensional diagram generation part 381, a diagram synthesis part 82, and a diagram comparison part 83.

The two-dimensional diagram generation part 381 is input with the standard vertical view image 110 and the oblique view images 510 respectively acquired by the vertical view camera 41 and the four oblique view cameras 42 to 45, from the image acquisition part 61 of the master three-dimensional diagram generation part 360. Further, the two-dimensional diagram generation part 381 is input with the master three-dimensional diagram from the three-dimensional diagram storage part 65 of the master three-dimensional diagram generation part 360. The two-dimensional diagram generation part 381 extracts the contour lines of each part and the wire 30 included in the vertical view image 110 input from the image acquisition part 61 with reference to the master three-dimensional diagram input from the three-dimensional diagram storage part 65, and generates the vertical view diagram 110*a*. Besides, the two-dimensional diagram generation part 381 extracts the contour lines of each part and the wire 30 included in the oblique view image 510 input from the image acquisition part 61 with reference to the master three-dimensional diagram input from the three-dimensional diagram storage part 65, and generates the oblique view diagram 510*a*. Then, the two-dimensional diagram generation part 381 outputs the generated vertical view diagram 110*a* and oblique view diagram 510*a* to the diagram synthesis part 82.

The diagram synthesis part 82 synthesizes the vertical view diagram 110*a* and the oblique view diagram 510*a* input from the two-dimensional diagram generation part 381 to generate a three-dimensional diagram including the positional information of each part of the semiconductor device 10.

The diagram comparison part 83 detects the deviation amount of each diagram by comparing the three-dimensional diagram including the positional information of each part of the semiconductor device 10, which is synthesized by the diagram synthesis part 82, with the master three-dimensional diagram including the positional information of each part of the standard product of the semiconductor device 10, which is input from the three-dimensional diagram storage part 65. Based on the detected deviation amount, the diagram comparison part 83 performs shape inspection on the semiconductor device 10, and displays the inspection result on the display part 54.

Next, the operation of the three-dimensional shape inspection apparatus 300 of the embodiment will be described with reference to FIG. 34 to FIG. 35.

Figure 34:
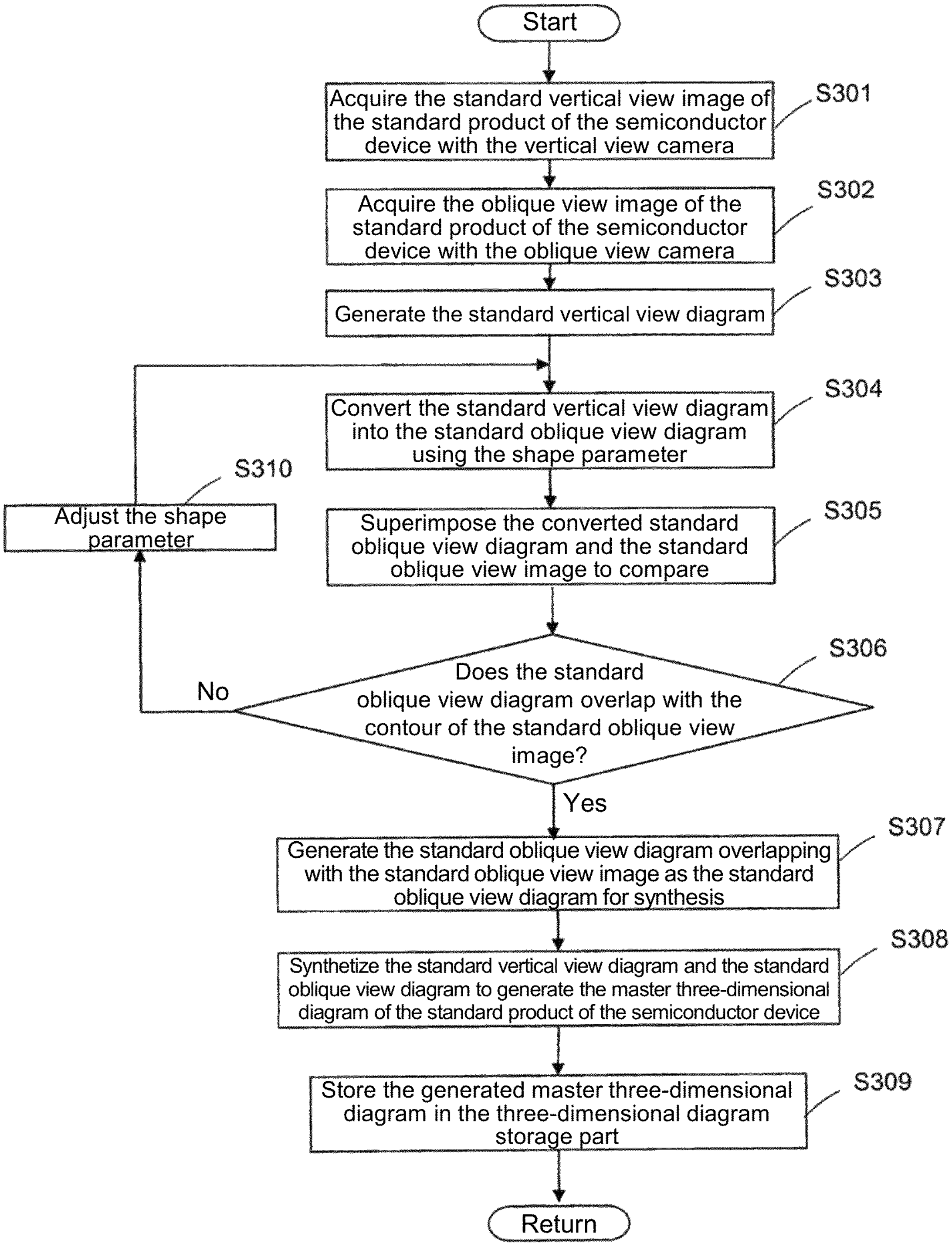
FIG. 34 is a flowchart showing the operation of the master three-dimensional diagram generation part of the three-dimensional shape inspection apparatus of an embodiment.

In step S301 of FIG. 34, the image acquisition part 61 acquires and stores the standard vertical view image 110 of the standard product of the semiconductor device 10 captured by the vertical view camera 41 in the storage part 52, and outputs the same to the standard vertical view diagram generation part 362. Further, in step S302 of FIG. 34, the image acquisition part 61 acquires and stores multiple standard oblique view images captured by the four oblique view cameras 42 to 45 in the storage part 52, and outputs the acquired standard oblique view images to the standard diagram conversion part 363.

In step S303 of FIG. 34, the standard vertical view diagram generation part 362 extracts the contour line of the standard vertical view image 110 input from the image acquisition part 61 by means of pattern recognition, edge recognition, and the like to generate the standard vertical view diagram 110*a*. The standard vertical view diagram generation part 362 outputs the generated standard vertical view diagram 110*a* to the standard diagram conversion part 363 (vertical view diagram generation step).

The following describes a case where the standard diagram conversion part 363 processes the oblique view image 510 captured by the oblique view camera 45. In step S304 of FIG. 34, the standard diagram conversion part 363 converts the standard vertical view diagram 110*a* into the standard oblique view diagram 510*a* using the shape parameters stored in the component shape parameter database 71 and the bending parameter database 72 of the shape parameter database 70. Then, in step S305 of FIG. 34, the standard diagram conversion part 363 extracts the contour line of the standard oblique view image 510 by means of pattern recognition, edge recognition, and the like, and compares the converted oblique view diagram 510*a* with the extracted contour line of the standard oblique view image 510. Then, in step S306 of FIG. 34, the standard diagram conversion part 363 determines whether the converted standard oblique view diagram 510*a* overlaps with the contour line of the standard oblique view image 510.

If the standard diagram conversion part 363 determines NO in step S306 of FIG. 34, the process proceeds to step S310 of FIG. 34 to adjust the shape parameters, and then returns to step S304 of FIG. 34. Then, the standard diagram conversion part 363 performs the conversion while correcting the shape parameters until the standard oblique view diagram 510*a* overlaps with the standard oblique view image 510 and it is determined as YES in step S306 of FIG. 34. Then, when the standard diagram conversion part 363 determines YES in step S306 of FIG. 34, the process proceeds to step S307 of FIG. 34, and the standard diagram conversion part 363 generates the standard oblique view diagram 510*a* overlapping with the standard oblique view image 510 as the standard oblique view diagram 510*a* for synthesis (diagram conversion step).

Similarly, the standard diagram conversion part 363 repeats steps S304 to S306 and S310 of FIG. 34 to convert the standard vertical view diagram 110*a* into the standard oblique view diagram that overlaps with the oblique view images captured by the oblique view cameras 42 to 44, and generates the standard oblique view diagrams for synthesis.

In step S308 of FIG. 34, the diagram synthesis part 64 generates a master three-dimensional diagram by synthesizing the standard vertical view diagram 110*a*, the standard oblique view diagram 510*a* for synthesis, and the standard oblique view diagrams for synthesis captured by the oblique view cameras 42 to 44. Then, in step S309 of FIG. 34, the diagram synthesis part 64 stores the generated master three-dimensional diagram in the three-dimensional diagram storage part 65 (diagram synthesis step).

Next, the operation of the inspection part 380 will be described with reference to FIG. 35. The semiconductor device 10 to be inspected has the same structure as the standard product of the semiconductor device 10 used to generate the master three-dimensional diagram.

Similar to steps S301 and S302 of FIG. 34, the image acquisition part 61 of the master three-dimensional diagram generation part 360 acquires and stores the standard vertical view image 110 of the semiconductor device 10 to be inspected, captured by the vertical view camera 41, and multiple oblique view images of the semiconductor device 10 to be inspected, captured by the four oblique view cameras 42 to 45, in the storage part 52, and outputs the same to the two-dimensional diagram generation part 381.

Figure 35:
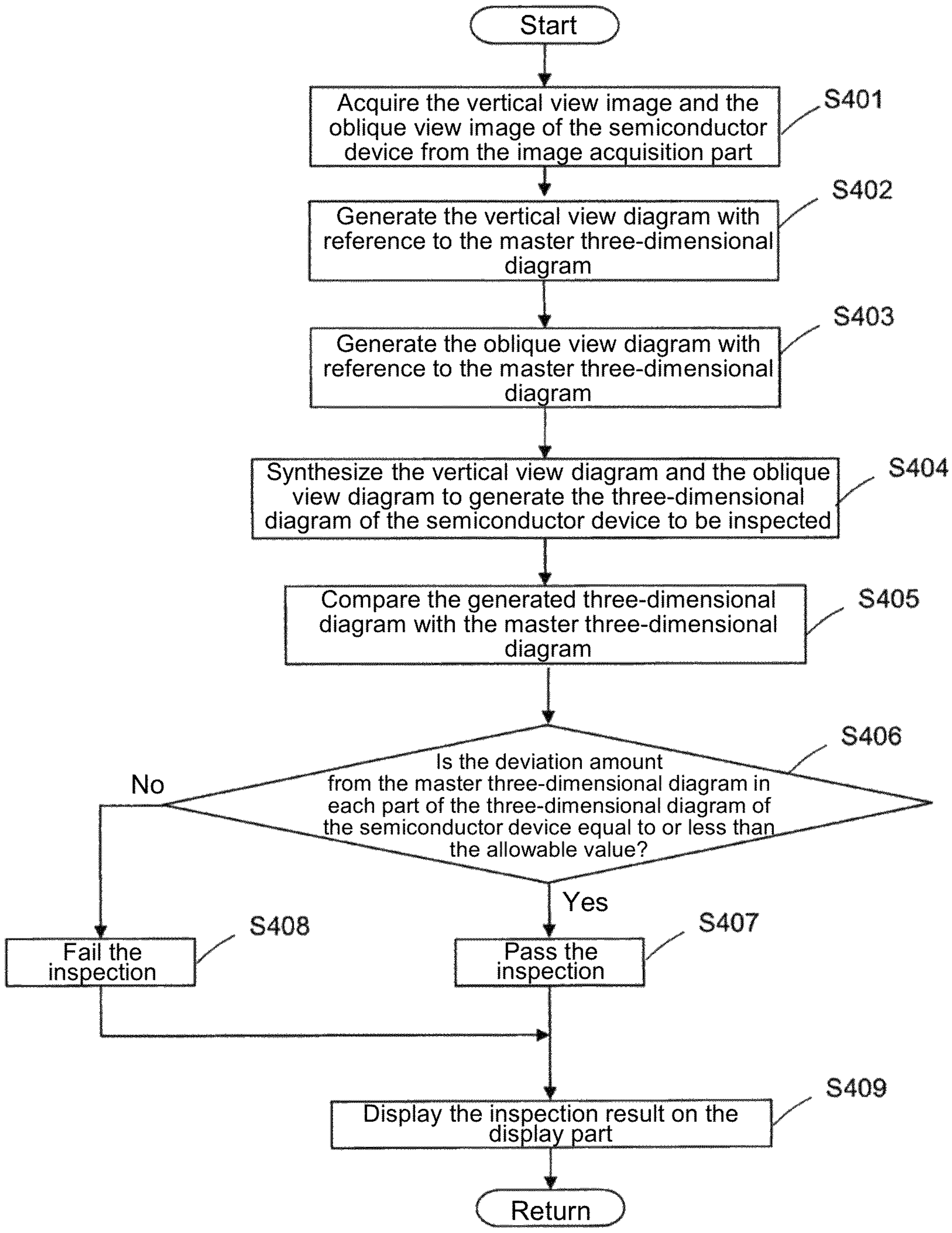
FIG. 35 is a flowchart showing the operation of the inspection part of the three-dimensional shape inspection apparatus of an embodiment.

As shown in steps S401 and S402 of FIG. 35, the two-dimensional diagram generation part 381 acquires the vertical view image 110 and the multiple oblique view images from the image acquisition part 61.

Figure 36:
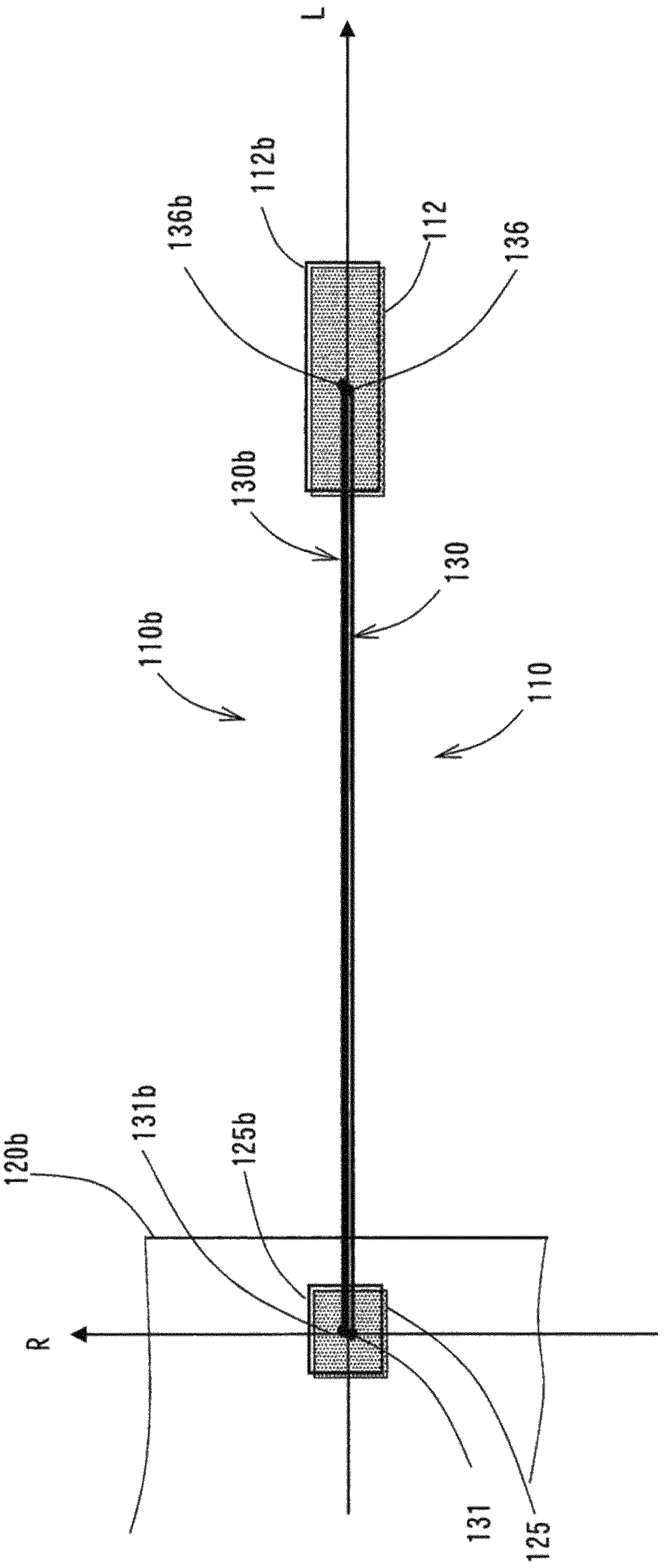
FIG. 36 is a view showing a state where the standard vertical view diagram and the vertical view image of the semiconductor device under inspection are superimposed in the three-dimensional shape inspection apparatus of an embodiment.

In step S402 of FIG. 35, the two-dimensional diagram generation part 381 reads the master three-dimensional diagram from the three-dimensional diagram storage part 65, and extracts the master vertical view diagram 110*b* as shown in FIG. 36. The master vertical view diagram 110*b* is a diagram similar to the vertical view diagram and the standard vertical view diagram 110*a* described earlier with reference to FIG. 12, but is different in that the master vertical view diagram 110*b* is extracted from the master three-dimensional diagram. The diagram of each part of the master vertical view diagram 110*b* is distinguished from the diagram of each part of the vertical view diagram and the standard vertical view diagram 110*a* by adding the alphabet "b" to the end of the reference numeral.

As shown in FIG. 36, the contour lines of the vertical view wire image 130, the vertical view lead image 112, and the vertical view pad image 125 in the vertical view image 110 are at positions slightly shifted from but close to a master vertical view wire diagram 130*b,* a master vertical view lead diagram 112*b,* and a master vertical view pad diagram 125*b* in the master vertical view diagram 110*b* due to manufacturing errors. The two-dimensional diagram generation part 381 sets a region for searching for contour lines in the vicinity of the master vertical view wire diagram 130*b,* the master vertical view lead diagram 112*b,* and the master vertical view pad diagram 125*b,* and performs image processing such as edge detection processing in that region so as to extract the contour lines of the vertical view image 110 and generate a vertical view diagram 110*c* of the semiconductor device 10 to be inspected.

Similarly, in step S403 of FIG. 35, the two-dimensional diagram generation part 381 reads the master three-dimensional diagram from the three-dimensional diagram storage part 65, and generates multiple oblique view diagrams of the semiconductor device 10 to be inspected. The following describes a case where the two-dimensional diagram generation part 381 generates an oblique view diagram 510*c* based on the oblique view image 510 captured by the oblique view camera 45.

Figure 37:
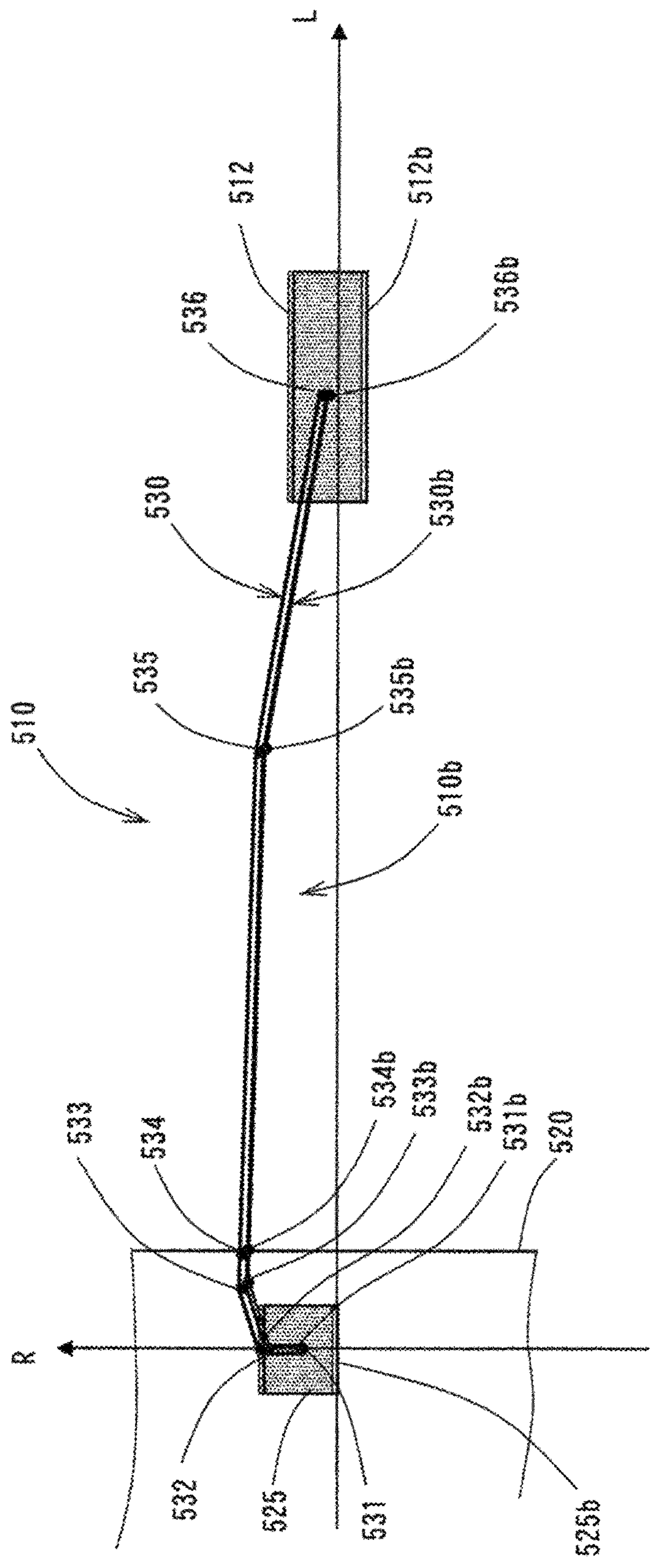
FIG. 37 is a view showing a state where the standard oblique view diagram and the oblique view image of the semiconductor device under inspection are superimposed in the three-dimensional shape inspection apparatus of an embodiment.

The two-dimensional diagram generation part 381 extracts a master oblique view diagram 510*b* as shown in FIG. 37 in step S403 of FIG. 35. Similar to the master vertical view diagram 110*b* described earlier, the master oblique view diagram 510*b* is a diagram similar to the oblique view diagram and the standard oblique view diagram 510*a* described earlier with reference to FIG. 14, but is different in that the master oblique view diagram 510*b* is extracted from the master three-dimensional diagram. The diagram of each part of the master oblique view diagram 510*b* is distinguished from the diagram of each part of the vertical view diagram and the standard vertical view diagram 110*a* by adding the alphabet "b" to the end of the reference numeral.

As shown in FIG. 37, the contour lines of the oblique view wire image 530, the oblique view lead image 512, and the oblique view pad image 525 in the oblique view image 510 are at positions slightly shifted from but close to a master oblique view wire diagram 530*b,* a master oblique view lead diagram 512*b,* and a master oblique view pad diagram 525*b* in the master oblique view diagram 510*b* due to manufacturing errors. Similar to generating the vertical view diagram 110*c* of the semiconductor device 10 to be inspected earlier, the two-dimensional diagram generation part 381 sets a region for searching for contour lines in the vicinity of the master oblique view wire diagram 530*b,* the master oblique view lead diagram 512*b,* and the master oblique view pad diagram 525*b,* and performs image processing such as edge detection processing in that region so as to extract the contour lines of the oblique view image 510 and generate the oblique view diagram 510*c* of the semiconductor device 10 to be inspected.

Similarly, the two-dimensional diagram generation part 381 generates multiple oblique view images of the semiconductor device 10 to be inspected from the oblique view images captured by the oblique view cameras 42 to 44 using the master three-dimensional diagram in step S403 of FIG. 35.

The diagram synthesis part 82 generates a three-dimensional diagram of the semiconductor device 10 to be inspected by synthesizing multiple oblique view diagrams including the vertical view diagram 110*c* and the oblique view diagram 510*c* generated by the two-dimensional diagram generation part 381 in step S404 of FIG. 35. Then, the diagram synthesis part 82 outputs the generated three-dimensional diagram to the diagram comparison part 83.

The diagram comparison part 83 reads the master three-dimensional diagram from the three-dimensional diagram storage part 65 and compares the deviation amount with the master three-dimensional diagram in each part of the three-dimensional diagram of the semiconductor device 10 to be inspected input from the diagram synthesis part 82 in step S405 of FIG. 35. For example, the comparison may calculate the deviation amount between each position of the starting point, each bending point, and the ending point of the wire 30 in the master three-dimensional diagram and each position of the starting point, each bending point, and the ending point of the wire 30 in the three-dimensional diagram.

The diagram comparison part 83 then determines whether the deviation amount of each point calculated in step S406 of FIG. 35 is equal to or less than an allowable value. If it is determined as YES in step S406 of FIG. 35, the diagram comparison part 83 proceeds to step S407 of FIG. 35, and the semiconductor device 10 to be inspected outputs a signal of passing the inspection to the display part 54. The display part 54 displays that the semiconductor device 10 to be inspected has passed the inspection in step S409 of FIG. 35.

On the other hand, if it is determined as NO in step S406 of FIG. 35, the diagram comparison part 83 proceeds to step S408 of FIG. 35, and the semiconductor device 10 to be inspected outputs a signal of failing the inspection to the display part 54. The display part 54 displays that the semiconductor device 10 to be inspected has failed the inspection in step S409 of FIG. 35.

As described above, the standard diagram conversion part 363 repeatedly performs the adjustment of the shape parameters and the conversion of the standard vertical view diagram 110*a* into the standard oblique view diagram 510*a* until the standard oblique view diagram 510*a* overlaps with the standard oblique view image 510, so that the three-dimensional shape inspection apparatus 300 of the embodiment is capable of generating the standard oblique view diagram 510*a* that accurately fits the standard oblique view image 510. Thus, it is possible to generate the master three-dimensional diagram of the semiconductor device 10 with high accuracy. Then, since the inspection for the shape of the semiconductor device 10 to be inspected is performed by generating the three-dimensional diagram of the inspection target with reference to the highly accurate master three-dimensional diagram and comparing it with the master three-dimensional diagram, it is possible to inspect the shapes of a large number of objects including the wire 30 with high accuracy in a short time.

Next, a three-dimensional shape inspection apparatus 400 of another embodiment will be described with reference to FIG. 38 to FIG. 39. The same parts as those of the three-dimensional shape inspection apparatus 300 described earlier with reference to FIG. 32 to FIG. 37 are denoted by the same reference numerals, and the description thereof is omitted. The three-dimensional shape inspection apparatus 400 takes the controller 50 of the three-dimensional diagram generation apparatus 100 shown in FIG. 1 as a controller 57 which is composed of a master three-dimensional diagram generation part 460 and an inspection part 380. The inspection part 380 has the same configuration as the inspection part 380 of the three-dimensional shape inspection apparatus 300 shown in FIG. 32 to FIG. 33, and thus the illustration and description thereof are omitted.

Figure 38:
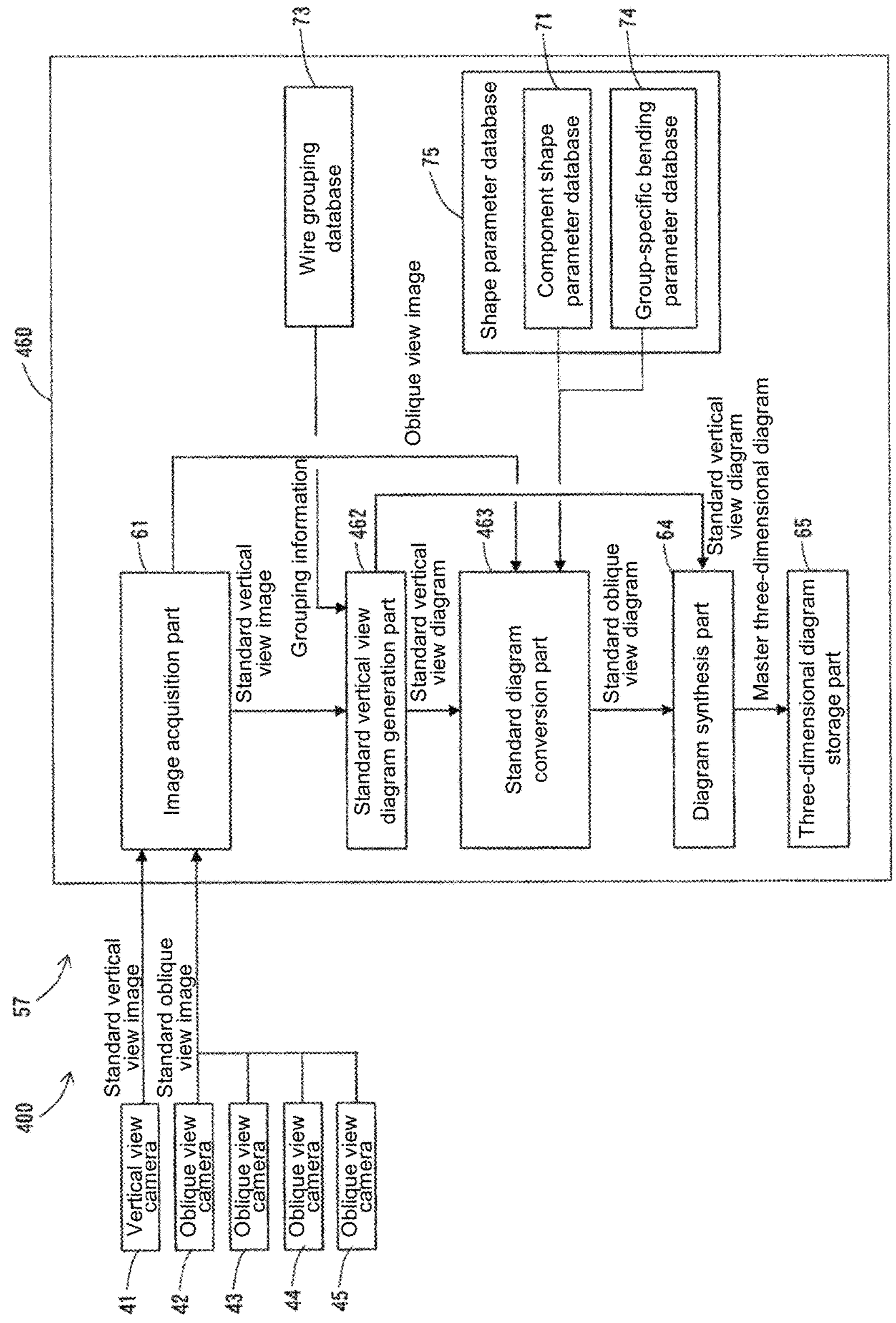
FIG. 38 is a functional block diagram showing the configuration of the master three-dimensional diagram generation part of the three-dimensional shape inspection apparatus of another embodiment.

As shown in FIG. 38, the master three-dimensional diagram generation part 460 of the three-dimensional shape inspection apparatus 400 includes the shape parameter database 75 including the wire grouping database 73 and the group-specific bending parameter database 74, similar to the three-dimensional diagram generation apparatus 200 described with reference to FIG. 21. Further, a standard vertical view diagram generation part 462 groups the wires of the semiconductor device 210 as shown in FIG. 17 to FIG. 19 into multiple groups with reference to the wire grouping database 73, and generates the standard vertical view diagram 1210*a*. Besides, a standard diagram conversion part 463 converts the standard vertical view diagram 1210*a*, which includes each component and each wire of each group, into multiple oblique view diagrams including a standard oblique view diagram 5210*a* by using the component shape parameter database 71 and the group-specific bending parameter database 74.

Next, the operation of the three-dimensional shape inspection apparatus 400 of the embodiment will be described with reference to FIG. 39. The following describes a case where the three-dimensional shape inspection apparatus 400 generates a master three-dimensional image of a standard product of the semiconductor device 210 including the wire 30 and the upper wire 90 shown in FIG. 17 to FIG. 20.

Figure 39:
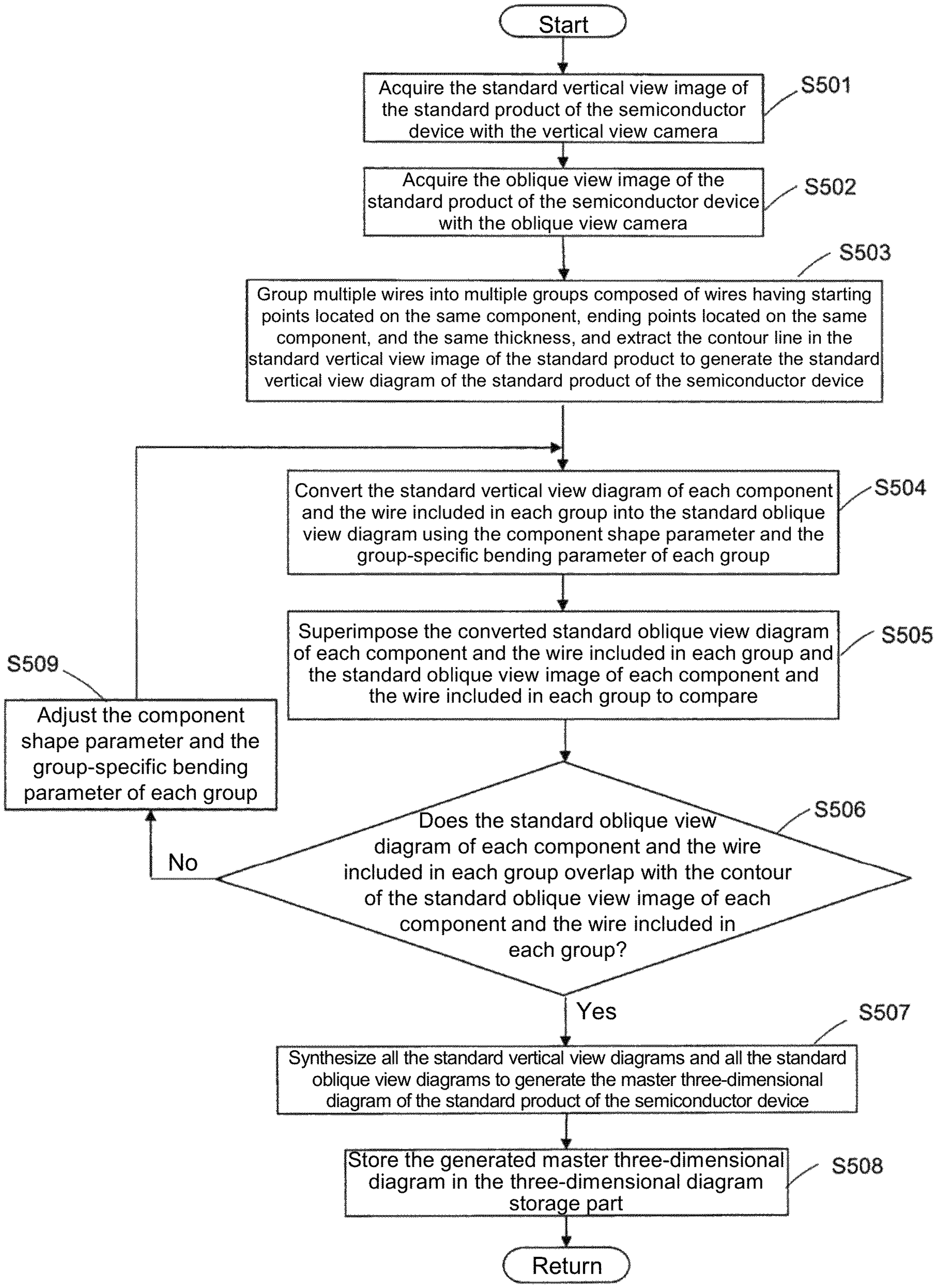
FIG. 39 is a flowchart showing the operation of the master three-dimensional diagram generation part of the three-dimensional shape inspection apparatus of another embodiment.

As shown in steps S501 and S502 of FIG. 39, the image acquisition part 61 acquires and stores the standard vertical view image 1210 of the standard product of the semiconductor device 210 shown in FIG. 28 and the standard oblique view image 5210 shown in FIG. 29 in the storage part 52, outputs the standard vertical view image 1210 to the standard vertical view diagram generation part 462, and outputs the standard oblique view image 5210 to the standard diagram conversion part 463.

In step S503 of FIG. 39, the standard vertical view diagram generation part 462 recognizes the components where the starting points 31 and 91 of the wires 30 and the upper wires 90 are located, and the components where the ending points 36 are located. Then, with reference to the wire grouping database 73 shown in FIG. 22, multiple wires 30 and multiple upper wires 90 are grouped into multiple groups.

Then, similar to the standard vertical view diagram generation part 362 shown in FIG. 32, the standard vertical view diagram generation part 462 generates the standard vertical view diagram 1210*a* shown in FIG. 30 by extracting the contour line of the standard vertical view image 1210 input from the image acquisition part 61 by means of pattern recognition, edge recognition, and the like. The standard vertical view diagram generation part 362 outputs the generated standard vertical view diagram 1210*a* to the standard diagram conversion part 363 together with the grouping information of the wires 30 and the upper wires 90 (vertical view diagram generation step).

The following describes a case where the standard diagram conversion part 463 processes the oblique view image 5210 captured by the oblique view camera 45. In step S504 of FIG. 39, the standard diagram conversion part 463 uses the component shape parameter database 71 and the group-specific bending parameter database 74 to convert the standard vertical view diagram 1210*a* shown in FIG. 30, which includes each component of the first semiconductor chip 21, the second semiconductor chip 22, the lead 12, and the first to third pads 26 to 28 and the wires 30 and the upper wires 90, into the standard oblique view diagram 5210*a* shown in FIG. 31.

In step S505 of FIG. 39, the standard diagram conversion part 463 extracts the contour lines of each component of the first semiconductor chip 21, the second semiconductor chip 22, the lead 12, the first to third pads 26 to 28 and the wires 30 and the upper wires 90 included in the standard oblique view image 5210 by means of pattern recognition, edge recognition, and the like, and superimposes the extracted contour lines with the converted standard oblique view diagram 5210*a* for comparison.

Then, in step S506 of FIG. 39, the standard diagram conversion part 463 determines whether the oblique view first semiconductor chip diagram 521*a*, the oblique view second semiconductor chip diagram 522*a*, the oblique view lead diagram 512*a*, the oblique view first to third pad diagrams 526*a* to 528*a*, the oblique view wire diagram 530*a*, and the oblique view upper wire diagram 590*a* included in the converted standard oblique view diagram 5210*a* overlap with the extracted contour lines of the standard oblique view image 5210.

If it is determined as NO in step S506 of FIG. 39, the standard diagram conversion part 463 proceeds to step S509 of FIG. 39, adjusts the component shape parameter and the group-specific bending parameter for each group, and returns to step S504 of FIG. 39. Then, the standard diagram conversion part 463 repeats steps S504 to S506 and step S509 of FIG. 39 until it is determined as YES in step S506 of FIG. 39.

Similarly, the standard diagram conversion part 463 repeats steps S504 to S506 and S509 of FIG. 39 to convert the standard vertical view diagram 1210*a* into the standard oblique view diagram overlapping with the oblique view images captured by the oblique view cameras 42 to 44, and generates each standard oblique view diagram for synthesis (diagram conversion step). Then, if it is determined as YES in step S506 of FIG. 39, the standard diagram conversion part 463 generates the standard oblique view diagram 5210*a* for synthesis and the standard oblique view diagrams for synthesis captured by the oblique view cameras 42 to 44 as the standard oblique view diagram for synthesis, and proceeds to step S508 of FIG. 39.

In step S508 of FIG. 39, the diagram synthesis part 64 generates a master three-dimensional diagram by synthesizing the standard vertical view diagram 1210*a* and the standard oblique view diagram 5210*a* for synthesis and the standard oblique view diagrams for synthesis captured by the oblique view cameras 42 to 44 (diagram synthesis step). Then, the diagram synthesis part 64 stores the generated master three-dimensional diagram in the three-dimensional diagram storage part 65 in step S508 of FIG. 39.

In addition to the same effects as the three-dimensional shape inspection apparatus 300 described earlier, the three-dimensional shape inspection apparatus 400 described above is capable of generating the oblique view diagram of each wire 30 and each upper wire 90 that fits the oblique view image of each wire 30 and each upper wire 90 with input of fewer bending parameters, and is capable of generating a master three-dimensional diagram.

Figure 40:
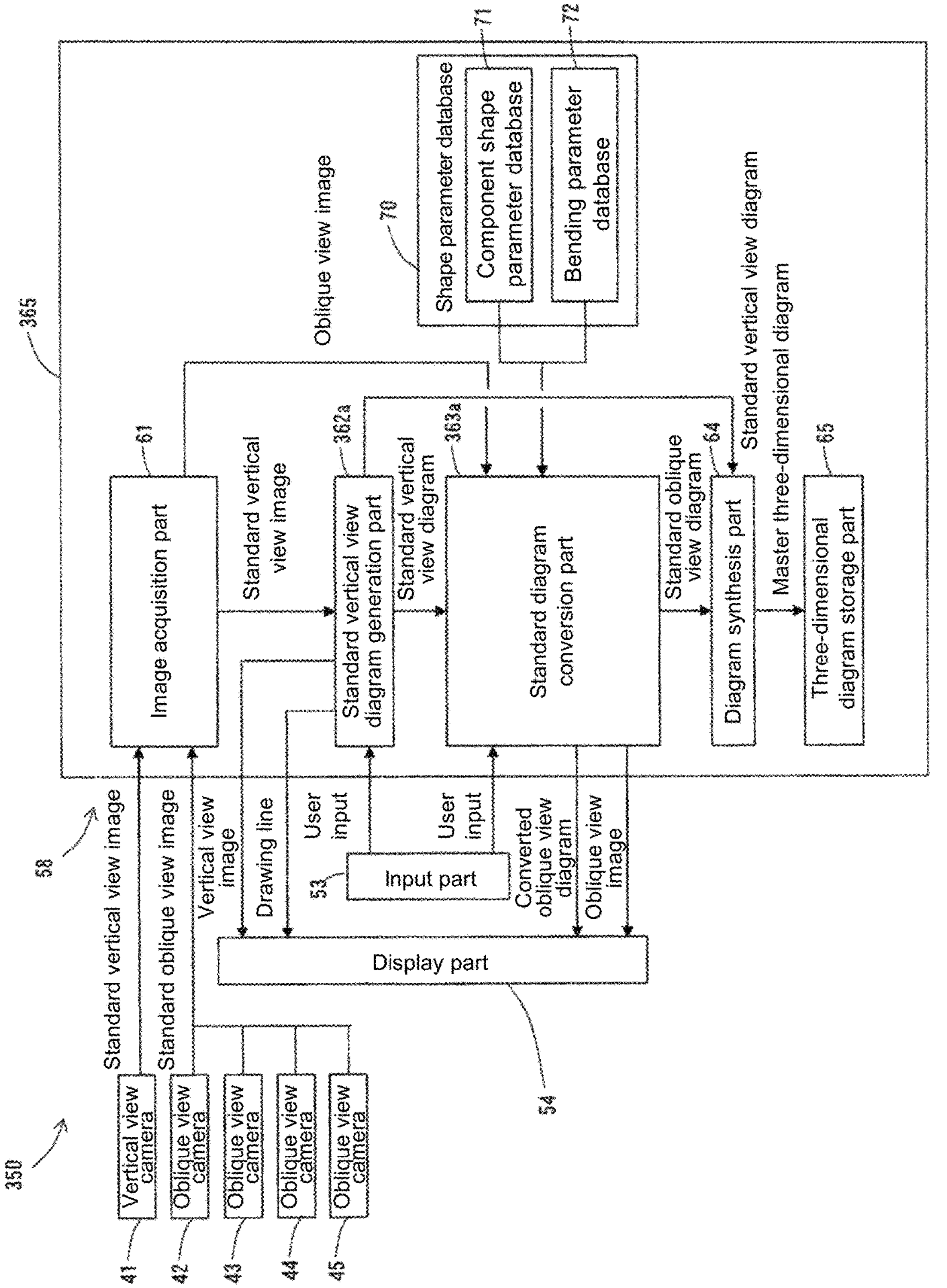
FIG. 40 is a functional block diagram showing the configuration of the master three-dimensional diagram generation part, the input part, and the display part of the three-dimensional shape inspection apparatus of another embodiment.

Although it has been described that, in the three-dimensional shape inspection apparatuses 300 and 400, the standard diagram conversion parts 363 and 463 repeatedly perform the adjustment of the shape parameters and the conversion of the standard vertical view diagram 110*a* into the standard oblique view diagram 510*a,* the present invention is not limited thereto. For example, a three-dimensional shape inspection apparatus 350 shown in FIG. 40 has the input part 53 for the user to input data and the display part 54 for displaying images and diagrams, and a master three-dimensional diagram generation part 365 of a controller 58 includes a vertical view diagram generation part 362*a* configured to display by superimposing the vertical view image 110 and the drawing line of the contour line of the standard vertical view image 110 input by the user, and a standard diagram conversion part 363*a* that accepts changes of the shape parameters made through an operation of the user on the input part 53 and displays the converted standard oblique view diagram 510*a* and the standard oblique view image 510 by superimposing them on the display part.

Similar to the three-dimensional diagram generation apparatus 100 described earlier with reference to FIG. 1 to FIG. 16, when generating the standard vertical view diagram 110*a,* the three-dimensional shape inspection apparatus 350 displays the standard vertical view image 110 on the display part 54 and generates the contour line of the standard vertical view image 110 input by the user as the standard vertical view diagram 110*a*. Further, the standard diagram conversion part 363*a* repeatedly changes the standard vertical view diagram 110*a* into the standard oblique view diagram 510*a* based on the shape parameter changed through the operation of the user on the input part 53, and superimposes the converted standard oblique view diagram 510*a* on the standard oblique view image 510 to display them on the display part 54, thereby generating the standard oblique view diagram 510*a* for synthesis.

Thus, similar to the three-dimensional diagram generation apparatus 100 described earlier, the three-dimensional shape inspection apparatus 350 generates the contour line of the standard vertical view image 110 drawn by the user on the display part 54 as the standard vertical view diagram 110. Therefore, it is possible to reliably generate the standard vertical view diagram 110*a* even with the standard vertical view image 110 that is difficult to process. In addition, the converted standard oblique view diagram 510*a* and the standard oblique view image 510 are superimposed and displayed on the display part 54 by adjusting the shape parameters through the input of the user. Therefore, the user can adjust the shape parameters while comparing the converted standard oblique view diagram 510*a* with the standard oblique view image 510 until they overlap, and generate the standard oblique view diagram 510*a* that meets the intention of the user. As a result, it is possible to generate the three-dimensional diagram of the standard product of the semiconductor device 10 that meets the intention of the user with high accuracy, and to inspect the semiconductor device 10 under inspection with high accuracy.

Although the above-described wire 30 and upper wire 90, used by the three-dimensional diagram generation apparatuses 100 and 200 to generate three-dimensional diagrams, are treated as bent line shapes connecting the starting points 31 and 91, the first bending points 32 and 92 to the fourth bending points 35 and 95, and the ending points 36 and 96, the present invention is not limited thereto.

Figure 41:
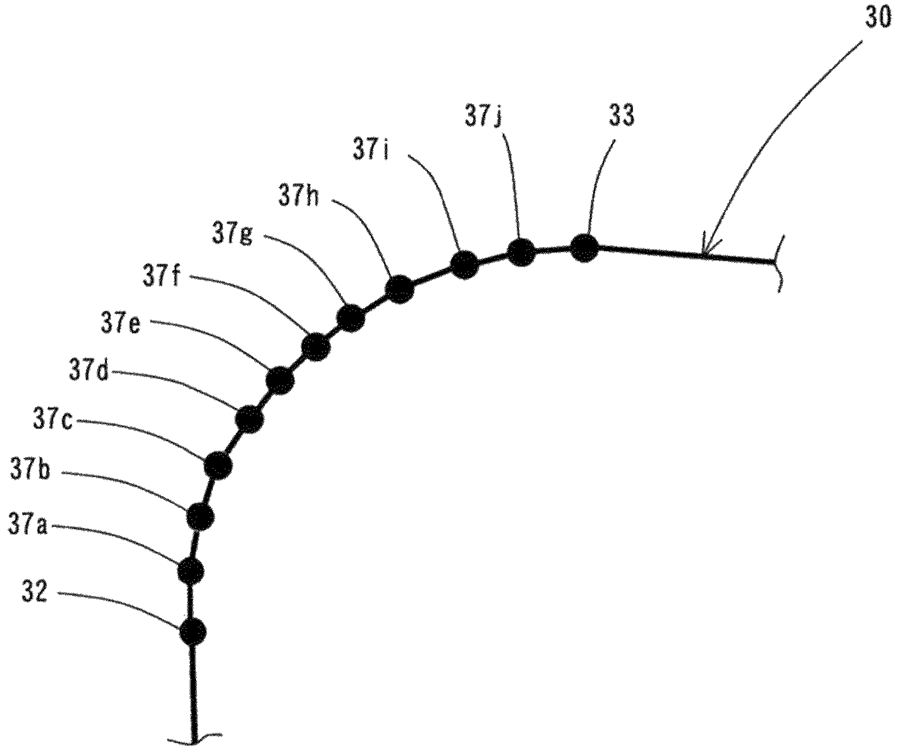
FIG. 41 is an example in which multiple bending points are set to the bent portion near the starting point of the wire shown in FIG. 2 and FIG. 3.

For example, as shown in FIG. 41, multiple bending points 37*a* to 37*j* may be set in the bent portion between the first bending point 32 and the second bending point 33 to more finely define the portion of the wire 30 between the first bending point 32 and the second bending point 33, making it possible to generate a more detailed three-dimensional diagram of the wire 30. The same applies to the upper wire 90.

What is claimed is:

1. A method for generating a three-dimensional diagram of a three-dimensional object based on a vertical view image of the object imaged from vertically above and multiple oblique view images of the object imaged from multiple obliquely upper directions, the method comprising:

- a vertical view diagram generation step which extracts a contour line in the vertical view image to generate a vertical view diagram of the object;
- a diagram conversion step which respectively converts the vertical view diagram into multiple oblique view diagrams based on a shape parameter including height information of the object, and repeatedly executes adjustment of the shape parameter and conversion of the vertical view diagram into each of the oblique view diagrams until each of the converted oblique view diagrams overlaps with each of the oblique view images; and
- a diagram synthesis step which synthesizes the generated vertical view diagram and each of the converted oblique view diagrams to generate the three-dimensional diagram of the object,
- wherein the object is a device composed of multiple components and multiple wires connecting between the components,
- the vertical view diagram generation step extracts each contour line of each component and each of the wires in the vertical view image to generate the vertical view diagram of the device,
- the shape parameter is height of each component from a reference surface, inclination of a surface of each component, and a bending parameter of each of the wires,
- each of the wires has multiple bending points between a starting point and an ending point,
- the bending parameter is a three-dimensional coordinate position of each of the bending points of each of the wires, and
- the three-dimensional coordinate position of each of the bending points is a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

2. The method according to claim 1, wherein the vertical view diagram generation step generates a contour line in the vertical view image drawn by a user as the vertical view diagram, and the diagram conversion step converts the vertical view diagram into each of the oblique view diagrams based on the adjusted shape parameter input by the user.

3. The method according to claim 2, wherein the object is a device composed of multiple components and multiple wires connecting between the components, the vertical view diagram generation step generates each contour line of each component and each of the wires in the vertical view image drawn by the user as the vertical view diagram of the device.

4. The method according to claim 3, wherein the vertical view diagram generation step groups the multiple wires into multiple groups composed of the wires having the starting points located on the same component, the ending points located on the same component, and the same thickness, and extracts each contour line of each component and each of the wires in the vertical view image to generate the vertical view diagram of the device, the bending parameter is composed of multiple group-specific bending parameters defined for each of the groups, and the diagram conversion step respectively converts each vertical view diagram of each of the wires included in each group into multiple oblique view diagrams based on each of the group-specific bending parameters, and then performs conversion of the vertical view diagram of each of the wires included in each of the groups into each oblique view diagram based on each adjusted group-specific bending parameter input by the user.

5. The method according to claim 1, wherein the three-dimensional coordinate position of each of the bending points comprises a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

6. The method according to claim 1, wherein the vertical view diagram generation step groups the multiple wires into multiple groups composed of the wires having the starting points located on the same component, the ending points located on the same component, and the same thickness, and extracts each contour line of each component and each of the wires in the vertical view image to generate the vertical view diagram of the device, the bending parameter is composed of multiple group-specific bending parameters defined for each of the groups, and the diagram conversion step respectively converts each vertical view diagram of each of the wires included in each group into multiple oblique view diagrams based on each of the group-specific bending parameters, and repeatedly executes adjustment of each of the group-specific bending parameters of each of the groups and conversion of each vertical view diagram of the wires included in each of the groups into the oblique view diagrams until each of the converted oblique view diagrams of each of the wires included in each of the groups overlaps with each of the oblique view images of each of the wires included in each of the groups.

7. The method according to claim 6, wherein the multiple wires grouped in one group respectively have multiple bending points between the starting point and the ending point, the group-specific bending parameter is a three-dimensional coordinate position of each of the bending points that the wires grouped in one group have in common, and the three-dimensional coordinate position of each of the bending points is a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

8. The method according to claim 7, wherein the three-dimensional coordinate position of each of the bending points comprises a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

9. A three-dimensional diagram generation apparatus for generating a three-dimensional diagram of a three-dimensional object, the three-dimensional diagram generation apparatus comprising:

a controller that generates the three-dimensional diagram of the object based on an image obtained by imaging the object, wherein the controller acquires a vertical view image of the object imaged from vertically above and multiple oblique view images of the object imaged from multiple obliquely upper directions, extracts a contour line in the vertical view image of the object to generate a vertical view diagram of the object, respectively converts the vertical view diagram into multiple oblique view diagrams based on a shape parameter including height information of the object stored in a storage part, and repeatedly executes adjustment of the shape parameter and conversion of the vertical view diagram into each of the oblique view diagrams until each of the converted oblique view diagrams overlaps with each of the oblique view images, and synthesizes the generated vertical view diagram and each of the oblique view diagrams overlapping with each of the oblique view images to generate the three-dimensional diagram, wherein the object is a device composed of multiple components and multiple wires connecting between the components, the controller extracts each contour line of each component and each of the wires in the vertical view image to generate the vertical view diagram of the device, the shape parameter is height of each component from a reference surface, inclination of a surface of each component, and a bending parameter of each of the wires, each of the wires has multiple bending points between a starting point and an ending point, the bending parameter is a three-dimensional coordinate position of each of the bending points of each of the wires, and the three-dimensional coordinate position of each of the bending points is a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

10. The three-dimensional diagram generation apparatus according to claim 9, comprising:

a display part that displays images and diagrams; and an input part for a user to input data, wherein the controller repeatedly displays the vertical view image of the object on the display part, and generates a contour line in the vertical view image drawn by the user by operating the input part as the vertical view diagram, and performs conversion of the vertical view diagram into each of the oblique view diagrams based on the adjusted shape parameter input from the input part by the user, and displays each of the converted oblique view diagrams and each of the oblique view images on the display part by superimposing each of the converted oblique view diagrams and each of the oblique view images.

11. The three-dimensional diagram generation apparatus according to claim 10, wherein the object is a device composed of multiple components and multiple wires connecting between the components, the controller generates each contour line of each component and each of the wires in the vertical view image drawn by the user by operating the input part as the vertical view diagram of the device.

12. The three-dimensional diagram generation apparatus according to claim 11, wherein the controller groups the multiple wires into multiple groups composed of the wires having the starting points located on the same component, the ending points located on the same component, and the same thickness, and generates each contour line of each component and each of the wires in the vertical view image drawn by the user by operating the input part as the vertical view diagram of the device, the bending parameter stored in the storage part is composed of multiple group-specific bending parameters defined for each of the groups, and the controller repeatedly respectively converts each vertical view diagram of each of the wires included in each of the groups into multiple oblique view diagrams based on each of the group-specific bending parameters, and then performs conversion of each vertical view diagram of each of the wires included in each of the groups into each of the oblique view diagrams based on each of the adjusted group-specific bending parameters input from the input part by the user, and displays each of the converted oblique view diagrams and each of the oblique view images on the display part by superimposing each of the converted oblique view diagrams and each of the oblique view images.

13. The three-dimensional diagram generation apparatus according to claim 9, wherein the three-dimensional coordinate position of each of the bending points comprises a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

14. The three-dimensional diagram generation apparatus according to claim 9, wherein the controller groups the multiple wires into multiple groups composed of the wires having the starting points located on the same component, the ending points located on the same component, and the same thickness, and extracts the contour line in the vertical view image to generate the vertical view diagram of the object, the bending parameter stored in the storage part is composed of multiple group-specific bending parameters defined for each of the groups, and the controller respectively converts each vertical view diagram of each of the wires included in each group into multiple oblique view diagrams based on each of the group-specific bending parameters stored in the storage part, and repeatedly executes adjustment of each of the group-specific bending parameters of each of the groups and conversion of each vertical view diagram of the wires included in each of the groups into the oblique view diagrams until each of the converted oblique view diagrams of each of the wires included in each of the groups overlaps with each of the oblique view images of each of the wires included in each of the groups.

15. The three-dimensional diagram generation apparatus according to claim 14, wherein the multiple wires grouped in one group respectively have multiple bending points between the starting point and the ending point, the group-specific bending parameter is a three-dimensional coordinate position of each of the bending points that the wires grouped in one group have in common, and the three-dimensional coordinate position of each of the bending points is a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

16. The three-dimensional diagram generation apparatus according to claim 15, wherein the three-dimensional coordinate position of each of the bending points comprises a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

17. A three-dimensional shape inspection apparatus for performing shape inspection on a three-dimensional object, the three-dimensional shape inspection apparatus comprising:

a master three-dimensional diagram generation part that generates a master three-dimensional diagram of a standard product of the object; and an inspection part that compares a three-dimensional diagram of the object with the master three-dimensional diagram to perform inspection on the object, wherein the master three-dimensional diagram generation part acquires a standard vertical view image of the standard product imaged from vertically above and multiple standard oblique view images of the standard product imaged from multiple obliquely upper directions, extracts a contour line in the standard vertical view image of the standard product to generate a standard vertical view diagram of the standard product, respectively converts the standard vertical view diagram into multiple standard oblique view diagrams based on a shape parameter including height information of the standard product stored in a storage part, and repeatedly executes adjustment of the shape parameter and conversion of the standard vertical view diagram into each of the standard oblique view diagrams until each of the converted standard oblique view diagrams overlaps with each of the standard oblique view images, and synthesizes the generated standard vertical view diagram and each of the standard oblique view diagrams overlapping with each of the standard oblique view images to generate the master three-dimensional diagram, and the inspection part acquires a vertical view image of the object imaged from vertically above and multiple oblique view images of the object imaged from multiple obliquely upper directions, extracts a contour line from the vertical view image while referring to the master three-dimensional diagram to generate a vertical view diagram of the object, respectively extracts a contour line from each of the oblique view images while referring to the master three-dimensional diagram to generate multiple oblique view diagrams of the object, synthesizes the generated vertical view diagram and each of the oblique view diagrams to generate the three-dimensional diagram of the object, and compares the generated three-dimensional diagram of the object with the master three-dimensional diagram to perform inspection on a three-dimensional shape of the object, wherein the object and the standard product are devices composed of multiple components and multiple wires connecting between the components, the master three-dimensional diagram generation part extracts each contour line of each component and each of the wires in the standard vertical view image to generate the standard vertical view diagram of the device, the shape parameter is height of each component from a reference surface, inclination of a surface of each component, and a bending parameter of each of the wires, each of the wires has multiple bending points between a starting point and an ending point, the bending parameter is a three-dimensional coordinate position of each of the bending points of each of the wires, and the three-dimensional coordinate position of each of the bending points is a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

18. The three-dimensional shape inspection apparatus according to claim 17, comprising:

a display part that displays images and diagrams; and an input part for a user to input data, wherein the master three-dimensional diagram generation part repeatedly displays the standard vertical view image of the standard product on the display part, and generates a contour line in the standard vertical view image drawn by the user by operating the input part as the standard vertical view diagram, and performs conversion of the standard vertical view diagram into each of the standard oblique view diagrams based on the adjusted shape parameter input from the input part by the user, and displays each of the converted standard oblique view diagrams and each of the standard oblique view images on the display part by superimposing each of the converted standard oblique view diagrams and each of the standard oblique view images.

19. The three-dimensional shape inspection apparatus according to claim 18, wherein the object and the standard product are devices composed of multiple components and multiple wires connecting between the components, the master three-dimensional diagram generation part generates each contour line of each component and each of the wires in the standard vertical view image drawn by the user by operating the input part as the standard vertical view diagram of the device.

20. The three-dimensional shape inspection apparatus according to claim 19, wherein the master three-dimensional diagram generation part groups the multiple wires into multiple groups composed of the wires having the starting points located on the same component, the ending points located on the same component, and the same thickness, and generates each contour line of each component and each of the wires in the standard vertical view image drawn by the user by operating the input part as the vertical view diagram of the standard product, the bending parameter stored in the storage part is composed of multiple group-specific bending parameters defined for each of the groups, and the master three-dimensional diagram generation part repeatedly respectively converts each standard vertical view diagram of each of the wires included in each of the groups into multiple standard oblique view diagrams based on each of the group-specific bending parameters, and then performs conversion of each standard vertical view diagram of each of the wires included in each of the groups into each of the standard oblique view diagrams based on each of the adjusted group-specific bending parameters input from the input part by the user, and displays each of the converted standard oblique view diagrams and each of the standard oblique view images on the display part by superimposing each of the converted standard oblique view diagrams and each of the standard oblique view images.

21. The three-dimensional shape inspection apparatus according to claim 17, wherein the three-dimensional coordinate position of each of the bending points comprises a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

22. The three-dimensional shape inspection apparatus according to claim 17, wherein the master three-dimensional diagram generation part groups the multiple wires into multiple groups composed of the wires having the starting points located on the same component, the ending points located on the same component, and the same thickness, and extracts the contour line in the standard vertical view image of the standard product to generate the standard vertical view diagram of the standard product, the bending parameter stored in the storage part is composed of multiple group-specific bending parameters defined for each of the groups, and the master three-dimensional diagram generation part respectively converts each standard vertical view diagram of each of the wires included in each group into multiple standard oblique view diagrams based on each of the group-specific bending parameters, and repeatedly executes adjustment of each of the group-specific bending parameters of each of the groups and conversion of each standard vertical view diagram of the wires included in each of the groups into the standard oblique view diagrams until each of the converted standard oblique view diagrams of each of the wires included in each of the groups overlaps with each of the standard oblique view images of each of the wires included in each of the groups.

23. The three-dimensional shape inspection apparatus according to claim 22, wherein the multiple wires grouped in one group respectively have multiple bending points between the starting point and the ending point, the group-specific bending parameter is a three-dimensional coordinate position of each of the bending points that the wires grouped in one group have in common, and the three-dimensional coordinate position of each of the bending points is a combination of a longitudinal direction coordinate position, a lateral direction coordinate position, and a height direction coordinate position in a coordinate system composed of a longitudinal direction axis extending from the starting point to the ending point of the wire in a plane of the reference surface, a lateral direction axis extending in a direction orthogonal to the longitudinal direction axis from the starting point of the wire in the plane of the reference surface, and a height direction axis extending in a vertical direction with respect to the reference surface through the starting point.

24. The three-dimensional shape inspection apparatus according to claim 23, wherein the three-dimensional coordinate position of each of the bending points comprises a three-dimensional proportional coordinate position which is a combination of a proportional longitudinal direction coordinate position proportional to a wire total length between the starting point and the ending point, a proportional lateral direction coordinate position proportional to the wire total length, and a proportional height direction coordinate position proportional to the wire total length.

* * * * *